(12) United States Patent
Kamijo et al.

(10) Patent No.: US 11,620,028 B2
(45) Date of Patent: Apr. 4, 2023

(54) CONDUCTIVE FILM AND CONDUCTIVE FILM ROLL, ELECTRONIC PAPER, TOUCH PANEL AND FLAT-PANEL DISPLAY COMPRISING THE SAME

(71) Applicant: ASAHI KASEI KABUSHIKI KAISHA, Tokyo (JP)

(72) Inventors: Takeshi Kamijo, Tokyo (JP); Kazuma Komatsu, Tokyo (JP); Akira Ikeda, Tokyo (JP); Sora Hida, Tokyo (JP); Tetsuro Sugimoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/745,732

(22) Filed: May 16, 2022

(65) Prior Publication Data

US 2022/0357815 A1 Nov. 10, 2022

Related U.S. Application Data

(62) Division of application No. 17/264,502, filed as application No. PCT/JP2019/029916 on Jul. 30, 2019.

(30) Foreign Application Priority Data

Jul. 30, 2018 (JP) .................................. 2018-142045
Jul. 30, 2018 (JP) .................................. 2018-142051
Jul. 30, 2018 (JP) .................................. 2018-142225

(51) Int. Cl.
*G06F 3/044* (2006.01)
*G02F 1/1676* (2019.01)
(Continued)

(52) U.S. Cl.
CPC .......... *G06F 3/0446* (2019.05); *G02F 1/1676* (2019.01); *H01B 5/14* (2013.01);
(Continued)

(58) Field of Classification Search
CPC ................. G06F 3/0446; G06F 3/0445; G06F 2203/04102; G06F 2203/04112;
(Continued)

(56) References Cited

U.S. PATENT DOCUMENTS 10,424,648 B2 9/2019 Ogawa et al.
2009/0153032 A1* 6/2009 Tomai ...................... H01B 1/08
252/514

(Continued)

FOREIGN PATENT DOCUMENTS

CN 103003860 A 3/2013
EP 3483898 A1 5/2019
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2019/029916, dated Feb. 11, 2021, with English translation.

(Continued)

*Primary Examiner* — Deeprose Subedi
(74) *Attorney, Agent, or Firm* — Birch, Stewart, Kolasch & Birch, LLP

(57) ABSTRACT

An object of the present invention is to provide a conductive film further improved in at least any of mechanical characteristics, electrical characteristics, and optical characteristics while enjoying improvement in transparency by the thinning of a fine metal wire, and a conductive film roll, an electronic paper, a touch panel, and a flat-panel display comprising the same. The conductive film of the present invention is a (Continued)

conductive film comprising a transparent substrate and a conductive part comprising a fine metal wire pattern disposed on one side or both sides of the transparent substrate, wherein: the fine metal wire pattern is constituted by a fine metal wire; the fine metal wire comprises conductive metal atom M as well as at least any atom selected from silicon atom Si, oxygen atom O, and carbon atom C; and when the maximum thickness of the fine metal wire is defined as T in STEM-EDX analysis on the cross-section of the fine metal wire perpendicular to the direction of drawing of the fine metal wire, the fine metal wire contains at least any of the silicon atom Si, the oxygen atom O, and the carbon atom C at a predetermined ratio in the thickness direction.

17 Claims, 9 Drawing Sheets

(51) Int. Cl.
  *H01B 5/14*  (2006.01)
  *G02F 1/16757*  (2019.01)
  *G02F 1/167*  (2019.01)
(52) U.S. Cl.
  CPC .......... *G02F 1/167* (2013.01); *G02F 1/16757* (2019.01); *G06F 3/0445* (2019.05); *G06F 2203/04102* (2013.01); *G06F 2203/04112* (2013.01)
(58) Field of Classification Search
  CPC .... G02F 1/1676; G02F 1/16757; G02F 1/167; H01B 5/14
  See application file for complete search history.

(56) References Cited

U.S. PATENT DOCUMENTS

| | | | |
|---|---|---|---|
| 2010/0227176 A1* | 9/2010 | Kuji | .................... C23C 14/0635 427/249.17 |
| 2013/0122323 A1 | 5/2013 | Miki et al. | |
| 2014/0158951 A1 | 6/2014 | Yamanobe et al. | |
| 2016/0231861 A1 | 8/2016 | Nagata et al. | |
| 2018/0171159 A1 | 6/2018 | Ooi et al. | |
| 2019/0235670 A1 | 8/2019 | Matsubara et al. | |
| 2020/0013521 A1 | 1/2020 | Ohno et al. | |
| 2020/0170125 A1 | 5/2020 | Saito et al. | |

FOREIGN PATENT DOCUMENTS

| | | |
|---|---|---|
| EP | 3 660 112 A1 | 6/2020 |
| JP | 8-45352 A | 2/1996 |
| JP | 2009-99327 A | 5/2009 |
| JP | 2011-198642 A | 10/2011 |
| JP | 2013-67531 A | 4/2013 |
| JP | 2015-25197 A | 2/2015 |
| JP | 2015-072750 A | 4/2016 |
| JP | 2017-100368 A | 6/2017 |
| TW | 200923974 A | 6/2009 |
| TW | 201313655 A1 | 4/2013 |
| WO | WO 2007/029457 A1 | 3/2007 |
| WO | WO 2014/034920 A1 | 3/2014 |
| WO | WO 2015/012264 A1 | 1/2015 |
| WO | WO 2015/046261 A1 | 4/2015 |
| WO | WO 2016/002679 A1 | 1/2016 |
| WO | WO 2016/195047 A1 | 12/2016 |
| WO | WO 2018/008530 A1 | 1/2018 |
| WO | WO 2018/169012 A1 | 9/2018 |
| WO | WO 2019/017363 A1 | 1/2019 |
| WO | WO 2019/022230 A1 | 1/2019 |

OTHER PUBLICATIONS

International Search Report (PCT/ISA/210) issued in PCT/JP2019/029916, dated Oct. 29, 2019.
Supplementary European Search Report, dated Aug. 20. 2021, for European Application No. 19843510.9.
Written Opinion of the International Searching Authority (PCT/ISA/237) issued in PCT/JP2019/029916, dated Oct. 29, 2019.
Yamada et al., "Nanoparticle chemisorption printing technique for conductive silver patterning with submicron resolution," Nature Communications, vol. 7, 2016, pp. 1-9.
Wenxiu at al., "Research progress of transparent conductive films based on printed electronics," Imaging Science and Photochemistry, vol. 33, No. 3, 2015, pp. 251-263.

* cited by examiner

CONDUCTIVE FILM AND CONDUCTIVE FILM ROLL, ELECTRONIC PAPER, TOUCH PANEL AND FLAT-PANEL DISPLAY COMPRISING THE SAME

CROSS-REFERENCE TO RELATED APPLICATIONS

This application is a Divisional of copending application Ser. No. 17/264,502, filed on Jan. 29, 2021, which is the National Phase under 35 U.S.C. § 371 of International Application No. PCT/JP2019/029916, filed on Jul. 30, 2019, which claims the benefit under 35 U.S.C. § 119(a) to Patent Application No. 2018-142045, filed in Japan on Jul. 30, 2018, Patent Application No. 2018-142051, and filed in Japan on Jul. 30, 2018, and Patent Application No. 2018-142225, and filed in Japan on Jul. 30, 2018, all of which are hereby expressly incorporated by reference into the present application.

TECHNICAL FIELD

The present invention relates to a conductive film and a conductive film roll, an electronic paper, a touch panel and a flat-panel display comprising the same.

BACKGROUND ART

Transparent conductive films containing indium tin oxide (hereinafter, also referred to as "ITO") have heretofore been used in electronic devices such as electronic papers, touch panels, and flat-panel displays. Larger areas, improved responsiveness, and higher flexibility will be important for much higher-value added electronic devices. Hence, conductive films for use in these devices are required to improve conductivity and flexibility while maintaining their high transmittances.

Since ITO has an inherent low electrical conductivity, making ITO thickness thicker is needed to exert high conductivity although it leads to decline transmittances. Such ITO with more thicknesses easily causes cracks due to deformation such as bending, deflection, or flexion. It is therefore difficult for conductive films containing ITO to exert high transmittances, conductivity, and flexibility at the same time.

Accordingly, research and development are actively underway on conductive films serving as an alternative to ITO. Conductive films having a fine metal wire patterned on a transparent substrate have received attention. The fine metal wire has a higher electrical conductivity than that of ITO which is a metal oxide. Conductive films comprising this fine metal wire are expected to exhibit high conductivity. The fine metal wire also has high ductility. The conductive films comprising this fine metal wire are therefore excellent in conductivity and flexibility.

Unlike ITO, the fine metal wire itself is opaque. However, low visibility and high transmittance can be achieved by thinning the fine metal wire so as to have a line width of 5 μm or smaller. In this respect, Non Patent Literature 1 discloses a technique of preparing a fine metal wire having a minimum line width of 0.8 μm on a plastic substrate by printing.

On the other hand, a problem of the conductive films comprising the fine metal wire is that reducing conductivity is easily caused by the peeling of the fine metal wire from the transparent substrate which occurs due to deformation such as bending, deflection, or flexion in handling or device implementing. In response to such a problem, a method of forming a porous layer between a transparent plastic substrate and a fine metal wire pattern, and forming a transparent conductive protective layer on the fine metal wire pattern is known as a method for providing a transparent electrode comprising a fine metal wire pattern having favorable adhesion to a substrate (see, for example, Patent Literature 1).

Patent Literature 2 discloses that a metal wire composed mainly of copper is allowed to contain a second metal element such as silicon so that an alloy of copper and the second metal element can form a metal oxide layer on the interface of the metal wire, thereby improving adhesion to an organic layer which is a protective layer, thereby enhancing reliability.

CITATION LIST

Non Patent Literature

Non Patent Literature 1: Nature Communications 7, Article number: 11402

Patent Literature

Patent Literature 1: International Publication No. WO 2014/034920
Patent Literature 2: International Publication No. WO 2015/046261

SUMMARY OF INVENTION

Technical Problem

However, it is difficult to solve reduction in transparency by mere thinning of fine metal wires, because the fine metal wires are opaque. Furthermore, the mere thinning of fine metal wires as in Non Patent Literature 1 reduces conductivity. Hence, there is still room for improvement in order to improve conductivity while exerting high transparency.

Another problem of the thinning of fine metal wires is easy breaking of the fine metal wires due to deformation such as bending, deflection, or flexion. For example, the line width of the fine metal wire studied in Patent Literature 1 is 10 μm or larger. The studies of the present inventors have revealed that in the case of using a fine metal wire having a line width of, for example, 5 μm or smaller in order to improve transparency required for conductive films, even if a porous layer as described in Patent Literature 1 is used, the porous layer has an insufficient effect of suppressing the peeling of fine metal wires from transparent substrates ascribable to the deformation, such as bending, deflection, or flexion, of conductive films.

This is presumably because the fine metal wire having a line width of, for example, 5 μm or smaller cannot secure sufficient adhesion of the fine metal wire to a transparent substrate due to a small amount of conductive ink penetrating the porous layer and a small contact area between the fine metal wire and the transparent substrate, even if configured as described in Patent Literature 1.

Patent Literature 2 discloses improvement in the adhesion of a fine metal wire to an organic layer as a protective layer covering the fine metal wire. However, there is still room for improvement in mechanical characteristics, electrical characteristics, optical characteristics, and the like required for transparent conductive films.

The present invention has been made in light of these problems. An object of the present invention is to provide a conductive film further improved in at least any of mechanical characteristics, electrical characteristics, and optical characteristics while enjoying improvement in transparency by the thinning of a fine metal wire, and a conductive film roll, an electronic paper, a touch panel, and a flat-panel display comprising the same.

Solution to Problem

The present inventors have conducted diligent studies to attain the object. As a result, the present inventors have found that the object can be attained by allowing a conductive film having a fine metal wire to contain a predetermined amount of silicon atom Si with respect to conductive metal atom M in the fine metal wire, leading to the completion of the first embodiment according to the present invention.

Specifically, the first embodiment according to the present invention is as follows.

[1]

A conductive film comprising a transparent substrate and a conductive part comprising a fine metal wire pattern disposed on one side or both sides of the transparent substrate, wherein:

the fine metal wire pattern is constituted by a fine metal wire;

the fine metal wire comprises conductive metal atom M and silicon atom Si; and when the maximum thickness of the fine metal wire is defined as T in STEM-EDX analysis on a cross-section of the fine metal wire perpendicular to a direction of drawing of the fine metal wire, atom % ratio $Si/M_{0.10\text{-}0.90}$ of the silicon atom Si to the conductive metal atom M in a thickness region from 0.10 T to 0.90 T from a fine metal wire interface on the transparent substrate side is 0.001 or more and 0.070 or less.

[2]

The conductive film according to [1], wherein atom % ratio $Si/M_{0.10\text{-}0.25}$ in a thickness region from 0.10 T to 0.25 T from the fine metal wire interface on the transparent substrate side is 0.001 or more and 0.070 or less.

[3]

The conductive film according to [1] or [2], wherein atom % ratio $Si/M_{0.75\text{-}0.90}$ in a thickness region from 0.75 T to 0.90 T from the fine metal wire interface on the transparent substrate side is 0.001 or more and 0.070 or less.

[4]

The conductive film according to any of [1] to [3], wherein the conductive metal atom M comprises at least one or more metal elements selected from the group consisting of gold, silver, copper and aluminum.

[5]

The conductive film according to any of [1] to [4], wherein a line width of the fine metal wire is 0.1 μm or larger and 5.0 μm or smaller.

[6]

The conductive film according to any of [1] to [5], wherein an aspect ratio of the fine metal wire is 0.05 or more and 1.00 or less.

[7]

The conductive film according to any of [1] to [6], wherein a sheet resistance of the conductive film is 0.1 Ω/sq. or more and 1,000 Ω/sq. or less.

[8]

The conductive film according to any of [1] to [7], wherein a visible light transmittance of the conductive film is 80% or more and 100% or less.

[9]

The conductive film according to any of [1] to [8], wherein a haze of the conductive film is 0.01% or more and 5.00% or less.

[10]

The conductive film according to any of [1] to [9], wherein an aperture ratio of the fine metal wire pattern is 80% or more and less than 100%.

[11]

The conductive film according to any of [1] to [10], wherein the fine metal wire pattern is a mesh pattern.

[12]

The conductive film according to any of [1] to [10], wherein the fine metal wire pattern is a line pattern.

[13]

The conductive film according to any of [1] to [12], comprising an intermediate layer between the transparent substrate and the conductive part.

[14]

The conductive film according to [13], wherein the intermediate layer comprises at least one member selected from the group consisting of silicon oxide, silicon nitride, aluminum oxide, and magnesium fluoride.

[15]

A conductive film roll comprising a conductive film according to any of [1] to [14] wound into a roll.

[16]

An electronic paper comprising a conductive film according to any of [1] to [14].

[17]

A touch panel comprising a conductive film according to any of [1] to [14].

[18]

A flat-panel display comprising a conductive film according to any of [1] to [14].

The present inventors have conducted diligent studies and experiments to attain the object. As a result, the present inventors have found that the refractive index of a fine metal wire is adjusted by adjusting the composition of the fine metal wire, whereby reflective index of the fine metal wire is made closer to that of a transparent substrate, thereby further improving transparency, leading to the completion of the second embodiment according to the present invention.

Specifically, the second embodiment according to the present invention is as follows.

[1]

A conductive film comprising a transparent substrate and a conductive part comprising a fine metal wire pattern disposed on one side or both sides of the transparent substrate, wherein:

the fine metal wire pattern is constituted by a fine metal wire;

the fine metal wire comprises conductive metal atom M and oxygen atom O; and when the thickness of the fine metal wire is defined as T in STEM-EDX analysis on a cross-section of the fine metal wire perpendicular to a direction of drawing of the fine metal wire, atom % ratio $O/M_{0.10-0.90}$ of the oxygen atom O to the conductive metal atom M in a thickness region from 0.10 T to 0.90 T from a fine metal wire interface on the transparent substrate side is 0.01 or more and 1.00 or less.

[2]

The conductive film according to [1], wherein the atom % ratio O/M in the fine metal wire decreases gradually from the transparent substrate side toward the thickness direction of the fine metal wire.

[3]

The conductive film according to [1] or [2], wherein atom % ratio $O/M_{0.75-0.90}$ in a thickness region from 0.75 T to 0.90 T from the fine metal wire interface on the transparent substrate side is 0.25 or less.

[4]

The conductive film according to any one of [1] to [3], wherein atom % ratio $O/M_{0.10-0.25}$ in a thickness region from 0.10 T to 0.25 T from the fine metal wire interface on the transparent substrate side is 0.05 or more.

[5]

The conductive film according to any one of [1] to [4], wherein the conductive metal atom M comprises at least one or more metal elements selected from the group consisting of silver, copper, and aluminum.

[6]

The conductive film according to any one of [1] to [5], wherein the fine metal wire comprises at least one or more metal oxides selected from the group consisting of cuprous oxide, cupric oxide, silver oxide, and aluminum oxide.

[7]

The conductive film according to any one of [1] to [6], wherein a line width of the fine metal wire is 0.1 μm or larger and 5.0 μm or smaller.

[8]

The conductive film according to any one of [1] to [7], wherein an aspect ratio of the fine metal wire is 0.05 or more and 1.00 or less.

[9]

The conductive film according to any one of [1] to [8], wherein a sheet resistance of the conductive film is 0.1 Ω/sq or more and 1,000 Ω/sq or less.

[10]

The conductive film according to any one of [1] to [9], wherein a visible light transmittance of the conductive film is 80% or more and 100% or less.

[11]

The conductive film according to any one of [1] to [10], wherein a haze of the conductive film is 0.01% or more and 5.00% or less.

[12]

The conductive film according to any one of [1] to [11], wherein an aperture ratio of the fine metal wire pattern is 80% or more and less than 100%.

[13]

The conductive film according to any one of [1] to [12], wherein the fine metal wire pattern is a mesh pattern.

[14]

The conductive film according to any one of [1] to [12], wherein the fine metal wire pattern is a line pattern.

[15]

The conductive film according to any one of [1] to [14], comprising an intermediate layer between the transparent substrate and the conductive part.

[16]

The conductive film according to [15], wherein the intermediate layer comprises at least one member selected from the group consisting of silicon oxide, silicon nitride, aluminum oxide, and magnesium fluoride.

[17]

The conductive film according to [15] or [16], wherein a refractive index of the intermediate layer is smaller than that of the transparent substrate, and a theoretical refractive index of the fine metal wire in a thickness region from 0.10 T to 0.25 T from the fine metal wire interface on the transparent substrate side is smaller than the refractive index of the intermediate layer.

[18]

A conductive film roll comprising a conductive film according to any one of [1] to [17] wound into a roll.

[19]

An electronic paper comprising a conductive film according to any one of [1] to [17].

[20]

A touch panel comprising a conductive film according to any one of [1] to [17].

[21]

A flat-panel display comprising a conductive film according to any one of [1] to [17].

The present inventors have conducted diligent studies and experiments to attain the object. As a result, the present inventors have found that a conductive film having both of high conductivity and high adhesion between a transparent substrate and a fine metal wire can be obtained by adjusting the atom % ratio of carbon atom C to conductive metal atom M on the cross-section of the fine metal wire to a specific range, leading to the completion of the third embodiment according to the present invention.

Specifically, the third embodiment according to the present invention is as follows.

[1]

A conductive film comprising a transparent substrate and a conductive part comprising a fine metal wire pattern disposed on one side or both sides of the transparent substrate, wherein:

the fine metal wire pattern is constituted by a fine metal wire;

the fine metal wire comprises conductive metal atom M and carbon atom C;

when the thickness of the fine metal wire is defined as T in STEM-EDX analysis on a cross-section of the fine metal wire perpendicular to a direction of drawing of the fine metal wire, atom % ratio $C/M_{0.10-0.25}$ in a thickness region from 0.10 T to 0.25 T from a fine metal wire interface on the transparent substrate side is 0.3 or more and 6.0 or less; and a sheet resistance of the conductive film is 0.1 Ω/sq or more and 500 Ω/sq or less.

[2]

The conductive film according to [1], wherein
the fine metal wire further comprises oxygen atom O, and atom % ratio $O/M_{0.10-0.25}$ in a thickness region from 0.10 T to 0.25 T from the fine metal wire interface on the transparent substrate side is 0.05 or more.

[3]

The conductive film according to [1] or [2], wherein
the conductive metal atom M comprises at least one or more metal elements selected from the group consisting of gold, silver, copper and aluminum.

[4]

The conductive film according to any one of [1] to [3], wherein
a line width of the fine metal wire is 0.1 μm or larger and 5.0 μm or smaller.

[5]

The conductive film according to any one of [1] to [4], wherein
an aspect ratio of the fine metal wire is 0.05 or more and 1.00 or less.

[6]

The conductive film according to any one of [1] to [5], wherein
a visible light transmittance of the conductive film is 80% or more and 100% or less.

[7]

The conductive film according to any one of [1] to [6], wherein
a haze of the conductive film is 0.01% or more and 5.00% or less.

[8]

The conductive film according to any one of [1] to [7], wherein
an aperture ratio of the fine metal wire pattern is 80% or more and less than 100%.

[9]

The conductive film according to any one of [1] to [8], wherein
the fine metal wire pattern is a mesh pattern.

[10]

The conductive film according to any one of [1] to [8], wherein
the fine metal wire pattern is a line pattern.

The conductive film according to any one of [1] to [10], comprising
an intermediate layer between the transparent substrate and the conductive part.

[12]

The conductive film according to [11], wherein
the intermediate layer comprises at least one member selected from the group consisting of silicon oxide, silicon nitride, aluminum oxide, and magnesium fluoride.

[13]

A conductive film roll comprising
a conductive film according to any one of [1] to [12] wound into a roll.

[14]

An electronic paper comprising
a conductive film according to any one of [1] to [12].

[15]

A touch panel comprising
a conductive film according to any one of [1] to [12].

[16]

A flat-panel display comprising
a conductive film according to any one of [1] to [12].

Advantageous Effects of Invention

The present invention can provide a conductive film, a conductive film roll, an electronic paper, a touch panel, and a flat-panel display further improved in at least any of mechanical characteristics, electrical characteristics, and optical characteristics while enjoying improvement in transparency by the thinning of a fine metal wire.

DESCRIPTION OF EMBODIMENTS

Figure 1:
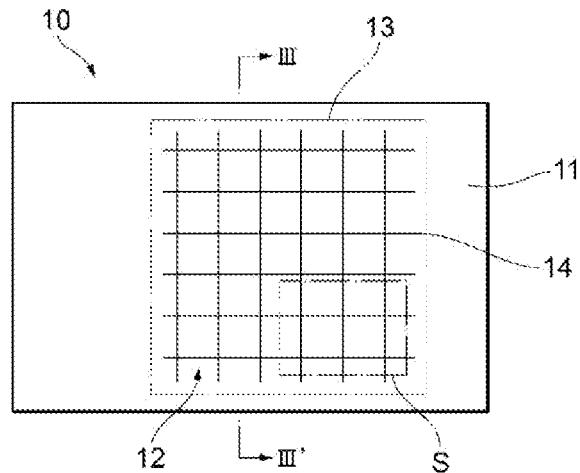
FIG. 1 shows a top view showing one form of the conductive films of the first to third embodiments having a mesh pattern.

Hereinafter, the embodiments of the present invention will be described in detail. However, the present invention is not limited by these embodiments, and various changes or modifications can be made therein without departing from the spirit of the present invention. The upper limit value and the lower limit value in each numeric range in the embodiments of the present invention can be arbitrarily combined to constitute an arbitrary numeric range.

First Embodiment

An object of the first embodiment is to provide a conductive film, a conductive film roll, an electronic paper, a touch panel, and a flat-panel display that are excellent in both conductivity and flexibility while maintaining their sufficient transparency.

First Embodiment: Conductive Film

The conductive film of the first embodiment is a conductive film comprising a transparent substrate and a conductive part comprising a fine metal wire pattern disposed on one side or both sides of the transparent substrate. The fine metal wire pattern is constituted by a fine metal wire; the fine metal wire comprises conductive metal atom M and silicon atom Si; and when the maximum thickness of the fine metal wire is defined as T in STEM-EDX analysis on the cross-section of the fine metal wire perpendicular to the direction of drawing of the fine metal wire, atom % ratio $Si/M_{0.10-0.90}$ of the silicon atom Si to the conductive metal atom M in a thickness region from 0.10 T to 0.90 T from the fine metal wire interface on the transparent substrate side is 0.001 or more and 0.070 or less.

The conductive film of the first embodiment contains a predetermined amount of the silicon atom Si with respect to the conductive metal atom M in the fine metal wire and is thereby excellent in conductivity and flexibility. The conductive film of the first embodiment which is excellent in flexibility can suppress the breaking of the fine metal wire ascribable to deformation such as flexion. The fine metal wire is formed, for example, by applying or printing ink mainly containing dispersed metal particles therein, or ink containing a metal complex or the like dissolved or dispersed therein onto a transparent substrate, drying and sintering the applied or printed ink. The fine metal wire thus formed is in a form where nanostructures containing the conductive metal atom M are contacted and/or joined with each other. Such a form tends to have a high specific resistance with respect to a bulk metal. For further improving the conductivity of the fine metal wire, it is important to form stronger contact and/or joint between the nanostructures. In this context, the present inventors have gained the finding that the strength of a metal is improved by adding a predetermined amount of silicon atom Si to the metal. On the basis of this finding, the present inventors have found that the contact or joint strength between nanostructures containing conductive metal atom M is improved by adding a predetermined amount of silicon atom Si with respect to the conductive metal atom M into the fine metal wire, and as a result, the conductivity and flexibility of the conductive film are improved.

In the conductive film of the first embodiment, the atom % ratio $Si/M_{0.10-0.90}$ is 0.001 or more, whereby conductivity and flexibility are excellent. In the conductive film of the first embodiment, the atom % ratio $Si/M_{0.10-0.90}$ is 0.070 or less, whereby reduction in conductivity caused by the inhibition of electronic conduction in the fine metal wire by the silicon atom Si can be suppressed. The atom % ratio $Si/M_{0.10-0.90}$ is 0.001 or more and 0.070 or less, whereby improvement in conductivity by strong joint between the conductive metal atoms M in the fine metal wire by the silicon atom Si contained therein can work predominantly over reduction in electronic conduction ascribable to the silicon atom Si contained therein, thereby improving both conductivity and flexibility. Hence, the conductive film of the first embodiment is excellent in conductivity and flexibility by having the atom % ratio $Si/M_{0.10-0.90}$ of 0.001 or more and 0.070 or less. From a similar viewpoint, the lower limit value of the atom % ratio $Si/M_{0.10-0.90}$ is preferably 0.003 or more, more preferably 0.005 or more. The upper limit value of the atom % ratio $Si/M_{0.10-0.90}$ is preferably 0.065 or less, more preferably 0.063 or less.

It is preferred that the above-described range of the atom % ratio Si/M of the silicon atom Si to the conductive metal atom M in the fine metal wire should be uniform in the thickness direction of the fine metal wire, i.e., the flexibility of the fine metal wire should be isotropic within the cross-section. This tends to prevent the fine metal wire from being broken even if the conductive film is bent in every direction. Hence, the lower limit value of atom % ratio $Si/M_{0.10-0.25}$ in a thickness region from 0.10 T to 0.25 T from the fine metal wire interface on the transparent substrate side is preferably 0.001 or more, more preferably 0.003 or more, further preferably 0.005 or more. The upper limit value of the atom % ratio $Si/M_{0.10-0.25}$ is preferably 0.070 or less, more preferably 0.065 or less, further preferably 0.063 or less. The lower limit value of atom % ratio $Si/M_{0.75-0.90}$ in a thickness region from 0.75 T to 0.90 T from the fine metal wire interface on the transparent substrate side is preferably 0.001 or more, more preferably 0.003 or more, further preferably 0.005 or more. The upper limit value of the atom % ratio $Si/M_{0.75-0.90}$ is preferably 0.070 or less, more preferably 0.065 or less, further preferably 0.063 or less.

Examples of the silicon compound include (poly)silanes, (poly)silazanes, (poly)silthianes, (poly)siloxanes, silicon, silicon carbide, silicon oxide, silicon nitride, silicon chloride, silicate, zeolite, and silicide. These polysilanes, polysilazanes, polysilthianes, and polysiloxanes may be in a linear or branched, cyclic, or net-like form. One of these silicon compounds is used singly, or two or more thereof are used in combination.

The silicon atom Si contained in the fine metal wire may exist in the form of a silicon atom or a silicon compound, or may exist in a form where the silicon atom or the silicon compound is bonded to the conductive metal atom M (e.g., Si-M and Si—O-M).

The conductive metal atom M described herein is preferably at least one or more metal elements selected from gold, silver, copper, and aluminum, more preferably silver or copper, particularly preferably copper which is relatively inexpensive. Use of such a metal element tends to attain much better conductivity of the conductive film. The conductive metal atom M excludes the silicon atom Si.

In the present specification, the atom % ratios $Si/M_{0.10-0.09}$, $Si/M_{0.10-0.25}$, and $Si/M_{0.75-0.90}$ of the silicon atom Si to the conductive metal atom M obtained by STEM-EDX analysis on the cross-section of the fine metal wire perpendicular to the direction of drawing of the fine metal wire are each determined by a method given below. The formation of the cross-section of the fine metal wire or the STEM-EDX analysis mentioned later is preferably performed in an inert atmosphere of argon or the like or in vacuum from the viewpoint of preventing the oxidation or contamination of the fine metal wire cross-section.

A measurement sample is preferably a thin section including the cross-section of the fine metal wire perpendicular to the direction of drawing of the fine metal wire. Hence, the conductive film may be embedded, if necessary, in a support such as epoxy resin, and then, the thin section can be formed by use of a method mentioned later. The method for forming the cross-section of the fine metal wire is not particularly limited as long as the method can suppress damage on the fine metal wire cross-section ascribable to the formation or processing of the cross-section. Preferably, a processing method using ion beam (e.g., BIB (broad ion beam) and FIB (focused ion beam) processing methods), precision machine polishing, an ultramicrotome, or the like can be used.

The formed cross-section of the fine metal wire is observed under a scanning transmission electron microscope (STEM) to obtain a STEM image of the cross-section of the fine metal wire. At the same time, elemental mapping on the cross-section of the fine metal wire is measured by energy dispersive X-ray spectroscopy (EDX).

Maximum thickness T from the fine metal wire interface on the transparent substrate side to the fine metal wire surface is calculated from the STEM image of the fine metal wire cross-section. In this context, the "maximum thickness T" refers to the maximum thickness among thicknesses from the fine metal wire interface on the transparent substrate side to the fine metal wire surface. Si atom % is calculated from an integrated EDX intensity value of the K shells of silicon atoms Si in a thickness region from 0.10 T to 0.90 T from the fine metal wire interface on the transparent substrate side. M atom % is calculated from an integrated EDX intensity value of the K shells of conductive metal atoms M in the thickness region from 0.10 T to 0.90 T from the fine metal wire interface on the transparent substrate side. Thus, the atom % ratio $Si/M_{0.10-0.90}$ can be calculated. $Si/M_{0.10-0.25}$ and $Si/M_{0.75-0.90}$ can also be calculated by similar approaches.

FIG. 1 shows a top view of the conductive film having a mesh pattern as the fine metal wire pattern, as one form of the conductive film of the first embodiment. Conductive film 10 of the first embodiment has conductive part 13 comprising fine metal wire pattern 12 on transparent substrate 11.

An extraction electrode (not shown) for connection to a controller, etc. may be formed, in addition to the conductive part 13, on the transparent substrate 11 according to the application of use of the conductive film 10. The transparent substrate 11 can have the conductive part 13 on one side or both sides and may have a plurality of conductive parts 13 on one side. The conductive part 13 comprises fine metal wire pattern 12 configured so as to be energizable or chargeable. When the conductive film 10 of the first embodiment is integrated into an electronic device, the conductive part 13 functions as a transparent electrode for the screen portion of an electronic paper, a touch panel, or a flat-panel display, etc.

[Transparent Substrate]

The term "transparent" of the transparent substrate means that the visible light transmittance is preferably 80% or more, more preferably 90% or more, further preferably 95% or more. In this context, the visible light transmittance can be measured in accordance with JIS K 7361-1: 1997.

Examples of the material of the transparent substrate include, but are not particularly limited to: transparent inorganic substrates such as glass; and transparent organic substrates such as acrylic acid ester, methacrylic acid ester, polyethylene terephthalate, polybutylene terephthalate, polyethylene naphthalate, polycarbonate, polyarylate, polyvinyl chloride, polyethylene, polypropylene, polystyrene, nylon, aromatic polyamide, polyether ether ketone, polysulfone, polyethersulfone, polyimide, and polyetherimide. Among them, use of polyethylene terephthalate attains better productivity (cost reduction effect) for producing the conductive film. Use of polyimide attains better heat resistance of the conductive film. Use of polyethylene terephthalate and/or polyethylene naphthalate attains better adhesion of the transparent substrate to the fine metal wire.

The transparent substrate may be made of one material or may be made of two or more materials laminated with each other. When the transparent substrate is multi-layered such that two or more materials are laminated with each other, the transparent substrate may be made of organic substrates or inorganic substrates laminated with each other or may be made of an organic substrate(s) and an inorganic substrate(s) laminated with each other.

The thickness of the transparent substrate is preferably 5 μm or larger and 500 μm or smaller, more preferably 10 μm or larger and 100 μm or smaller.

[Intermediate Layer]

An intermediate layer may be disposed between the transparent substrate and the conductive part. Examples of the component contained in the intermediate layer include, but are not particularly limited to, silicon compounds (e.g., (poly)silanes, (poly)silazanes, (poly)silthianes, (poly)siloxanes, silicon, silicon carbide, silicon oxide, silicon nitride, silicon chloride, silicate, zeolite, and silicide), aluminum compounds (e.g., aluminum oxide), and magnesium compounds (e.g., magnesium fluoride). Among them, at least one member selected from the group consisting of silicon oxide, silicon nitride, aluminum oxide, and magnesium fluoride is preferred. Use of such a component tends to further improve the transparency and durability of the conductive film and attains better productivity (cost reduction effect) for producing the conductive film. The intermediate layer can be prepared by a vapor deposition such as PVD or CVD, or a layer formation method of applying and drying an intermediate-forming composition containing the component for the intermediate layer dispersed in a dispersion medium. The intermediate-forming composition may contain, if necessary, a dispersant, a surfactant, a binder, or the like.

The thickness of the intermediate layer is preferably 0.01 μm or larger and 500 μm or smaller, more preferably 0.05 μm or larger and 300 μm or smaller, further preferably 0.10 μm or larger and 200 μm or smaller. The thickness of the intermediate layer is 0.01 μm or larger, whereby the adhesion of the intermediate layer to the fine metal wire is exerted. The thickness of the intermediate layer is 500 μm or smaller, whereby the flexibility of the transparent substrate can be ensured.

The intermediate layer laminated on the transparent substrate can prevent plasma or the like from etching the transparent substrate at a site uncovered with the fine metal wire pattern part when a metal component in ink is sintered by a sintering process such as plasma.

This intermediate layer preferably further has an antistatic function in order to prevent the breaking of the fine metal wire pattern ascribable to static electricity. For the intermediate layer having an antistatic function, it is preferred that the intermediate layer should comprise at least any of a conductive inorganic oxide and a conductive organic compound.

The volume resistivity of the intermediate layer is preferably 100 Ωcm or more and 100000 Ωcm or less, more preferably 1000 Ωcm or more and 10000 Ωcm or less, still more preferably 2000 Ωcm or more and 8000 Ωcm or less. The volume resistivity of the intermediate layer is 100000 Ωcm or less, whereby an antistatic function can be exerted.

The volume resistivity of the intermediate layer is 100 Ωcm or more, whereby the resulting conductive film can be suitably used for applications such as touch panels for which high electrical conduction between fine metal wire patterns is undesirable.

The volume resistivity can be adjusted by the content of the conductive inorganic oxide, the conductive organic compound, or the like in the intermediate layer. When the intermediate layer comprises, for example, highly plasma-resistant silicon oxide (volume specific resistance: $10^{14}$ Ω·cm or more) and an organosilane compound as the conductive organic compound, the volume resistivity can be reduced by increasing the content of the organosilane compound. On the other hand, the thin intermediate layer can be formed not to impair optical characteristics by increasing the content of the silicon oxide, because of its high plasma resistance, although the volume resistivity is increased.

[Conductive Part]

The conductive part comprises a fine metal wire pattern constituted by a fine metal wire disposed on the transparent substrate. The fine metal wire pattern may be a regular pattern or an irregular pattern.

The fine metal wire comprises conductive metal atom M and may comprise a non-conductive component in addition to the conductive component responsible for conductivity. Examples of the non-conductive component include, but are not particularly limited to, metal oxides, metal compounds, and organic compounds. Examples of these non-conductive components include metal oxides, metal compounds, and organic compounds that are components derived from components contained in ink mentioned later and remain in the fine metal wire after sintering among the components contained in ink. The content ratio of the conductive component is preferably 50% by mass or more, more preferably 60% by mass or more, further preferably 70% by mass or more. The upper limit of the content ratio of the conductive component is not particularly limited and is 100% by mass. The content ratio of the non-conductive component is preferably 50% by mass or less, more preferably 40% by mass or less, further preferably 30% by mass or less. The lower limit of the content ratio of the non-conductive component is not particularly limited and is 0% by mass.

(Fine Metal Wire Pattern)

Figure 2:
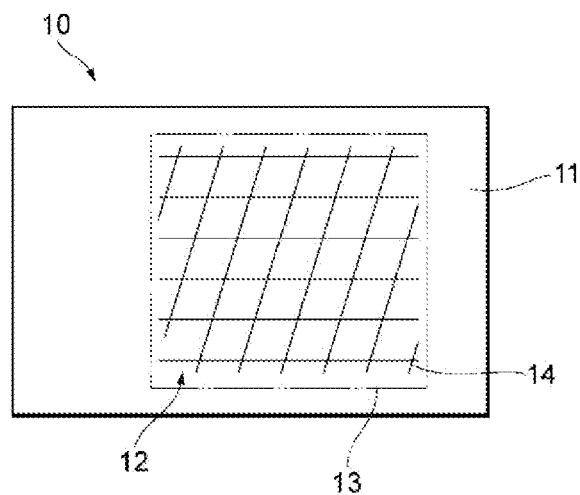
FIG. 2 shows a top view showing another form of the conductive films of the first to third embodiments having a mesh pattern.
Figure 3:
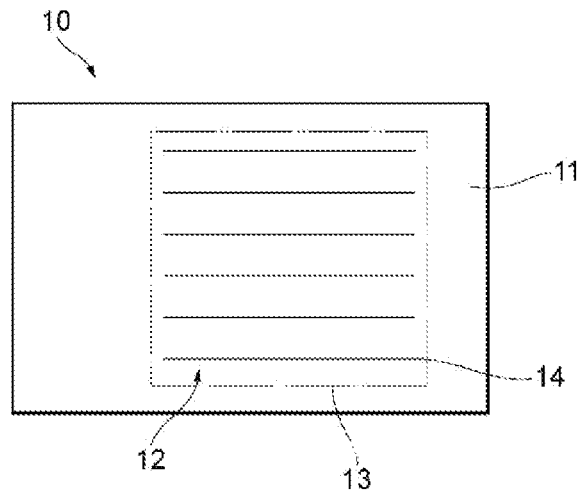
FIG. 3 shows a top view showing one form of the conductive films of the first to third embodiments having a line pattern.
Figure 4:
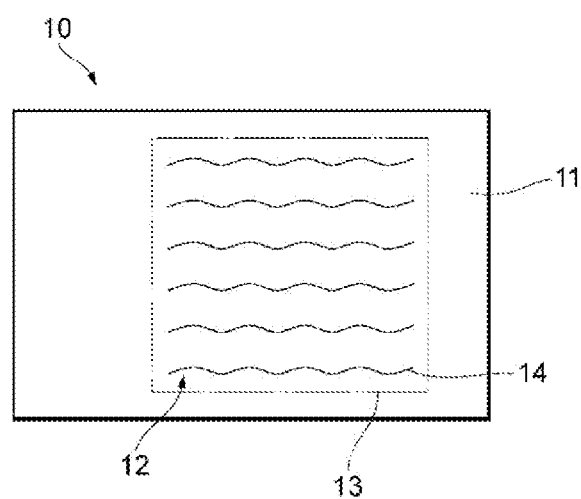
FIG. 4 shows a top view showing another form of the conductive films of the first to third embodiments having a line pattern.

The fine metal wire pattern can be designed according to the application of an intended electronic device. Examples thereof include, but are not particularly limited to, a mesh pattern (FIGS. 1 and 2) formed by a plurality of lines of the fine metal wire intersecting in a net-like form, and a line pattern (FIGS. 3 and 4) formed by a plurality of substantially parallel lines of the fine metal wire. Alternatively, the fine metal wire pattern may be a combination of the mesh pattern and the line pattern. The mesh of the mesh pattern may have a square or rectangular shape as shown in FIG. 1 or may have a polygonal shape such as a rhombus as shown in FIG. 2. The fine metal wire constituting the line pattern may be a straight line as shown in FIG. 3 or may be a curved line as shown in FIG. 4. The fine metal wire constituting the mesh pattern can also be a curved line.

Figure 5:
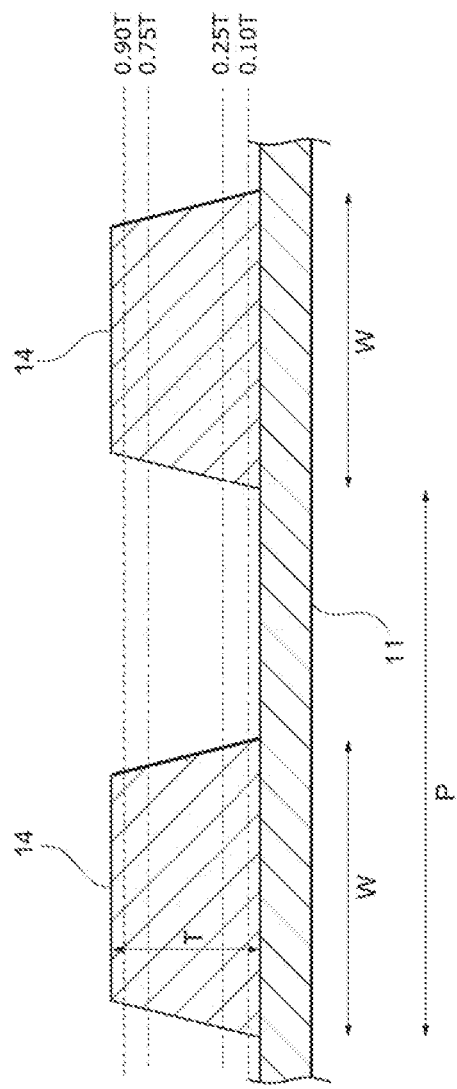
FIG. 5 shows a partial cross-sectional view taken along the III-III' line in the conductive film of FIG. 1. This drawing is for illustrating the cross-section of the fine metal wire of the first embodiment.

Line width W of the fine metal wire of the first embodiment refers to the line width of the fine metal wire 14 when the fine metal wire 14 is projected onto the surface of the transparent substrate 11 from the side where the fine metal wire pattern 12 is disposed, of the transparent substrate 11. Referring to FIG. 5, the line width W of fine metal wire 14 having a trapezoidal cross-section is the width on the side contacted with the transparent substrate 11, of the fine metal wire 14. The line width W and thickness T of the fine metal wire pattern, 0.10 T, 0.25 T, 0.75 T and 0.90 T are each defined as shown in FIG. 5. Pitch P is the sum of the line width W and the distance between lines of the fine metal wire.

The line width W of the fine metal wire of the first embodiment is, for example, 0.1 μm or larger and 5.0 μm or smaller, preferably 0.2 μm or larger and 4.0 μm or smaller, more preferably 0.3 μm or larger and 3.0 μm or smaller, further preferably 0.4 μm or larger and 2.5 μm or smaller. When the line width W of the fine metal wire is 0.1 μm or larger, sufficient conductivity of the fine metal wire can be secured. Furthermore, reduction in conductivity ascribable to the oxidation, corrosion, or the like of the fine metal wire surface can be sufficiently suppressed. A thinner line width of the fine metal wire permits increase in the number of lines of the fine metal wire at the same aperture ratio. This attains more uniform electrical field distribution of the conductive film so that this enables a higher-resolution electronic device to be fabricated. If some lines of the fine metal wire are broken, this influence can be compensated for by the other lines of the fine metal wire. On the other hand, when the line width W of the fine metal wire is 5.0 μm or smaller, the visibility of the fine metal wire is further reduced. Thus, the transparency of the conductive film tends to be further improved.

The thickness T of the fine metal wire is preferably 10 nm or larger and 1,000 nm or smaller. The lower limit of the thickness T is more preferably 50 nm or larger, further preferably 75 nm or larger. The thickness T of the fine metal wire is 10 nm or larger, whereby conductivity tends to be further improved. Reduction in conductivity ascribable to the oxidation, corrosion, or the like of the fine metal wire surface tends to be able to be sufficiently suppressed. On the other hand, the thickness T of the fine metal wire is 1,000 nm or smaller, whereby high transparency can be exerted in a wide view angle.

(Aspect Ratio)

The aspect ratio represented by the thickness T of the fine metal wire to the line width W of the fine metal wire is preferably 0.05 or more and 1.00 or less. The lower limit of the aspect ratio is more preferably 0.08 or more, further preferably 0.10 or more. A higher aspect ratio tends to be able to further improve conductivity without reducing transmittances.

(Pitch)

The pitch P of the fine metal wire pattern is preferably 5 μm or larger, more preferably 50 μm or larger, further preferably 100 μm or larger. The pitch P of the fine metal wire pattern is 5 μm or larger, whereby a favorable transmittance can be obtained. The pitch P of the fine metal wire pattern is preferably 1,000 μm or smaller, more preferably 500 μm or smaller, further preferably 250 μm or smaller. The pitch P of the fine metal wire pattern is 1,000 μm or smaller, whereby conductivity tends to be able to be further improved. When the shape of the fine metal wire pattern is a mesh pattern, an aperture ratio of 99% can be attained by setting the pitch to 200 μm of a fine metal wire pattern having a line width of 1 μm.

The line width, aspect ratio, and pitch of the fine metal wire pattern can be confirmed by observing the conductive film cross-section under an electron microscope or the like. The line width and pitch of the fine metal wire pattern can also be observed under a laser microscope or an optical microscope. Since the pitch and the aperture ratio have a relational expression mentioned later, one of these factors can be calculated if the other factor is known. Examples of the method for adjusting the line width, aspect ratio, and pitch of the fine metal wire pattern to the desired ranges include a method of adjusting grooves of a printing plate for use in a method for producing the conductive film mentioned later, and a method of adjusting the average particle size of metal particles in ink.

(Aperture Ratio)

The aperture ratio of the fine metal wire pattern is preferably 60% or more, more preferably 70% or more, further preferably 80% or more, particularly preferably 90% or more. The aperture ratio of the fine metal wire pattern is equal to or more than the specific value mentioned above, whereby the transmittance of the conductive film tends to be further improved. The aperture ratio of the fine metal wire pattern is preferably less than 100%, more preferably 95% or less, further preferably 90% or less, still further preferably 80% or less, even further preferably 70% or less, particularly preferably 60% or less. The aperture ratio of the fine metal wire pattern is equal to or less than the specific value mentioned above, whereby the conductivity of the conductive film tends to be further improved. The aperture ratio of the fine metal wire pattern also differs in appropriate value depending on the shape of the fine metal wire pattern. The upper limit value and lower limit value of the aperture ratio of the fine metal wire pattern can be appropriately combined according to the required performance (transmittance and sheet resistance) of an intended electronic device.

The "aperture ratio of the fine metal wire pattern" can be calculated according to an expression given below as to a region where the fine metal wire pattern is formed on the transparent substrate. The region where the fine metal wire pattern is formed on the transparent substrate is a range represented by S in FIG. 1 and excludes a marginal part and the like where the fine metal wire pattern is not formed.

Aperture ratio of the fine metal wire pattern=(1−Area occupied by the fine metal wire pattern/Area of the transparent substrate)×100

Figure 6:
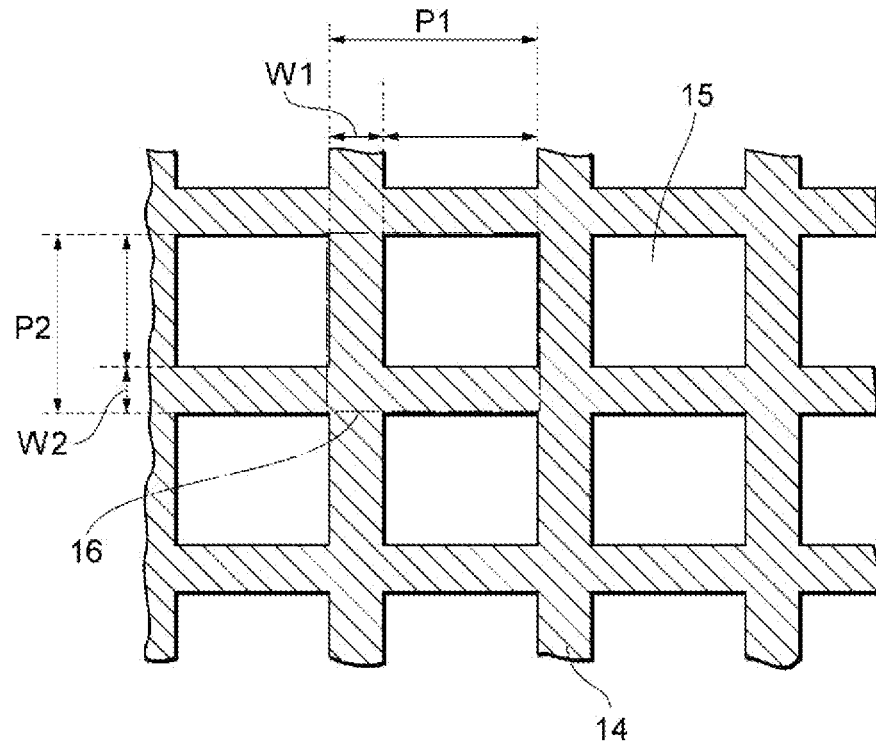
FIG. 6 shows a top view of a fine metal wire pattern for illustrating the relationship between the aperture ratios and the pitches of the conductive films of the first to third embodiments having a mesh pattern.

The relational expression of the aperture ratio and the pitch differs depending on the shape of the fine metal wire pattern. Their relationship can be calculated as given below. FIG. 6 shows a schematic view of a mesh pattern (grid pattern) having pattern unit 16. In the case of this mesh pattern, the aperture ratio and the pitch have the following relational expression:

Aperture ratio={Area of opening part 15/Area of pattern unit 16}×100={((Pitch $P1$−Line width $W1$)×(Pitch $P2$−Line width $W2$))/(Pitch $P1$× Pitch $P2$)}×100

Figure 7:
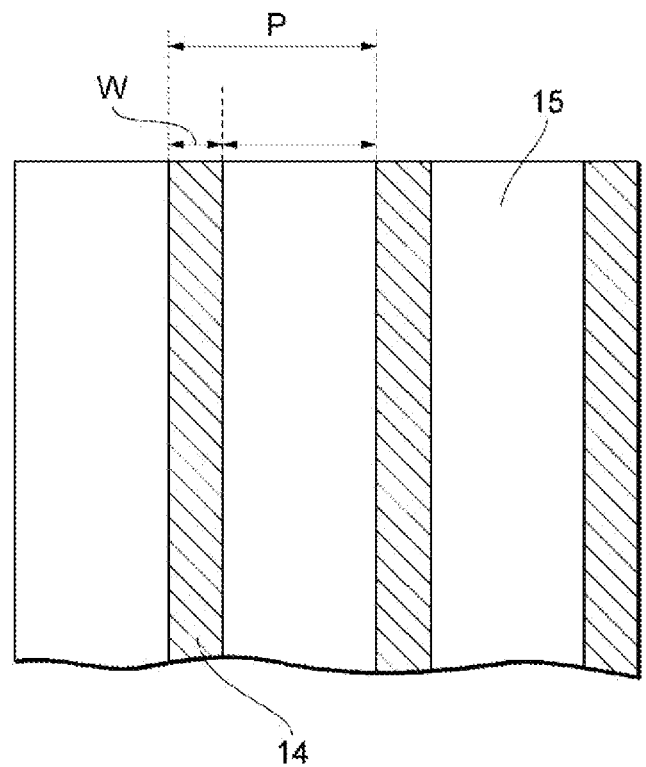
FIG. 7 shows a top view of a fine metal wire pattern for illustrating the relationship between the aperture ratios and the pitches of the conductive films of the first to third embodiments having a line pattern.

FIG. 7 shows a schematic view of a line pattern. In the case of this line pattern, the aperture ratio and the pitch have the following relational expression:

Aperture ratio={(Pitch $P$−Line width $W$)/Pitch $P$}×100

(Sheet Resistance)

The sheet resistance of the conductive film is preferably 0.1 Ω/sq or more and 1,000 Ω/sq or less, more preferably 0.1 Ω/sq or more and 500 Ω/sq or less, further preferably 0.1 Ω/sq or more and 100 Ω/sq or less, still further preferably 0.1 Ω/sq or more and 20 Ω/sq or less, even further preferably 0.1 Ω/sq or more and 10 Ω/sq or less. The sheet resistance of the conductive film can be measured by a method given below.

First, a rectangular portion throughout which the fine metal wire pattern is disposed is cut out of the conductive film to obtain a measurement sample. Current collector parts for sheet resistance measurement electrically connected to the fine metal wire pattern are formed at both ends of the obtained measurement sample. Electrical resistance R (Ω) between the current collector parts disposed at both ends is measured. Sheet resistance $R_s$ (Ω/sq) can be calculated according to the following expression from the electrical resistance R (Ω) mentioned above, length L (mm) in the width direction corresponding to the distance between the current collector parts of the measurement sample, and length D (mm) in the depth direction.

$$R_s = R/L \times D$$

A lower sheet resistance tends to suppress power loss. Hence, an electronic paper, a touch panel, and a flat-panel display having less power consumption can be obtained.

The sheet resistance of the conductive film tends to be reduced by improving the aspect ratio (height) of the fine metal wire. The sheet resistance may be adjusted by selecting the type of the metal material constituting the fine metal wire.

(Visible Light Transmittance)

The visible light transmittance of the conductive film is preferably 80% or more and 100% or less, more preferably 90% or more and 100% or less. In this context, the visible light transmittance can be measured in accordance with JIS K 7361-1: 1997 for total light transmittance by calculating the transmittance in a range of the visible light (360 to 830 nm).

The visible light transmittance of the conductive film tends to be improved by decreasing the line width of the fine metal wire pattern or by increasing the aperture ratio thereof.

(Haze)

The haze of the conductive film is preferably 0.01% or more and 5.00% or less. The upper limit of the haze is more preferably 3.00% or less, further preferably 1.00% or less. When the upper limit of the haze is 5.00% or less, the cloudiness of the conductive film to visible light can be sufficiently reduced. The haze described herein can be measured in accordance with JIS K 7136: 2000 for haze.

First Embodiment: Method for Producing Conductive Film

Examples of the method for producing the conductive film of the first embodiment include a method having a pattern formation step of forming a pattern on a transparent substrate using ink containing a metal component, and a sintering step of sintering the ink to form a fine metal wire. In this case, the method for producing the conductive film of the first embodiment may comprise an intermediate layer formation step of forming an intermediate layer on the surface of the transparent substrate, prior to the pattern formation step.

[Intermediate Layer Formation Step]

A specific example of the intermediate layer formation step includes a method of forming an intermediate layer by the layer formation of an intermediate layer-forming component on the surface of the transparent substrate by use of a vapor deposition such as PVD or CVD. Another specific example of the intermediate layer formation step includes a method of forming an intermediate layer by applying an intermediate-forming composition containing an intermediate layer-forming component dispersed in a dispersion medium onto the surface of the transparent substrate, followed by drying. Examples of the intermediate layer-forming component include the components listed in the section

[Intermediate layer]. The intermediate layer-forming composition may contain, if necessary, a dispersant, a surfactant, a binder, or the like.

In the intermediate layer formation step, a silicon compound is preferably used as the intermediate layer-forming component. Specifically, the intermediate layer formation step is preferably the step of forming an intermediate layer containing a silicon compound on the surface of the transparent substrate, prior to the pattern formation step. Use of the silicon compound can migrate a silicon atom from the intermediate layer containing the silicon compound to the fine metal wire in the sintering step and therefore tends to be able to control atom % ratio Si/M within the desired range. Examples of the silicon compound include the silicon compounds listed in the section [Intermediate layer].

[Pattern Formation Step]

The pattern formation step is the step of forming a pattern using ink containing a metal component. The pattern formation step is not particularly limited as long as the step is performed by a plate printing method using a printing plate having grooves of the desired fine metal wire pattern. Such a method has, for example, the steps of: coating transfer medium surface with ink; allowing the transfer medium surface coated with ink to face the protruding portion surface of a relief printing plate, and pressing and contacting these surfaces to transfer the ink on the transfer medium surface to the protruding portion surface of the relief printing plate; and allowing the transfer medium surface coated with ink to face the surface of the transparent substrate, and pressing and contacting these surfaces to transfer the ink remaining on the transfer medium surface to the surface of the transparent substrate. When the intermediate layer is formed on the transparent substrate, the ink is transferred to the intermediate layer surface.

(Ink)

The ink for use in the pattern formation step contains a metal component containing conductive metal atom M, and a solvent and may contain, if necessary, a surfactant, a dispersant, a reducing agent, or the like. The metal component may be contained as metal particles in the ink or may be contained as a metal complex in the ink.

The average primary particle size of the metal particles is preferably 100 nm or smaller, more preferably 50 nm or smaller, further preferably 30 nm or smaller. The lower limit of the average primary particle size of the metal particles is not particularly limited and is, for example, 1 nm or larger. The average primary particle size of the metal particles is 100 nm or smaller, whereby the line width W of the resulting fine metal wire can be further thinned. In the first embodiment, the "average primary particle size" refers to the particle size of each individual metal particle (so-called primary particle) and is distinguished from an average secondary particle size which is the particle size of an aggregate (so-called secondary particle) formed by a plurality of metal particles together.

The metal particles may be in the form of a metal oxide such as copper oxide, a metal compound, or core/shell particles having copper in the core part and copper oxide in the shell part, as long as the metal particles contain conductive metal atom M. The form of the metal particles can be appropriately determined from the viewpoint of dispersibility and sinterability.

In the pattern formation step, the ink may contain a silicon compound in order to control atom % ratio Si/M within the desired range. Examples of the silicon compound include the silicon compounds listed in the section [Intermediate layer].

The content of the silicon compound is preferably 0.01 parts by mass or more and 10.0 parts by mass or less, more preferably 0.05 parts by mass or more and 7.5 parts by mass or less, further preferably 0.1 parts by mass or more and 5.0 parts by mass or less, based on 100 parts by mass in total of the ink excluding the silicon compound. The content of the silicon compound falls within the range described above, whereby atom % ratio Si/M tends to be able to be controlled within the desired range.

Examples of the surfactant include, but are not particularly limited to, fluorine surfactants. Use of such a surfactant improves the coatability of a transfer medium (blanket) with the ink and the smoothness of the ink used in coating and tends to produce a more uniform coating film. The surfactant is preferably configured so as to permit dispersion of the metal component and to be less likely to remain in sintering.

Examples of the dispersant include, but are not particularly limited to, a dispersant that noncovalently binds to or interacts with the metal component surface, and a dispersant that covalently binds to the metal component surface. Examples of the functional group for noncovalent binding or interaction include dispersants having a phosphoric acid group. Use of such a dispersant tends to further improve the dispersibility of the metal component.

Examples of the solvent include: alcohol solvents such as monoalcohols and polyalcohols; alkyl ether solvents; hydrocarbon solvents; ketone solvents; and ester solvents. These solvents may be used singly, or one or more thereof may be used in combination. For example, a monoalcohol having 10 or less carbon atoms and a polyalcohol having 10 or less carbon atoms are used in combination. Use of such a solvent tends to further improve the coatability of a transfer medium (blanket) with the ink, the transferability of the ink from a transfer medium to a relief printing plate, the transferability of the ink from the transfer medium to the transparent substrate, and the dispersibility of the metal component. The solvent is preferably configured so as to permit dispersion of the metal component and to be less likely to remain in sintering.

In the production method of the first embodiment, a medium containing a silicon compound may be contacted with the ink at the time of pattern formation or before sintering so that a silicon atom or the silicon compound contained in the medium is migrated into the ink, in order to control atom % ratio Si/M within the desired range.

[Sintering Step]

In the sintering step, for example, the metal component in the ink transferred to the surface of the transparent substrate or the intermediate layer is sintered. The sintering is not particularly limited as long as the method therefor can form a metal component sintered film by the fusion of the metal component. The sintering may be performed in, for example, a sintering furnace, or may be performed using plasma, a heating catalyst, ultraviolet ray, vacuum ultraviolet ray, electron beam, infrared lamp annealing, flash lamp annealing, laser, or the like. If the resulting sintered film is easily oxidized, the sintering is preferably performed in a non-oxidative atmosphere. If the metal oxide or the like is difficult to reduce with only the reducing agent that may be contained in the ink, the sintering is preferably performed in a reductive atmosphere.

The non-oxidative atmosphere is an atmosphere free from an oxidative gas such as oxygen and includes an inert atmosphere and a reductive atmosphere. The inert atmosphere is an atmosphere filled with an inert gas, for example, argon, helium, neon, or nitrogen. The reductive atmosphere refers to an atmosphere where a reductive gas such as hydrogen or carbon monoxide exists. A sintering furnace may be filled with such a gas, and the ink-coated film (dispersion-coated film) can be sintered in a closed system. Alternatively, the dispersion-coated film may be sintered in the circulated system of a sintering furnace where such a gas is allowed to flow. In the case of sintering the dispersion-coated film in a non-oxidative atmosphere, it is preferred that the sintering furnace should be temporarily vacuumized so that oxygen in the sintering furnace is removed and replaced with a non-oxidative gas. The sintering may be performed in a pressurized atmosphere or may be performed in a reduced pressure atmosphere.

The sintering temperature is not particularly limited and is preferably 20° C. or higher and 400° C. or lower, more preferably 50° C. or higher and 300° C. or lower, further preferably 80° C. or higher and 200° C. or lower. The sintering temperature of 400° C. or lower is preferred because a low heat-resistant substrate can be used. The sintering temperature of 20° C. or higher is preferred because the formation of a sintered film tends to proceed sufficiently, resulting in favorable conductivity. The resulting sintered film contains a conductive component derived from the metal component and may additionally contain the component used in the ink, or a non-conductive component according to the sintering temperature.

As described above, the first embodiment of the present invention can provide a conductive film, a conductive film roll, an electronic paper, a touch panel and a flat-panel display that are excellent in both conductivity and flexibility while maintaining their sufficient transparency.

Second Embodiment

An object of the second embodiment is to provide a conductive film that exerts better transparency, and a conductive film roll, an electronic paper, a touch panel, and a flat-panel display comprising the same.

Second Embodiment: Conductive Film

The conductive film of the second embodiment is a conductive film comprising a transparent substrate and a conductive part comprising a fine metal wire pattern disposed on one side or both sides of the transparent substrate, wherein: the fine metal wire pattern is constituted by a fine metal wire; the fine metal wire comprises conductive metal atom M and oxygen atom 0; and when the thickness of the fine metal wire is defined as T in STEM-EDX analysis on the cross-section of the fine metal wire perpendicular to the direction of drawing of the fine metal wire, atom % ratio $O/M_{0.10-0.90}$ of the oxygen atom O to the conductive metal atom M in a thickness region from 0.10 T to 0.90 T from the fine metal wire interface on the transparent substrate side is 0.01 or more and 1.00 or less.

FIG. 1 shows a top view of the conductive film having a mesh pattern as the fine metal wire pattern, as one form of the conductive film of the second embodiment. Conductive film 10 of the second embodiment has conductive part 13 comprising fine metal wire pattern 12 on transparent substrate 11.

An extraction electrode (not shown) for connection to a controller, etc. may be formed, in addition to the conductive part 13, on the transparent substrate 11 according to the application of use of the conductive film 10. The transparent substrate 11 can have the conductive part 13 on one side or both sides and may have a plurality of conductive parts 13 on one side. The conductive part 13 comprises fine metal wire pattern 12 configured so as to be energizable or chargeable. When the conductive film 10 of the second embodiment is integrated into an electronic device, the conductive part 13 functions as a transparent electrode for the screen portion of an electronic paper, a touch panel, or a flat-panel display, etc.

In such a conductive film, a thinner line width of the fine metal wire can reduce the visibility of the fine metal wire and consequently improve transparency. However, since the fine metal wire itself is opaque, complete transparency is difficult to achieve.

By contrast, according to the second embodiment, the fine metal wire can have a refractive index closer to that of the transparent substrate by adjusting the atom % ratio between the conductive metal atom M and the oxygen atom O constituting the fine metal wire. The fine metal wire having a refractive index closer to that of the transparent substrate can suppress reflection or scattering that occurs on the refractive index interface between the fine metal wire and the transparent substrate, and reduce a haze, thereby further improving transparency even if, for example, a fine metal wire pattern having the same line width and the same aperture ratio is used. The conductive film comprising such a fine metal wire can be prepared by printing and is therefore also excellent from the viewpoint of cost reduction and reduction in environmental load as compared with a conductive film containing ITO, which involves film formation by a vacuum deposition method or a sputtering method.

[Conductive Part]

The conductive part comprises a fine metal wire pattern constituted by a fine metal wire disposed on the transparent substrate. The fine metal wire pattern may be a regular pattern or an irregular pattern. In the second embodiment, the fine metal wire constituting the fine metal wire pattern is configured so as to have a refractive index relatively close to that of the transparent substrate.

However, it is not easy to measure the refractive index of the fine metal wire itself formed very thinly. In light of this, in the second embodiment, atom % ratio O/M of the oxygen atom O to the conductive metal atom M on the cross-section of the fine metal wire perpendicular to the direction of drawing of the fine metal wire is set to a predetermined ratio as an indicator for the refractive index. Specifically, the conductive metal atom M and the oxygen atom O are considered to dominantly change the refractive index, because a metal and a metal oxide are dominant as constituents of the fine metal wire. Hence, the atom % ratio O/M of the oxygen atom O to the conductive metal atom M is set to a predetermined ratio. When the conductive metal atom M is, for example, copper, the refractive index of the fine metal wire wholly constituted by copper is 0.60 and the refractive index of the fine metal wire wholly constituted by copper oxide is 2.71. Thus, when the fine metal wire is constituted by copper and copper oxide, the refractive index is presumably adjusted therebetween by the compositional ratio thereof. When the conductive metal atom M is, for example, silver or aluminum, the refractive index of the fine metal wire wholly constituted by this conductive metal atom M is 0.14 (silver) and 1.34 (aluminum) and the refractive index of the fine metal wire wholly constituted by an oxide of this conductive metal atom M is 2.79 (silver oxide) and 1.77 (aluminum oxide). Thus, when the fine metal wire is constituted by any of silver and aluminum and an oxide of silver or aluminum, the refractive index is presumably adjusted therebetween by the compositional ratio thereof. In the second embodiment, the refractive index value thus calculated from the constituent atoms (or materials) and the compositional ratio thereof is also referred to as a theoretical refractive index.

From the viewpoint as described above, the atom % ratio $O/M_{0.10-0.90}$ is 0.01 or more and 1.00 or less, preferably 0.02 or more and 0.80 or less, more preferably 0.03 or more and 0.75 or less. The refractive index of the fine metal wire is further increased with increase in atom % ratio $O/M_{0.10-0.90}$ and further reduced with decrease in atom % ratio $O/M_{0.10-0.90}$. This renders the refractive index of the fine metal wire closer to that of the transparent substrate and further improves transparency. The ratio of the oxide is decreased with decrease in atom % ratio $O/M_{0.10-0.90}$. Therefore, conductivity tends to be further improved. The atom % ratio $O/M_{0.10-0.90}$ is 0.01 or more, whereby transparency is improved. On the other hand, the atom % ratio $O/M_{0.10-0.90}$ is 1.00 or less, whereby high conductivity can be exerted while favorable transparency is maintained.

The uneven distribution and even distribution of the oxygen atom O within the cross-section of the fine metal wire are not particularly limited. The oxygen atom O may be substantially evenly distributed throughout the cross-section of the fine metal wire, may be unevenly distributed in the fine metal wire interface, for example, on the transparent substrate side, or may be unevenly distributed on the surface side (side opposite to the transparent substrate side) of the fine metal wire. Among others, the atom % ratio O/M in the fine metal wire preferably has a tendency to decrease gradually from the transparent substrate side toward the thickness direction of the fine metal wire. Such a configuration tends to further improve transparency.

This principle is not particularly limited and is, for example, considered a model that is a film controlled optical characteristics such as a reflectance by laminating a plurality of layers differing in refractive index. Specifically, in the conductive film of the second embodiment, the fine metal wire whose atom % ratio O/M decreases gradually from the transparent substrate side toward the thickness direction of the fine metal wire can be taken into consideration as an approximation of the plurality of layers differing in refractive index in this model. However, the principle is not limited thereto.

The uneven distribution and even distribution of the oxygen atom O can be represented by atom % ratio O/M in a specific thickness region. For example, when atom % ratio O/M in a thickness region from 0.75 T to 0.90 T from the fine metal wire interface on the transparent substrate side is defined as atom % ratio $O/M_{0.75-0.90}$, the atom % ratio $O/M_{0.75-0.90}$ serves as an indicator that indicates the proportion of the oxygen atom O present in a region on the surface side of the fine metal wire. Such atom % ratio $O/M_{0.75-0.90}$ is preferably 0.25 or less, more preferably 0.22 or less, further preferably 0.18 or less. The atom % ratio $O/M_{0.75-0.90}$ is 0.25 or less, whereby conductivity tends to be further improved. In the second embodiment, T denotes the maximum thickness among thicknesses from the fine metal wire interface on the transparent substrate side to the fine metal wire surface and can be measured from an electron microscope photograph. The minimum value of the atom % ratio $O/M_{0.75-0.90}$ can be 0 from the viewpoint of improving conductivity.

When atom % ratio O/M in a thickness region from 0.10 T to 0.25 T from the fine metal wire interface on the transparent substrate side is defined as atom % ratio $O/M_{0.10-0.25}$, the atom % ratio $O/M_{0.10-0.25}$ serves as an indicator that indicates the proportion of the oxygen atom O present in a region on the interface side of the fine metal wire on the transparent substrate side. Such atom % ratio $O/M_{0.10-0.25}$ is preferably 0.05 or more, more preferably 0.06 or more, further preferably 0.07 or more. The atom % ratio $O/M_{0.10-0.25}$ is 0.05 or more, whereby transparency tends to be further improved. The atom % ratio $O/M_{0.10-0.25}$ is preferably 1.10 or less, more preferably 1.00 or less, further preferably 0.95 or less. The atom % ratio $O/M_{0.10-0.25}$ is 1.10 or less, whereby conductivity tends to be further improved.

In the second embodiment, the atom % ratio $O/M_{0.10-0.90}$, the atom % ratio $O/M_{0.75-0.90}$, and the atom % ratio $O/M_{0.10-0.25}$ can be determined by STEM-EDX analysis on the cross-section of the fine metal wire perpendicular to the direction of drawing of the fine metal wire.

Specifically, the fine metal wire is cut in a direction perpendicular to the direction of drawing of the fine metal wire to obtain a thin section having an exposed cross-section of the fine metal wire as a measurement sample. In this respect, the conductive film may be embedded, if necessary, in a support such as epoxy resin, and then, the thin section can be formed. The method for forming the cross-section of the fine metal wire is not particularly limited as long as the method can suppress damage on the fine metal wire cross-section ascribable to the formation or processing of the cross-section. Preferably, a processing method using ion beam (e.g., BIB (broad ion beam) and FIB (focused ion beam) processing methods), precision machine polishing, an ultramicrotome, or the like can be used.

Subsequently, the measurement sample thus obtained is observed under a scanning transmission electron microscope (STEM) to obtain a STEM image of the cross-section of the fine metal wire. At the same time, elemental mapping on the cross-section of the fine metal wire is performed by energy dispersive X-ray spectroscopy (EDX). Specifically, the EDX intensity of the K shell of the oxygen atom O and the EDX intensity of the K shell of the conductive metal atom M are measured as to each site on the cross-section. This operation is performed at least in a thickness region from 0.10 T to 0.90 T from the fine metal wire interface on the transparent substrate side on the cross-section of the fine metal wire. An integrated EDX intensity value of the K shells of oxygen atoms 0 and an integrated EDX intensity value of the K shells of conductive metal atoms M in this region are calculated. The ratio between these integrated values is obtained as the atom % ratio $O/M_{0.10-0.90}$. The atom % ratio $O/M_{0.75-0.90}$ and the atom % ratio $O/M_{0.10-0.25}$ are obtained by determining the ratio between the integrated values by a similar approach for the target thickness regions.

In this context, the thickness T that defines the thickness region refers to the maximum thickness among thicknesses from the fine metal wire interface on the transparent substrate side to the fine metal wire surface that can be confirmed from the STEM image of the fine metal wire cross-section. Thus, even if a specific site has a different thickness due to surface roughness or the like within the same cross-section of the fine metal wire, the maximum thickness within this cross-section serves as the thickness T. The formation of the cross-section of the fine metal wire or the STEM-EDX analysis is preferably performed in an inert atmosphere of argon or the like or in vacuum from the viewpoint of preventing the oxidation or contamination of the fine metal wire cross-section.

As described above, the transparency of the conductive film can be improved by adjusting the atom % ratio $O/M_{0.10-0.90}$ and preferably further the atom % ratio $O/M_{0.75-0.90}$ and the atom % ratio $O/M_{0.10-0.25}$ to specific ranges.

Increase or decrease in each value of the atom % ratio $O/M_{0.10-0.90}$, the atom % ratio $M/O_{0.75-0.90}$, and the atom % ratio $O/M_{0.10-0.25}$ is not particularly limited and can be controlled, for example, by adjusting sintering conditions for forming the fine metal wire. The fine metal wire can be formed by forming a pattern using ink containing a metal component on the transparent substrate, and sintering the pattern for the binding of the metal components to another. In this sintering step, the metal component is considered to form a metal component sintered film by fusion to an adjacent metal component while diffused and aggregated under oxidative or reductive conditions. Hence, the oxidation and reduction of the metal component are adjusted by adjusting a sintering atmosphere and energy at the time of sintering (e.g., heat, plasma, electron beam, and irradiation energy of a light source) or a sintering time. This can adjust the total atom % ratio O/M of the fine metal wire, the atom % ratio $O/M_{0.75-0.90}$ of a surface portion of the fine metal wire susceptible to oxidation or reduction, and the atom % ratio $O/M_{0.10-0.25}$ of the interface between the fine metal wire and the transparent substrate unsusceptible to oxidation or reduction.

As described in the third embodiment mentioned later, the fine metal wire constituting the fine metal wire pattern according to the second embodiment may further have a configuration in which a carbon atom is unevenly distributed in the fine metal wire interface on the transparent substrate side on the cross-section of the fine metal wire perpendicular to the direction of drawing of the fine metal wire.

As described in the third embodiment, when the thickness of the fine metal wire is defined as T in STEM-EDX analysis on the cross-section of the fine metal wire perpendicular to the direction of drawing of the fine metal wire, this uneven distribution is indicated by atom % ratio $C/M_{0.10-0.25}$ in a thickness region from 0.10 T to 0.25 T from the fine metal wire interface on the transparent substrate side.

The atom % ratio $C/M_{0.10-0.25}$ according to the second embodiment is 0.3 or more and 6.0 or less, preferably 0.4 or more and 5.0 or less. The atom % ratio $C/M_{0.10-0.25}$ is 0.3 or more, whereby the adhesion of the fine metal wire to the transparent substrate is further improved. The atom % ratio $C/M_{0.10-0.25}$ is 6.0 or less, whereby conductivity is further improved. Besides, the binding between conductive metal atoms M, more specifically, metal components, becomes stronger, thereby improving the strength of the fine metal wire.

From a viewpoint similar to above, the atom % ratio $O/M_{0.10-0.25}$ in a thickness region from 0.10 T to 0.25 T from the fine metal wire interface on the transparent substrate side is preferably 0.05 or more, more preferably 0.06 or more, further preferably 0.07 or more. The atom % ratio $O/M_{0.10-0.25}$ is 0.05 or more, whereby the adhesion of the fine metal wire to the transparent substrate tends to be further improved. The atom % ratio $O/M_{0.10-0.25}$ is preferably 1.10 or less, more preferably 1.00 or less, further preferably 0.95 or less. The atom % ratio $O/M_{0.10-0.25}$ is 1.10 or less, whereby conductivity tends to be further improved.

The methods for measuring the atom % ratio $C/M_{0.10-0.25}$ and the atom % ratio $O/M_{0.10-0.25}$, and the methods for adjusting the atom % ratio $C/M_{0.10-0.25}$ and the atom % ratio $O/M_{0.10-0.25}$ to their respective values will be described in detail in the third embodiment.

As described above, adhesion can be improved while high conductivity is maintained, by adjusting the atom % ratio $C/M_{0.10-0.25}$ and preferably further the atom % ratio $O/M_{0.10-0.25}$ to specific ranges. Thus, the peeling of the fine metal wire from the transparent substrate due to the deformation, such as bending, deflection, or flexion, of the conductive film can be suppressed. This also permits use of a thin fine metal wire and therefore maintains low visibility.

As described in the first embodiment mentioned above, the fine metal wire constituting the fine metal wire pattern according to the second embodiment may have atom % ratio $Si/M_{0.10-0.90}$ of 0.001 or more and 0.070 or less for the purpose of improving conductivity and flexibility. The lower limit value of the atom % ratio $Si/M_{0.10-0.90}$ is preferably 0.003 or more, more preferably 0.005 or more. The upper limit value of the atom % ratio $Si/M_{0.10-0.90}$ is preferably 0.065 or less, more preferably 0.063 or less.

The lower limit value of atom % ratio $Si/M_{0.10-0.25}$ in a thickness region from 0.10 T to 0.25 T from the fine metal wire interface on the transparent substrate side is preferably 0.001 or more, more preferably 0.003 or more, further preferably 0.005 or more. The upper limit value of the atom % ratio $Si/M_{0.10-0.25}$ is preferably 0.070 or less, more preferably 0.065 or less, further preferably 0.063 or less. The lower limit value of atom % ratio $Si/M_{0.75-0.90}$ in a thickness region from 0.75 T to 0.90 T from the fine metal wire interface on the transparent substrate side is preferably 0.001 or more, more preferably 0.003 or more, further preferably 0.005 or more. The upper limit value of the atom % ratio $Si/M_{0.75-0.90}$ is preferably 0.070 or less, more preferably 0.065 or less, further preferably 0.063 or less. This tends to prevent the fine metal wire from being broken even if the conductive film is bent in every direction.

The conductive metal atom M preferably comprises at least one or more metal elements selected from silver, copper, and aluminum and is more preferably silver or copper, particularly preferably copper which is relatively inexpensive. Use of such a metal element tends to attain much better conductivity of the conductive film.

The oxygen atom O may be contained as an oxygen atom constituting a metal oxide in the fine metal wire. Examples of such a metal oxide include, but are not particularly limited to, at least one or more members selected from the group consisting of cuprous oxide, cupric oxide, silver oxide, and aluminum oxide. Among them, the metal atom constituting the metal oxide is preferably the same as the conductive metal atom M from the viewpoint of a production process.

The fine metal wire comprises conductive metal atom M and may comprise a non-conductive component in addition to the conductive component responsible for conductivity. Examples of the non-conductive component include, but are not particularly limited to, the metal oxides described above as well as metal compounds, and organic compounds that are components derived from components contained in ink mentioned later and remain in the fine metal wire after sintering among the components contained in ink. The content ratio of the conductive component is preferably 50% by mass or more, more preferably 60% by mass or more, further preferably 70% by mass or more. The upper limit of the content ratio of the conductive component is not particularly limited and is 100% by mass. The content ratio of the non-conductive component is preferably 50% by mass or less, more preferably 40% by mass or less, further preferably 30% by mass or less. The lower limit of the content ratio of the non-conductive component is not particularly limited and is 0% by mass.

The theoretical refractive index of the fine metal wire in a thickness region from 0.10 T to 0.25 T from the fine metal wire interface on the transparent substrate side is preferably 0.30 to 1.45, more preferably 0.40 to 1.35, further preferably 0.50 to 1.30. The theoretical refractive index of the fine metal wire falls within the range described above, whereby transparency tends to be further improved. The theoretical refractive index of the fine metal wire is a refractive index value calculated from the constituent atoms (or materials) and the compositional ratio thereof.

(Fine Metal Wire Pattern)

The fine metal wire pattern can be designed according to the application of an intended electronic device. Examples thereof include, but are not particularly limited to, a mesh pattern (FIGS. 1 and 2) formed by a plurality of lines of the fine metal wire intersecting in a net-like form, and a line pattern (FIGS. 3 and 4) formed by a plurality of substantially parallel lines of the fine metal wire. Alternatively, the fine metal wire pattern may be a combination of the mesh pattern and the line pattern. The mesh of the mesh pattern may have a square or rectangular shape as shown in FIG. 1 or may have a polygonal shape such as a rhombus as shown in FIG. 2. The fine metal wire constituting the line pattern may be a straight line as shown in FIG. 3 or may be a curved line as shown in FIG. 4. The fine metal wire constituting the mesh pattern can also be a curved line.

Figure 14:
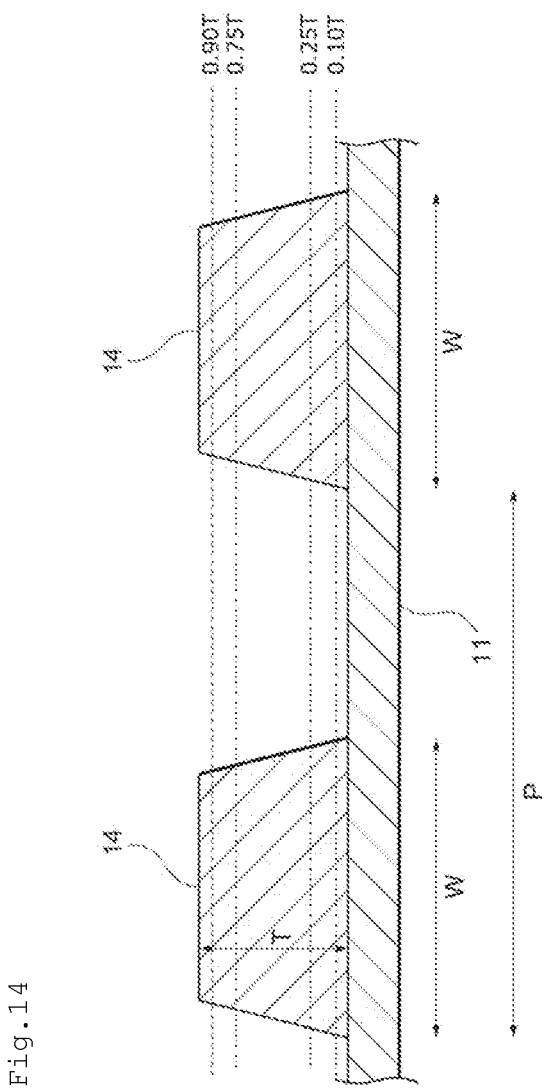
FIG. 14 shows a partial cross-sectional view taken along the III-III' line in the conductive film of FIG. 1. This drawing is for illustrating the cross-section of the fine metal wire of the second embodiment.

Line width W of the fine metal wire of the second embodiment refers to the line width of the fine metal wire 14 when the fine metal wire 14 is projected onto the surface of the transparent substrate 11 from the side where the fine metal wire pattern 12 is disposed, of the transparent substrate 11. FIG. 14 shows a partial cross-sectional view taken along the III-III' line in the conductive film of FIG. 1. Referring to this FIG. 14, the line width W of fine metal wire 14 having a trapezoidal cross-section is the width on the side contacted with the transparent substrate 11, of the fine metal wire 14. The thickness T of the fine metal wire means the maximum thickness when surface roughness is taken into consideration. Pitch P means the sum of the line width W and the distance between lines of the fine metal wire.

(Line Width)

The line width W of the fine metal wire is, for example, preferably 0.1 µm or larger and 5.0 µm or smaller, more preferably 0.2 µm or larger and 4.0 µm or smaller, further preferably 0.3 µm or larger and 3.0 µm or smaller, still further preferably 0.4 µm or larger and 2.5 µm or smaller. The line width W of the fine metal wire is 0.1 µm or larger, whereby conductivity tends to be further improved. Furthermore, reduction in conductivity ascribable to the oxidation, corrosion, or the like of the fine metal wire surface tends to be able to be sufficiently suppressed. A thinner line width of the fine metal wire permits increase in the number of lines of the fine metal wire at the same aperture ratio. This attains more uniform electrical field distribution of the conductive film so that this enables a higher-resolution electronic device to be fabricated. If some lines of the fine metal wire are broken, this influence can be compensated for by the other lines of the fine metal wire. On the other hand, the line width of the fine metal wire W is 5.0 µm or smaller, whereby the visibility of the fine metal wire is further reduced. Thus, the transparency of the conductive film tends to be further improved.

The thickness T of the fine metal wire is preferably 10 nm or larger and 1,000 nm or smaller. The lower limit of the thickness T is more preferably 50 nm or larger, further preferably 75 nm or larger. The thickness T of the fine metal wire is 10 nm or larger, whereby conductivity tends to be further improved. Reduction in conductivity ascribable to the oxidation, corrosion, or the like of the fine metal wire surface tends to be able to be sufficiently suppressed. On the other hand, the thickness T of the fine metal wire is 1,000 nm or smaller, whereby high transparency can be exerted in a wide view angle.

(Aspect Ratio)

The aspect ratio represented by the thickness T of the fine metal wire to the line width W of the fine metal wire is preferably 0.05 or more and 1.00 or less. The lower limit of the aspect ratio is more preferably 0.08 or more, further preferably 0.10 or more. The aspect ratio is 0.05 or more, whereby conductivity tends to be able to be further improved without reducing transmittances.

(Pitch)

The pitch P of the fine metal wire pattern is preferably 5 µm or larger, more preferably 50 µm or larger, further preferably 100 µm or larger. The pitch P of the fine metal wire pattern is 5 µm or larger, whereby a favorable transmittance can be obtained. The pitch P of the fine metal wire pattern is preferably 1,000 µm or smaller, more preferably 500 µm or smaller, further preferably 250 µm or smaller. The pitch P of the fine metal wire pattern is 1,000 µm or smaller, whereby conductivity tends to be able to be further improved. When the shape of the fine metal wire pattern is a mesh pattern, an aperture ratio of 99% can be attained by setting the pitch to 200 µm of a fine metal wire pattern having a line width of 1 µm.

The line width, aspect ratio, and pitch of the fine metal wire pattern can be confirmed by observing the conductive film cross-section under an electron microscope or the like. The line width and pitch of the fine metal wire pattern can also be observed under a laser microscope or an optical microscope. Since the pitch and the aperture ratio have a relational expression mentioned later, one of these factors can be calculated if the other factor is known. Examples of the method for adjusting the line width, aspect ratio, and pitch of the fine metal wire pattern to the desired ranges include a method of adjusting grooves of a printing plate for use in a method for producing the conductive film mentioned later, and a method of adjusting the average particle size of metal particles in ink.

(Aperture Ratio)

The lower limit value of the aperture ratio of the fine metal wire pattern is preferably 60% or more, more preferably 70% or more, further preferably 80% or more, particularly preferably 90% or more. The aperture ratio of the fine metal wire pattern is equal to or more than the specific value mentioned above, whereby the transmittance of the conductive film tends to be further improved. The upper limit value of the aperture ratio of the fine metal wire pattern is preferably less than 100%, more preferably 95% or less, further preferably 90% or less, still further preferably 80% or less, even further preferably 70% or less, particularly preferably 60% or less. The aperture ratio of the fine metal wire pattern is equal to or less than the specific value mentioned above, whereby the conductivity of the conductive film tends to be further improved. The aperture ratio of the fine metal wire pattern also differs in appropriate value depending on the shape of the fine metal wire pattern. The upper limit value and lower limit value of the aperture ratio of the fine metal wire pattern can be appropriately combined according to the required performance (transmittance and sheet resistance) of an intended electronic device.

The "aperture ratio of the fine metal wire pattern" can be calculated according to an expression given below as to a region where the fine metal wire pattern is formed on the transparent substrate. The region where the fine metal wire pattern is formed on the transparent substrate is a range represented by S in FIG. 1 and excludes a marginal part and the like where the fine metal wire pattern is not formed.

$$\text{Aperture ratio} = (1 - \text{Area occupied by the fine metal wire pattern}/\text{Area of the transparent substrate}) \times 100$$

The relational expression of the aperture ratio and the pitch differs depending on the shape of the fine metal wire pattern. Their relationship can be calculated as given below. FIG. 6 shows a schematic view of a mesh pattern (grid pattern) having pattern unit 16. In the case of this mesh pattern, the aperture ratio and the pitch have the following relational expression:

$$\text{Aperture ratio} = \{\text{Area of opening part 15}/\text{Area of pattern unit 16}\} \times 100 = \{((\text{Pitch } P1 - \text{Line width } W1) \times (\text{Pitch } P2 - \text{Line width } W2))/(\text{Pitch } P1 \times \text{Pitch } P2)\} \times 100$$

FIG. 7 shows a schematic view of a line pattern. In the case of this line pattern, the aperture ratio and the pitch have the following relational expression:

$$\text{Aperture ratio} = \{(\text{Pitch } P - \text{Line width } W)/\text{Pitch } P\} \times 100$$

(Sheet Resistance)

The sheet resistance of the conductive film is preferably 0.1 Ω/sq or more and 1,000 Ω/sq or less, more preferably 0.1 Ω/sq or more and 500 Ω/sq or less, further preferably 0.1 Ω/sq or more and 100 Ω/sq or less, still further preferably 0.1 Ω/sq or more and 20 Ω/sq or less, even further preferably 0.1 Ω/sq or more and 10 Ω/sq or less. A lower sheet resistance tends to suppress power loss. Hence, an electronic paper, a touch panel, and a flat-panel display having less power consumption can be obtained by using the conductive film having a low sheet resistance. The sheet resistance of the conductive film can be measured by a method given below.

Figure 13:
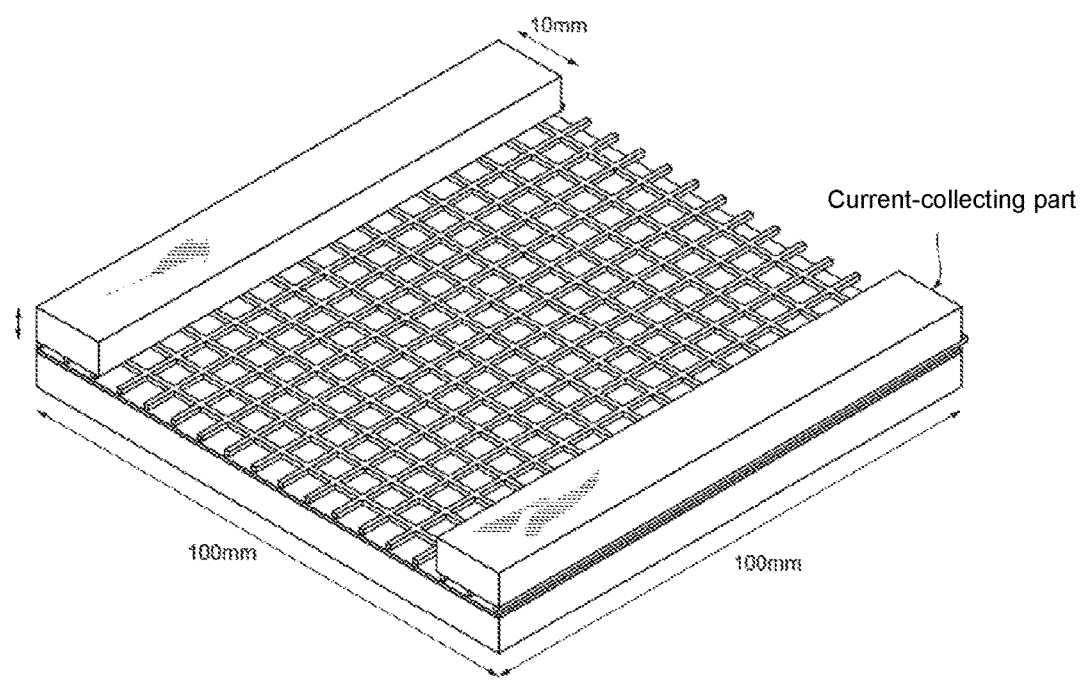
FIG. 13 shows a schematic view of a current collector part for use in the sheet resistance evaluation of the present Examples.

FIG. 13 shows a perspective view for illustrating the method for measuring the sheet resistance. First, a rectangular portion throughout which the fine metal wire pattern is disposed is cut out of the conductive film to obtain a measurement sample. Current collector parts for sheet resistance measurement electrically connected to the fine metal wire pattern are formed at both ends of the obtained measurement sample. Electrical resistance R (Ω) between the current collector parts is measured. Sheet resistance $R_s$ (Ω/sq) can be calculated according to the following expression from the obtained electrical resistance R (Ω), distance L (mm) between the current collector parts of the measurement sample, and length D (mm) in the depth direction.

$$R_s = R/L \times D$$

The sheet resistance of the conductive film tends to be reduced with increase in the aspect ratio (thickness) of the fine metal wire. The sheet resistance may be adjusted by selecting the type of the metal material constituting the fine metal wire.

A lower sheet resistance tends to suppress power loss. Hence, an electronic paper, a touch panel, and a flat-panel display having less power consumption can be obtained.

(Visible Light Transmittance)

The visible light transmittance of the conductive film is preferably 80% or more and 100% or less, more preferably 90% or more and 100% or less. In this context, the visible light transmittance can be measured in accordance with JIS K 7361-1: 1997 for total light transmittance by calculating the transmittance in a range of the visible light (360 to 830 nm).

The visible light transmittance of the conductive film tends to be further improved by decreasing the line width of the fine metal wire pattern or by increasing the aperture ratio thereof.

(Haze)

The haze of the conductive film is preferably 0.01% or more and 5.00% or less. The upper limit of the haze is more preferably 3.00% or less, further preferably 1.00% or less. When the upper limit of the haze is 5.00% or less, the cloudiness of the conductive film to visible light can be sufficiently reduced. The haze described herein can be measured in accordance with JIS K 7136: 2000 for haze.

[Transparent Substrate]

The term "transparent" of the transparent substrate means that the visible light transmittance is preferably 80% or more, more preferably 90% or more, further preferably 95% or more. In this context, the visible light transmittance can be measured in accordance with JIS K 7361-1: 1997.

The refractive index of the transparent substrate is preferably 1.50 to 1.80, more preferably 1.50 to 1.60, further preferably 1.55 to 1.58. The refractive index of the transparent substrate falls within the range described above, whereby transparency tends to be further improved. The refractive index of the transparent substrate can be measured in accordance with JIS K 7142: 2014.

When the transparent substrate and the fine metal wire are laminated in this order, it is preferred that their refractive indexes should be decreased in stages, from the viewpoint of transparency. From this viewpoint, the theoretical refractive index of the fine metal wire in a thickness region from 0.10 T to 0.25 T from the fine metal wire interface on the transparent substrate side is preferably smaller than the refractive index of the transparent substrate.

Examples of the material of the transparent substrate include, but are not particularly limited to: transparent inorganic substrates such as glass; and transparent organic substrates such as acrylic acid ester, methacrylic acid ester, polyethylene terephthalate, polybutylene terephthalate, polyethylene naphthalate, polycarbonate, polyarylate, polyvinyl chloride, polyethylene, polypropylene, polystyrene, nylon, aromatic polyamide, polyether ether ketone, polysulfone, polyethersulfone, polyimide, and polyetherimide. Among them, polyethylene terephthalate, polyimide, or polyethylene naphthalate is preferred. Use of polyethylene terephthalate attains better productivity (cost reduction effect) for producing the conductive film and tends to further improve the adhesion of the transparent substrate to the fine metal wire. Use of polyimide tends to further improve the heat resistance of the conductive film. Use of polyethylene naphthalate and/or polyethylene terephthalate tends to attain better adhesion of the transparent substrate to the fine metal wire.

The transparent substrate may be made of one material or may be made of two or more materials laminated with each other. When the transparent substrate is multi-layered such that two or more materials are laminated with each other, the transparent substrate may be made of organic substrates or inorganic substrates laminated with each other or may be made of an organic substrate(s) and an inorganic substrate(s) laminated with each other.

The thickness of the transparent substrate is preferably 5 μm or larger and 500 μm or smaller, more preferably 10 μm or larger and 100 μm or smaller.

[Intermediate Layer]

The conductive film of the second embodiment may have an intermediate layer between the transparent substrate and the conductive part. The intermediate layer is capable of contributing to improvement in the adhesion between the transparent substrate and the fine metal wire of the conductive part.

Examples of the component contained in the intermediate layer include, but are not particularly limited to: silicon compounds such as (poly)silanes, (poly)silazanes, (poly)silthianes, (poly)siloxanes, silicon, silicon carbide, silicon oxide, silicon nitride, silicon chloride, silicate, zeolite, and silicide; aluminum compounds such as aluminum oxide; and magnesium compounds such as magnesium fluoride. Among them, at least one member selected from the group consisting of silicon oxide, silicon nitride, aluminum oxide, and magnesium fluoride is preferred. Use of such a component tends to further improve the transparency and durability of the conductive film and attains better productivity (cost reduction effect) for producing the conductive film.

The refractive index of the intermediate layer is preferably 1.30 to 1.80, more preferably 1.40 to 1.70, further preferably 1.45 to 1.55. The refractive index of the intermediate layer falls within the range described above, whereby transparency tends to be further improved. The refractive index of the intermediate layer can be measured in accordance with JIS K 7142: 2014.

When the transparent substrate, the intermediate layer and the fine metal wire are laminated in this order, it is preferred that their refractive indexes should be decreased in stages, from the viewpoint of transparency. From this viewpoint, the refractive index of the intermediate layer is preferably smaller than that of the transparent substrate. The theoretical refractive index of the fine metal wire in a thickness region from 0.10 T to 0.25 T from the fine metal wire interface on the transparent substrate side is preferably smaller than the refractive index of the intermediate layer.

The thickness of the intermediate layer is preferably 0.01 μm or larger and 500 μm or smaller, more preferably 0.05 μm or larger and 300 μm or smaller, further preferably 0.10 μm or larger and 200 μm or smaller. The thickness of the intermediate layer is 0.01 μm or larger, whereby the adhesion of the intermediate layer to the fine metal wire is exerted. The thickness of the intermediate layer is 500 μm or smaller, whereby the flexibility of the transparent substrate can be ensured.

The intermediate layer laminated on the transparent substrate can prevent plasma or the like from etching the transparent substrate at a site uncovered with the fine metal wire pattern part when a metal component in ink is sintered by a sintering process such as plasma.

This intermediate layer preferably further has an antistatic function in order to prevent the breaking of the fine metal wire pattern ascribable to static electricity. For the intermediate layer having an antistatic function, it is preferred that the intermediate layer should comprise at least any of a conductive inorganic oxide and a conductive organic compound.

The volume resistivity of the intermediate layer is preferably 100 Ωcm or more and 100000 Ωcm or less, more preferably 1000 Ωcm or more and 10000 Ωcm or less, still more preferably 2000 Ωcm or more and 8000 Ωcm or less. The volume resistivity of the intermediate layer is 100000 Ωcm or less, whereby an antistatic function is exerted. The volume resistivity of the intermediate layer is 100 Ωcm or more, whereby the resulting conductive film can be suitably used for application such as touch panels for which high electrical conduction between fine metal wire patterns is undesirable.

The volume resistivity can be adjusted by the content of the conductive inorganic oxide, the conductive organic compound, or the like in the intermediate layer. When the intermediate layer comprises, for example, highly plasma-resistant silicon oxide (volume specific resistance: $10^{14}$ Ω·cm or more) and an organosilane compound as the conductive organic compound, the volume resistivity can be reduced by increasing the content of the organosilane compound. On the other hand, a thin intermediate layer can be formed not to impair optical characteristics by increasing the content of the silicon oxide, because of its high plasma resistance, although the volume resistivity is increased.

Second Embodiment: Method for Producing Conductive Film

Examples of the method for producing the conductive film of the second embodiment include, but are not particularly limited to, a method having a pattern formation step of forming a pattern on a transparent substrate using ink containing a metal component, and a sintering step of sintering the pattern to form a fine metal wire. In this case, the method for producing the conductive film of the second embodiment may comprise an intermediate layer formation step of forming an intermediate layer on the surface of the transparent substrate, prior to the pattern formation step.

[Intermediate Layer Formation Step]

The intermediate layer formation step is the step of forming an intermediate layer on the surface of the transparent substrate. Examples of the method for forming the intermediate layer include, but are not particularly limited to: a method of forming a vapor-deposited film on the transparent substrate surface by a vapor deposition such as physical vapor deposition (PVD) or chemical vapor deposition (CVD); a method of forming a coating film by applying a composition for intermediate layer formation onto the transparent substrate surface, followed by drying.

The composition for intermediate layer formation contains any of the components listed as examples of the component contained in the intermediate layer, or a precursor thereof, and a solvent and may contain, if necessary, a surfactant, a dispersant, a binder, or the like.

[Pattern Formation Step]

The pattern formation step is the step of forming a pattern using ink containing a metal component. The pattern formation step is not particularly limited as long as the step is performed by a plate printing method using a printing plate having grooves of the desired fine metal wire pattern. Such a method has, for example, the steps of: coating transfer medium surface with ink; allowing the transfer medium surface coated with ink to face the protruding portion surface of a relief printing plate, and pressing and contacting these surfaces to transfer the ink on the transfer medium surface to the protruding portion surface of the relief printing plate; and allowing the transfer medium surface coated with ink to face the surface of the transparent substrate, and pressing and contacting these surfaces to transfer the ink remaining on the transfer medium surface to the surface of the transparent substrate. When the intermediate layer is formed on the transparent substrate, the ink is transferred to the intermediate layer surface.

(Ink)

The ink for use in the pattern formation step contains a metal component containing conductive metal atom M, and a solvent and may contain, if necessary, a surfactant, a dispersant, a reducing agent, or the like. The metal component may be contained as metal particles in the ink or may be contained as a metal complex in the ink.

In the case of using metal particles, their average primary particle size is preferably 100 nm or smaller, more preferably 50 nm or smaller, further preferably 30 nm or smaller. The lower limit of the average primary particle size of the metal particles is not particularly limited and is, for example, 1 nm or larger. The average primary particle size of the metal particles is 100 nm or smaller, whereby the line width W of the resulting fine metal wire can be further thinned. In the second embodiment, the "average primary particle size" refers to the particle size of each individual metal particle (so-called primary particle) and is distinguished from an average secondary particle size which is the particle size of an aggregate (so-called secondary particle) formed by a plurality of metal particles together.

The metal particles may be in the form of a metal oxide such as copper oxide, a metal compound, or core/shell particles having copper in the core part and copper oxide in the shell part, as long as the metal particles contain conductive metal atom M. The form of the metal particles can be appropriately determined from the viewpoint of dispersibility and sinterability.

Examples of the surfactant include, but are not particularly limited to, silicone surfactants and fluorine surfactants. Use of such a surfactant improves the coatability of a transfer medium (blanket) with the ink and the smoothness of the ink used in coating and tends to produce a more uniform coating film. The surfactant is preferably configured so as to permit dispersion of the metal component and to be less likely to remain in sintering.

Examples of the dispersant include, but are not particularly limited to, a dispersant that noncovalently binds to or interacts with the metal component, and a dispersant that covalently binds to the metal component. Examples of the functional group for noncovalent binding or interaction include dispersants having a phosphoric acid group. Use of such a dispersant tends to further improve the dispersibility of the metal component.

Examples of the solvent include: alcohol solvents such as monoalcohols and polyalcohols; alkyl ether solvents; hydrocarbon solvents; ketone solvents; and ester solvents. These solvents may be used singly, or one or more thereof may be used in combination. For example, a monoalcohol having 10 or less carbon atoms and a polyalcohol having 10 or less carbon atoms are used in combination. Use of such a solvent tends to further improve the coatability of a transfer medium (blanket) with the ink, the transferability of the ink from a transfer medium to a relief printing plate, the transferability of the ink from the transfer medium to the transparent substrate, and the dispersibility of the metal component. The solvent is preferably configured so as to permit dispersion of the metal component and to be less likely to remain in sintering.

[Sintering Step]

The sintering step is the step of sintering the metal component in the ink transferred as a pattern to the surface of the transparent substrate or the intermediate layer to form a fine metal wire. This can produce a conductive part having the same fine metal wire pattern as the pattern obtained by the application of the ink. The sintering is not particularly limited as long as the method therefor can form a metal component sintered film by the fusion of the metal component. The sintering may be performed in, for example, a sintering furnace, or may be performed using plasma, a heating catalyst, ultraviolet ray, vacuum ultraviolet ray, electron beam, infrared lamp annealing, flash lamp annealing, laser, or the like. If the resulting sintered film is easily oxidized, the sintering is preferably performed in a non-oxidative atmosphere. If the metal oxide or the like is difficult to reduce with only the reducing agent that may be contained in the ink, the sintering is preferably performed in a reductive atmosphere.

The non-oxidative atmosphere is an atmosphere free from an oxidative gas such as oxygen and includes an inert atmosphere and a reductive atmosphere. The inert atmosphere is an atmosphere filled with an inert gas, for example, argon, helium, neon, or nitrogen. The reductive atmosphere refers to an atmosphere where a reductive gas such as hydrogen or carbon monoxide exists. A sintering furnace may be filled with such a gas, and the ink-coated film (dispersion-coated film) can be sintered in a closed system. Alternatively, the coated film may be sintered in the circulated system of a sintering furnace where such a gas is allowed to flow. In the case of sintering the coated film in a non-oxidative atmosphere, it is preferred that the sintering furnace should be temporarily vacuumized so that oxygen in the sintering furnace is removed and replaced with a non-oxidative gas. The sintering may be performed in a pressurized atmosphere or may be performed in a reduced pressure atmosphere.

It is possible that the sintering is performed in a reductive atmosphere from the viewpoint of reducing the content of the oxygen atom O in the fine metal wire and consequently adjusting the content ratio of the oxygen atom O in the fine metal wire interface, whereas the sintering is performed in a weakly reductive atmosphere or in an inert atmosphere from the viewpoint of increasing the content of the oxygen atom O in the fine metal wire and thereby adjusting the content ratio of the oxygen atom O in the fine metal wire interface. The content ratio of the oxygen atom O in the fine metal wire interface can also be adjusted by a sintering temperature and a sintering time in a predetermined atmosphere.

The sintering temperature is not particularly limited and is preferably 20° C. or higher and 400° C. or lower, more preferably 80° C. or higher and 300° C. or lower, further preferably 110° C. or higher and 250° C. or lower, particularly preferably 160° C. or higher and 200° C. or lower. The sintering temperature of 400° C. or lower is preferred because a low heat-resistant substrate can be used. The sintering temperature of 20° C. or higher is preferred because the formation of a sintered film tends to proceed sufficiently, resulting in favorable conductivity. The resulting sintered film contains a conductive component derived from the metal component and may additionally contain the component used in the ink, or a non-conductive component according to the sintering temperature.

The sintering time is not particularly limited and is preferably 80 minutes or longer and 300 minutes or shorter, more preferably 100 minutes or longer and 250 minutes or shorter, further preferably 120 minutes or longer and 220 minutes or shorter. The sintering time of 300 minutes or shorter is preferred because a low heat-resistant substrate can be used. The sintering time of 150 minutes or longer is preferred because the formation of a sintered film tends to proceed sufficiently, resulting in favorable conductivity.

As described above, the second embodiment of the present invention can provide a conductive film that exerts better transparency, and a conductive film roll, an electronic paper, a touch panel, and a flat-panel display comprising the same.

Third Embodiment

An object of the third embodiment is to provide a conductive film having both of high conductivity and high adhesion between a transparent substrate and a fine metal wire, and a conductive film roll, an electronic paper, a touch panel, and a flat-panel display comprising the same.

Third Embodiment: Conductive Film

The conductive film of the third embodiment is a conductive film comprising a transparent substrate and a conductive part comprising a fine metal wire pattern disposed on one side or both sides of the transparent substrate, wherein: the fine metal wire pattern is constituted by a fine metal wire; the fine metal wire comprises conductive metal atom M and carbon atom C; when the thickness of the fine metal wire is defined as T in STEM-EDX analysis on the cross-section of the fine metal wire perpendicular to the direction of drawing of the fine metal wire, atom % ratio $C/M_{0.10-0.25}$ in a thickness region from 0.10 T to 0.25 T from the fine metal wire interface on the transparent substrate side is 0.3 or more and 6.0 or less; and a sheet resistance of the conductive film is 0.1 Ω/sq or more and 500 Ω/sq or less.

FIG. 1 shows a top view of the conductive film having a mesh pattern as the fine metal wire pattern, as one form of the conductive film of the third embodiment. Conductive film 10 of the third embodiment has conductive part 13 constituted by fine metal wire pattern 12 on transparent substrate 11.

An extraction electrode (not shown) for connection to a controller, etc. may be formed, in addition to the conductive part 13, on the transparent substrate 11 according to the application of use of the conductive film 10. The transparent substrate 11 can have the conductive part 13 on one side or both sides and may have a plurality of conductive parts 13 on one side. The conductive part 13 is constituted by fine metal wire pattern 12 configured so as to be energizable or chargeable. When the conductive film 10 of the third embodiment is integrated into an electronic device, the conductive part 13 functions as a transparent electrode for the screen portion of an electronic paper, a touch panel, or a flat-panel display, etc.

In such a conductive film, a thinner line width of the fine metal wire decreases an area adhering to the transparent substrate so that the peeling of the fine metal wire from the transparent substrate becomes marked due to the bending, deflection, flexion, etc. of the conductive film.

By contrast, according to the third embodiment, adhesion can be adjusted by a configuration in which a carbon atom is unevenly distributed in the fine metal wire interface on the transparent substrate side on the fine metal wire cross-section. This enables the adhesion of the fine metal wire to be secured even if a thinner fine metal wire is used from the viewpoint of transparency. Furthermore, such a fine metal wire in which a carbon atom is unevenly distributed in a predetermined range can secure adhesion without impairing conductivity. The conductive film comprising such a fine metal wire can be prepared by printing and is therefore also excellent from the viewpoint of cost reduction and reduction in environmental load as compared with a conductive film containing ITO, which involves film formation by a vacuum deposition method or a sputtering method.

[Conductive Part]

The conductive part comprises a fine metal wire pattern constituted by a fine metal wire disposed on the transparent substrate. The fine metal wire pattern may be a regular pattern or an irregular pattern. In the third embodiment, the fine metal wire constituting the fine metal wire pattern has a configuration in which a carbon atom is unevenly distributed in the fine metal wire interface on the transparent substrate side on the cross-section of the fine metal wire perpendicular to the direction of drawing of the fine metal wire.

In the third embodiment, when the thickness of the fine metal wire is defined as T in STEM-EDX analysis on the cross-section of the fine metal wire perpendicular to the direction of drawing of the fine metal wire, this uneven distribution is indicated by atom % ratio $C/M_{0.10-0.25}$ in a thickness region from 0.10 T to 0.25 T from the fine metal wire interface on the transparent substrate side. The atom % ratio $C/M_{0.10-0.25}$ according to the third embodiment is 0.3 or more and 6.0 or less, preferably 0.4 or more and 5.0 or less. The atom % ratio $C/M_{0.10-0.25}$ is 0.3 or more, whereby the adhesion of the fine metal wire to the transparent substrate is further improved. The atom % ratio $C/M_{0.10-0.25}$ is 6.0 or less, whereby conductivity is further improved. Besides, the binding between conductive metal atoms M, more specifically, metal components, becomes stronger, thereby improving the strength of the fine metal wire.

This principle is not particularly limited and is based on, for example, the following idea: when two members differing in mechanical properties such as rigidity or drawability, i.e., the transparent substrate and the fine metal wire, are deformed by bending, deflection, flexion, etc., as in the conductive film of the third embodiment, stress is focused on the interface therebetween. This may be repeated, thereby causing the peeling of the fine metal wire. In this case, when a carbon atom is unevenly distributed at or near the interface of the fine metal wire on the transparent substrate side, a functional group derived from the carbon atom in the fine metal wire interface forms a chemical bond such as a hydrogen bond or a covalent bond with a functional group of the transparent substrate surface. Therefore, adhesion is further improved. The carbon atom in the fine metal wire serves as a factor inhibiting electronic conduction. However, favorable conductivity can also be exerted by forming a structure where a carbon atom is unevenly distributed at or near the interface of the fine metal wire on the transparent substrate side.

From a viewpoint similar to above, the atom % ratio $O/M_{0.10-0.25}$ in a thickness region from 0.10 T to 0.25 T from the fine metal wire interface on the transparent substrate side is preferably 0.05 or more, more preferably 0.06 or more, further preferably 0.07 or more. The atom % ratio $O/M_{0.10-0.25}$ is 0.05 or more, whereby the adhesion of the fine metal wire to the transparent substrate tends to be further improved. The atom % ratio $O/M_{0.10-0.25}$ is preferably 1.10 or less, more preferably 1.00 or less, further preferably 0.95 or less. The atom % ratio $O/M_{0.10-0.25}$ is 1.10 or less, whereby conductivity tends to be further improved.

In the third embodiment, the atom % ratio $C/M_{0.10-0.25}$ and the atom % ratio $O/M_{0.10-0.25}$ can be determined by STEM-EDX analysis on the cross-section of the fine metal wire perpendicular to the direction of drawing of the fine metal wire. Specifically, the fine metal wire is cut in a direction perpendicular to the direction of drawing of the fine metal wire to obtain a thin section having an exposed cross-section of the fine metal wire as a measurement sample. In this respect, the conductive film may be embedded, if necessary, in a support such as epoxy resin, and then, the thin section can be formed. The method for forming the cross-section of the fine metal wire is not particularly limited as long as the method can suppress damage on the fine metal wire cross-section ascribable to the formation or processing of the cross-section. Preferably, a processing method using ion beam (e.g., BIB (broad ion beam) and FIB (focused ion beam) processing methods), precision machine polishing, an ultramicrotome, or the like can be used.

Subsequently, the measurement sample thus obtained is observed under a scanning transmission electron microscope (STEM) to obtain a STEM image of the cross-section of the fine metal wire. At the same time, elemental mapping on the cross-section of the fine metal wire is performed by energy dispersive X-ray spectroscopy (EDX). Specifically, the EDX intensity of the K shell of the carbon atom C and the EDX intensity of the K shell of the conductive metal atom M are measured as to each site on the cross-section. This operation is performed at least in a thickness region from 0.10 T to 0.25 T from the fine metal wire interface on the transparent substrate side on the cross-section of the fine metal wire. An integrated EDX intensity value of the K shells of carbon atoms C and an integrated EDX intensity value of the K shells of conductive metal atoms M in this region are calculated. The ratio between these integrated values is obtained as the atom % ratio $C/M_{0.10-0.25}$. The atom % ratio $O/M_{0.10-0.25}$ can also be calculated by a similar approach.

In this context, the thickness T that defines the thickness region refers to the maximum thickness among thicknesses from the fine metal wire interface on the transparent substrate side to the fine metal wire surface that can be confirmed from the STEM image of the fine metal wire cross-section. Thus, even if a specific site has a different thickness due to surface roughness or the like within the same cross-section of the fine metal wire, the maximum thickness within this cross-section serves as the thickness T. The formation of the cross-section of the fine metal wire or the STEM-EDX analysis is preferably performed in an inert atmosphere of argon or the like or in vacuum from the viewpoint of preventing the oxidation or contamination of the fine metal wire cross-section.

As described above, adhesion can be improved while high conductivity is maintained, by adjusting the atom % ratio $C/M_{0.10-0.25}$ and preferably further the atom % ratio $O/M_{0.10-0.25}$ to specific ranges. Thus, the peeling of the fine metal wire from the transparent substrate due to the deformation, such as bending, deflection, or flexion, of the conductive film can be suppressed. This also permits use of a thin fine metal wire and therefore maintains low visibility.

Increase or decrease in each value of the atom % ratio $C/M_{0.10-0.25}$ and the atom % ratio $O/M_{0.10-0.25}$ is not particularly limited and can be controlled, for example, by adjusting sintering conditions for forming the fine metal wire. The fine metal wire can be formed by forming a pattern using ink containing a metal component on the transparent substrate, and sintering the pattern for the binding of the metal components to another. Before this sintering step, the metal component originally exists in a state having an oxide or an oxide layer or in a state coexisting with organic matter such as a dispersant. As the sintering proceeds, oxygen, the oxide layer, the organic matter, and the like are presumably removed. It is generally considered that this removal of oxygen, the oxide layer, and the organic matter is more likely to proceed on the gas-solid interface (or gas-liquid interface in an ink state) side of the fine metal wire and is relatively less likely to proceed inside the fine metal wire, i.e., at or near the interface of the fine metal wire on the transparent substrate side. Hence, the degree of the removal of oxygen, the oxide layer, and the organic matter is adjusted by adjusting energy at the time of sintering (e.g., heat, plasma, electron beam, and irradiation energy of a light source), a sintering time, or the reductiveness of a sintering atmosphere. This can adjust the atom % ratio of atoms unevenly distributed at or near the fine metal wire interface on the transparent substrate side. The atom % ratio of atoms unevenly distributed at or near the fine metal wire interface on the transparent substrate side may also be adjusted by adjusting the type or content of a surfactant, a dispersant, or a reducing agent contained in the ink.

As described in the second embodiment mentioned above, the fine metal wire constituting the fine metal wire pattern according to the third embodiment may be configured so as to have a refractive index relatively close to that of the transparent substrate.

As described in the second embodiment, atom % ratio O/M of the oxygen atom O to the conductive metal atom M on the cross-section of the fine metal wire perpendicular to the direction of drawing of the fine metal wire is used at a predetermined ratio as an indicator for the refractive index.

The atom % ratio $O/M_{0.10-0.90}$ according to the third embodiment is 0.01 or more and 1.00 or less, preferably 0.02 or more and 0.80 or less, more preferably 0.03 or more and 0.75 or less. The refractive index of the fine metal wire is increased with increase in atom % ratio $O/M_{0.10-0.90}$ and reduced with decrease in atom % ratio $O/M_{0.10-0.90}$. This renders the refractive index of the fine metal wire closer to that of the transparent substrate and further improves transparency. The ratio of the oxide is decreased with decrease in atom % ratio $O/M_{0.10-0.90}$. Therefore, conductivity tends to be further improved. The atom % ratio $O/M_{0.10-0.90}$ is 0.01 or more, whereby transparency is improved. On the other hand, the atom % ratio $O/M_{0.10-0.90}$ is 1.00 or less, whereby high conductivity can be exerted while favorable transparency is maintained.

The uneven distribution and even distribution of the oxygen atom O can be represented by atom % ratio O/M in a specific thickness region. For example, when atom % ratio O/M in a thickness region from 0.75 T to 0.90 T from the fine metal wire interface on the transparent substrate side is defined as atom % ratio $M/O_{0.75-0.90}$, the atom % ratio $O/M_{0.75-0.90}$ serves as an indicator that indicates the proportion of the oxygen atom O present in a region on the surface side of the fine metal wire. Such atom % ratio $O/M_{0.75-0.90}$ is preferably 0.25 or less, more preferably 0.22 or less, further preferably 0.18 or less. The atom % ratio $O/M_{0.75-0.90}$ is 0.25 or less, whereby conductivity tends to be further improved. In the third embodiment, T denotes the maximum thickness among thicknesses from the fine metal wire interface on the transparent substrate side to the fine metal wire surface and can be measured from an electron microscope photograph.

When atom % ratio O/M in a thickness region from 0.10 T to 0.25 T from the fine metal wire interface on the transparent substrate side is defined as atom % ratio $O/M_{0.10-0.25}$, the atom % ratio $O/M_{0.10-0.25}$ serves as an indicator that indicates the proportion of the oxygen atom O present in a region on the interface side of the fine metal wire on the transparent substrate side. Such atom % ratio $O/M_{0.10-0.25}$ is preferably 0.05 or more, more preferably 0.06 or more, further preferably 0.07 or more. The atom % ratio $O/M_{0.10-0.25}$ is 0.05 or more, whereby transparency tends to be further improved. The atom % ratio $O/M_{0.10-0.25}$ is preferably 1.10 or less, more preferably 1.00 or less, further preferably 0.95 or less. The atom % ratio $O/M_{0.10-0.25}$ is 1.10 or less, whereby conductivity tends to be further improved.

The methods for measuring the atom % ratio $O/M_{0.10-0.90}$, the atom % ratio $M/O_{0.75-0.90}$ and the atom % ratio $O/M_{0.10-0.25}$; and the methods for adjusting the atom % ratio $O/M_{0.10-0.90}$, the atom % ratio $O/M_{0.75-0.90}$ and the atom % ratio $O/M_{0.10-0.25}$ to their respective values are described in detail in the second embodiment.

As described above, the transparency of the conductive film can be improved by adjusting the atom % ratio O/$M_{0.10\text{-}0.90}$ and preferably further the atom % ratio O/$M_{0.75\text{-}0.90}$ and the atom % ratio O/$M_{0.10\text{-}0.25}$ to specific ranges.

As described in the first embodiment mentioned above, the fine metal wire constituting the fine metal wire pattern according to the third embodiment may have atom % ratio Si/$M_{0.10\text{-}0.90}$ of 0.001 or more and 0.070 or less for the purpose of improving conductivity and flexibility. The lower limit value of the atom % ratio Si/$M_{0.10\text{-}0.90}$ is preferably 0.003 or more, more preferably 0.005 or more. The upper limit value of the atom % ratio Si/$M_{0.10\text{-}0.90}$ is preferably 0.065 or less, more preferably 0.063 or less.

The lower limit value of atom % ratio Si/$M_{0.10\text{-}0.25}$ in a thickness region from 0.10 T to 0.25 T from the fine metal wire interface on the transparent substrate side is preferably 0.001 or more, more preferably 0.003 or more, further preferably 0.005 or more. The upper limit value of the atom % ratio Si/$M_{0.10\text{-}0.25}$ is preferably 0.070 or less, more preferably 0.065 or less, further preferably 0.063 or less. The lower limit value of atom % ratio Si/$M_{0.75\text{-}0.90}$ in a thickness region from 0.75 T to 0.90 T from the fine metal wire interface on the transparent substrate side is preferably 0.001 or more, more preferably 0.003 or more, further preferably 0.005 or more. The upper limit value of the atom % ratio Si/$M_{0.75\text{-}0.90}$ is preferably 0.070 or less, more preferably 0.065 or less, further preferably 0.063 or less. This tends to prevent the fine metal wire from being broken even if the conductive film is bent in every direction.

The conductive metal atom M preferably comprises at least one or more metal elements selected from gold, silver, copper, and aluminum and is more preferably silver or copper, particularly preferably copper which is relatively inexpensive. Use of such a metal element tends to attain much better conductivity of the conductive film.

The fine metal wire comprises the conductive metal atom M and may comprise a non-conductive component in addition to the conductive component responsible for conductivity. Examples of the non-conductive component include, but are not particularly limited to, metal oxides, metal compounds, and organic compounds. Examples of these non-conductive components include metal oxides, metal compounds, and organic compounds that are components derived from components contained in ink mentioned later and remain in the fine metal wire after sintering among the components contained in ink. The content ratio of the conductive component is preferably 50% by mass or more, more preferably 60% by mass or more, further preferably 70% by mass or more. The upper limit of the content ratio of the conductive component is not particularly limited and is 100% by mass. The content ratio of the non-conductive component is preferably 50% by mass or less, more preferably 40% by mass or less, further preferably 30% by mass or less. The lower limit of the content ratio of the non-conductive component is not particularly limited and is 0% by mass.

(Fine Metal Wire Pattern)

The fine metal wire pattern can be designed according to the application of an intended electronic device. Examples thereof include, but are not particularly limited to, a mesh pattern (FIGS. 1 and 2) formed by a plurality of lines of the fine metal wire intersecting in a net-like form, and a line pattern (FIGS. 3 and 4) formed by a plurality of substantially parallel lines of the fine metal wire. Alternatively, the fine metal wire pattern may be a combination of the mesh pattern and the line pattern. The mesh of the mesh pattern may have a square or rectangular shape as shown in FIG. 1 or may have a polygonal shape such as a rhombus as shown in FIG. 2. The fine metal wire constituting the line pattern may be a straight line as shown in FIG. 3 or may be a curved line as shown in FIG. 4. The fine metal wire constituting the mesh pattern can also be a curved line.

Figure 15:
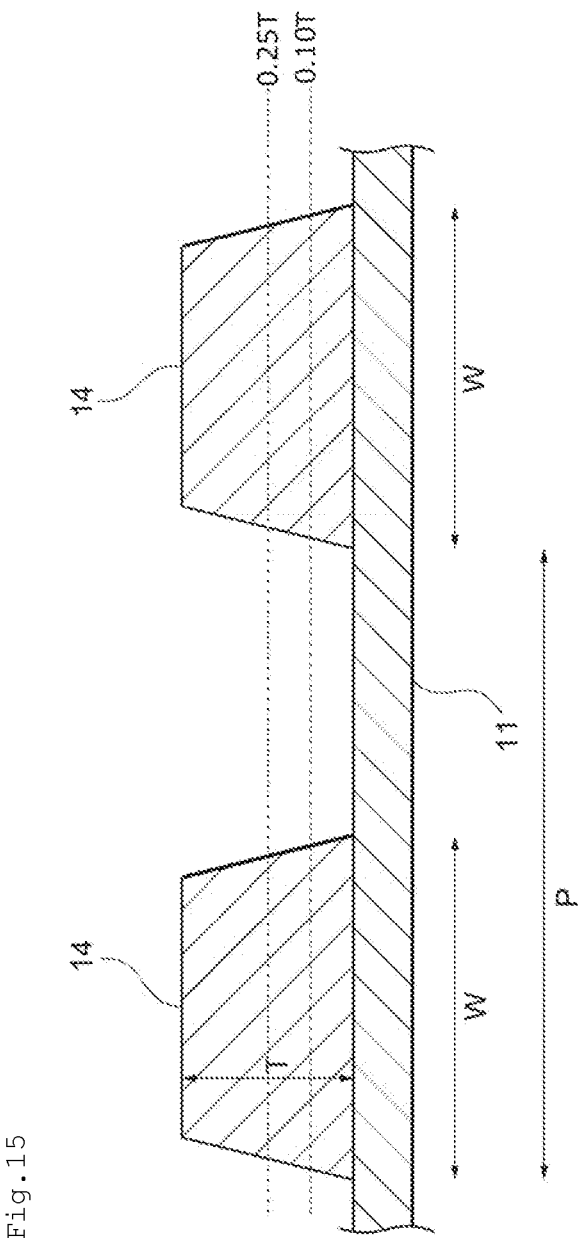
FIG. 15 shows a partial cross-sectional view taken along the III-III' line in the conductive film of FIG. 1. This drawing is for illustrating the cross-section of the fine metal wire of the third embodiment.

Line width W of the fine metal wire of the third embodiment refers to the line width of the fine metal wire 14 when the fine metal wire 14 is projected onto the surface of the transparent substrate 11 from the side where the fine metal wire pattern 12 is disposed, of the transparent substrate 11. FIG. 15 shows a partial cross-sectional view taken along the III-III' line in the conductive film of FIG. 1. Referring to this FIG. 15, the line width W of fine metal wire 14 having a trapezoidal cross-section is the width on the side contacted with the transparent substrate 11, of the fine metal wire 14. The thickness T of the fine metal wire means the maximum thickness when surface roughness is taken into consideration. Pitch P means the sum of the line width W and the distance between lines of the fine metal wire.

(Line Width)

The line width W of the fine metal wire is, for example, preferably 0.1 μm or larger and 5.0 μm or smaller, more preferably 0.2 μm or larger and 4.0 μm or smaller, further preferably 0.3 μm or larger and 3.0 μm or smaller, still further preferably 0.4 μm or larger and 2.5 μm or smaller. The line width W of the fine metal wire is 0.1 μm or larger, whereby conductivity tends to be further improved. Furthermore, reduction in conductivity ascribable to the oxidation, corrosion, or the like of the fine metal wire surface tends to be able to be sufficiently suppressed. A thinner line width of the fine metal wire permits increase in the number of lines of the fine metal wire at the same aperture ratio. This attains more uniform electrical field distribution of the conductive film so that this enables a higher-resolution electronic device to be fabricated. If some lines of the fine metal wire are broken, this influence can be compensated for by the other lines of the fine metal wire. On the other hand, the line width W of the fine metal wire is 5.0 μm or smaller, whereby the visibility of the fine metal wire is further reduced. Thus, the transparency of the conductive film tends to be further improved.

The thickness T of the fine metal wire is preferably 10 nm or larger and 1,000 nm or smaller. The lower limit of the thickness T is more preferably 50 nm or larger, further preferably 75 nm or larger. The thickness T of the fine metal wire is 10 nm or larger, whereby conductivity tends to be further improved. Reduction in conductivity ascribable to the oxidation, corrosion, or the like of the fine metal wire surface tends to be able to be sufficiently suppressed. On the other hand, the thickness T of the fine metal wire is 1,000 nm or smaller, whereby high transparency can be exerted in a wide view angle.

(Aspect Ratio)

The aspect ratio represented by the thickness T of the fine metal wire to the line width W of the fine metal wire is preferably 0.05 or more and 1.00 or less. The lower limit of the aspect ratio is more preferably 0.08 or more, further preferably 0.10 or more. The aspect ratio is 0.05 or more, whereby conductivity tends to be able to be further improved without reducing the visible light transmittances.

(Pitch)

The pitch P of the fine metal wire pattern is preferably 5 μm or larger, more preferably 50 μm or larger, further preferably 100 μm or larger. The pitch P of the fine metal wire pattern is 5 μm or larger, whereby a favorable transmittance can be obtained. The pitch P of the fine metal wire pattern is preferably 1,000 µm or smaller, more preferably 500 µm or smaller, further preferably 250 µm or smaller. The pitch P of the fine metal wire pattern is 1,000 µm or smaller, whereby conductivity tends to be able to be further improved. When the shape of the fine metal wire pattern is a mesh pattern, an aperture ratio of 99% can be attained by setting the pitch to 200 µm of a fine metal wire pattern having a line width of 1 µm.

The line width, aspect ratio, and pitch of the fine metal wire pattern can be confirmed by observing the conductive film cross-section under an electron microscope or the like. The line width and pitch of the fine metal wire pattern can also be observed under a laser microscope or an optical microscope. Since the pitch and the aperture ratio have a relational expression mentioned later, one of these factors can be calculated if the other factor is known. Examples of the method for adjusting the line width, aspect ratio, and pitch of the fine metal wire pattern to the desired ranges include a method of adjusting grooves of a printing plate for use in a method for producing the conductive film mentioned later, and a method of adjusting the average particle size of metal particles in ink.

(Aperture Ratio)

The lower limit value of the aperture ratio of the fine metal wire pattern is preferably 60% or more, more preferably 70% or more, further preferably 80% or more, particularly preferably 90% or more. The aperture ratio of the fine metal wire pattern is equal to or more than the specific value mentioned above, whereby the transmittance of the conductive film tends to be further improved. The upper limit value of the aperture ratio of the fine metal wire pattern is preferably less than 100%, more preferably 95% or less, further preferably 90% or less, still further preferably 80% or less, even further preferably 70% or less, particularly preferably 60% or less. The aperture ratio of the fine metal wire pattern is equal to or less than the specific value mentioned above, whereby the conductivity of the conductive film tends to be further improved. The aperture ratio of the fine metal wire pattern also differs in appropriate value depending on the shape of the fine metal wire pattern. The upper limit value and lower limit value of the aperture ratio of the fine metal wire pattern can be appropriately combined according to the required performance (transmittance and sheet resistance) of an intended electronic device.

The "aperture ratio of the fine metal wire pattern" can be calculated according to an expression given below as to a region where the fine metal wire pattern is formed on the transparent substrate. The region where the fine metal wire pattern is formed on the transparent substrate is a range represented by S in FIG. 1 and excludes a marginal part and the like where the fine metal wire pattern is not formed.

Aperture ratio=(1−Area occupied by the fine metal wire pattern/Area of the transparent substrate)×100

The relational expression of the aperture ratio and the pitch differs depending on the shape of the fine metal wire pattern. Their relationship can be calculated as given below. FIG. 6 shows a schematic view of a mesh pattern (grid pattern) having pattern unit 16. In the case of this mesh pattern, the aperture ratio and the pitch have the following relational expression:

Aperture ratio={Area of opening part 15/Area of pattern unit 16}×100={((Pitch P1−Line width W1)×(Pitch P2−Line width W2))/(Pitch P1×Pitch P2)}×100

FIG. 7 shows a schematic view of a line pattern. In the case of this line pattern, the aperture ratio and the pitch have the following relational expression:

Aperture ratio={(Pitch P−Line width W)/Pitch P}×100

(Sheet Resistance)

The sheet resistance of the conductive film is 0.1 Ω/sq or more and 500 Ω/sq or less, preferably 0.1 Ω/sq or more and 200 Ω/sq or less, more preferably 0.1 Ω/sq or more and 100 Ω/sq or less, further preferably 0.1 Ω/sq or more and 20 Ω/sq or less, still further preferably 0.1 Ω/sq or more and 10 Ω/sq or less. A lower sheet resistance tends to suppress power loss. Hence, an electronic paper, a touch panel, and a flat-panel display having less power consumption can be obtained by using the conductive film having a low sheet resistance. The sheet resistance of the conductive film can be measured by a method given below.

FIG. 13 shows a perspective view for illustrating the method for measuring the sheet resistance. First, a rectangular portion throughout which the fine metal wire pattern is disposed is cut out of the conductive film to obtain a measurement sample. Current collector parts for sheet resistance measurement electrically connected to the fine metal wire pattern are formed at both ends of the obtained measurement sample. Electrical resistance R (Ω) between the current collector parts is measured. Sheet resistance $R_s$ (Ω/sq) can be calculated according to the following expression from the obtained electrical resistance R (Ω), distance L (mm) between the current collector parts of the measurement sample, and length D (mm) in the depth direction.

$R_s=R/L\times D$

The sheet resistance of the conductive film tends to be reduced with increase in the aspect ratio (thickness) of the fine metal wire. The sheet resistance may be adjusted by selecting the type of the metal material constituting the fine metal wire.

A lower sheet resistance tends to suppress power loss. Hence, an electronic paper, a touch panel, and a flat-panel display having less power consumption can be obtained.

(Visible Light Transmittance)

The visible light transmittance of the conductive film is preferably 80% or more and 100% or less, more preferably 90% or more and 100% or less. In this context, the visible light transmittance can be measured in accordance with JIS K 7361-1: 1997 for total light transmittance by calculating the transmittance in a range of the visible light (360 to 830 nm).

The visible light transmittance of the conductive film tends to be further improved by decreasing the line width of the fine metal wire pattern or by increasing the aperture ratio thereof.

(Haze)

The haze of the conductive film is preferably 0.01% or more and 5.00% or less. The upper limit of the haze is more preferably 3.00% or less, further preferably 1.00% or less. When the upper limit of the haze is 5.00% or less, the cloudiness of the conductive film to visible light can be sufficiently reduced. The haze described herein can be measured in accordance with JIS K 7136: 2000 for haze.

[Transparent Substrate]

The term "transparent" of the transparent substrate means that the visible light transmittance is preferably 80% or more, more preferably 90% or more, further preferably 95% or more. In this context, the visible light transmittance can be measured in accordance with JIS K 7361-1: 1997.

Examples of the material of the transparent substrate include, but are not particularly limited to: transparent inorganic substrates such as glass; and transparent organic substrates such as acrylic acid ester, methacrylic acid ester, polyethylene terephthalate, polybutylene terephthalate, polyethylene naphthalate, polycarbonate, polyarylate, polyvinyl chloride, polyethylene, polypropylene, polystyrene, nylon, aromatic polyamide, polyether ether ketone, polysulfone, polyethersulfone, polyimide, and polyetherimide. Among them, polyethylene terephthalate, polyimide, or polyethylene naphthalate is preferred. Use of polyethylene terephthalate attains better productivity (cost reduction effect) for producing the conductive film and tends to further improve the adhesion of the transparent substrate to the fine metal wire. Use of polyimide tends to further improve the heat resistance of the conductive film. Use of polyethylene naphthalate and/or polyethylene terephthalate tends to attain better adhesion of the transparent substrate to the fine metal wire.

The transparent substrate may be made of one material or may be made of two or more materials laminated with each other. When the transparent substrate is multi-layered such that two or more materials are laminated with each other, the transparent substrate may be made of organic substrates or inorganic substrates laminated with each other or may be made of an organic substrate(s) and an inorganic substrate(s) laminated with each other.

The thickness of the transparent substrate is preferably 5 μm or larger and 500 μm or smaller, more preferably 10 μm or larger and 100 μm or smaller.

[Intermediate Layer]

The conductive film of the third embodiment may have an intermediate layer between the transparent substrate and the conductive part. The intermediate layer is capable of contributing to improvement in the adhesion between the transparent substrate and the fine metal wire of the conductive part.

Examples of the component contained in the intermediate layer include, but are not particularly limited to: silicon compounds such as (poly)silanes, (poly)silazanes, (poly)silthianes, (poly)siloxanes, silicon, silicon carbide, silicon oxide, silicon nitride, silicon chloride, silicate, zeolite, and silicide; aluminum compounds such as aluminum oxide; and magnesium compounds such as magnesium fluoride. Among them, at least one member selected from the group consisting of silicon oxide, silicon nitride, aluminum oxide, and magnesium fluoride is preferred. Use of such a component tends to further improve the transparency and durability of the conductive film and attains better productivity (cost reduction effect) for producing the conductive film.

The thickness of the intermediate layer is preferably 0.01 μm or larger and 500 μm or smaller, more preferably 0.05 μm or larger and 300 μm or smaller, further preferably 0.10 μm or larger and 200 μm or smaller. The thickness of the intermediate layer is 0.01 μm or larger, whereby the adhesion of the intermediate layer to the fine metal wire is exerted. The thickness of the intermediate layer is 500 μm or smaller, whereby the flexibility of the transparent substrate can be ensured.

The intermediate layer laminated on the transparent substrate can prevent plasma or the like from etching the transparent substrate at a site uncovered with the fine metal wire pattern part when a metal component in ink is sintered by a sintering process such as plasma.

This intermediate layer preferably further has an antistatic function in order to prevent the breaking of the fine metal wire pattern ascribable to static electricity. For the intermediate layer having an antistatic function, it is preferred that the intermediate layer should comprise at least any of a conductive inorganic oxide and a conductive organic compound.

The volume resistivity of the intermediate layer is preferably 100 Ωcm or more and 100000 Ωcm or less, more preferably 1000 Ωcm or more and 10000 Ωcm or less, still more preferably 2000 Ωcm or more and 8000 Ωcm or less. The volume resistivity of the intermediate layer is 100000 Ωcm or less, whereby an antistatic function is exerted. The volume resistivity of the intermediate layer is 100 Ωcm or more, whereby the resulting conductive film can be suitably used for application such as touch panels for which high electrical conduction between fine metal wire patterns is undesirable.

The volume resistivity can be adjusted by the content of the conductive inorganic oxide, the conductive organic compound, or the like in the intermediate layer. When the intermediate layer comprises, for example, highly plasma-resistant silicon oxide (volume specific resistance: 1014 Ω·cm or more) and an organosilane compound as the conductive organic compound, the volume resistivity can be reduced by increasing the content of the organosilane compound. On the other hand, the thin film can be formed without impairing optical characteristics by increasing the content of the silicon oxide, because of the high plasma resistance, although the volume resistivity is increased.

Third Embodiment: Method for Producing Conductive Film

Examples of the method for producing the conductive film of the third embodiment include, but are not particularly limited to, a method having a pattern formation step of forming a pattern on a transparent substrate using ink containing a metal component, and a sintering step of sintering the pattern to form a fine metal wire. In this case, the method for producing the conductive film of the third embodiment may comprise an intermediate layer formation step of forming an intermediate layer on the surface of the transparent substrate, prior to the pattern formation step.

[Intermediate Layer Formation Step]

The intermediate layer formation step is the step of forming an intermediate layer on the surface of the transparent substrate. Examples of the method for forming the intermediate layer include, but are not particularly limited to: a method of forming a vapor-deposited film on the transparent substrate surface by a vapor deposition such as physical vapor deposition (PVD) or chemical vapor deposition (CVD); a method of forming a coating film by applying a composition for intermediate layer formation onto the transparent substrate surface, followed by drying.

The composition for intermediate layer formation contains any of the components listed as examples of the component contained in the intermediate layer, or a precursor thereof, and a solvent and may contain, if necessary, a surfactant, a dispersant, a binder, or the like.

[Pattern Formation Step]

The pattern formation step is the step of forming a pattern using ink containing a metal component. The pattern formation step is not particularly limited as long as the step is performed by a plate printing method using a printing plate having grooves of the desired fine metal wire pattern. Such a method has, for example, the steps of: coating transfer medium surface with ink; allowing the transfer medium surface coated with ink to face the protruding portion surface of a relief printing plate, and pressing and contacting these surfaces to transfer the ink on the transfer medium surface to the protruding portion surface of the relief printing plate; and allowing the transfer medium surface coated with ink to face the surface of the transparent substrate, and pressing and contacting these surfaces to transfer the ink remaining on the transfer medium surface to the surface of the transparent substrate. When the intermediate layer is formed on the transparent substrate, the ink is transferred to the intermediate layer surface.

(Ink)

The ink for use in the pattern formation step contains a metal component containing conductive metal atom M, and a solvent and may contain, if necessary, a surfactant, a dispersant, a reducing agent, or the like. The metal component may be contained as metal particles in the ink or may be contained as a metal complex in the ink.

In the case of using metal particles, their average primary particle size is preferably 100 nm or smaller, more preferably 50 nm or smaller, further preferably 30 nm or smaller. The lower limit of the average primary particle size of the metal particles is not particularly limited and is, for example, 1 nm or larger. The average primary particle size of the metal particles is 100 nm or smaller, whereby the line width W of the resulting fine metal wire can be further thinned. In the third embodiment, the "average primary particle size" refers to the particle size of each individual metal particle (so-called primary particle) and is distinguished from an average secondary particle size which is the particle size of an aggregate (so-called secondary particle) formed by a plurality of metal particles together.

The metal particles may be in the form of a metal oxide such as copper oxide, a metal compound, or core/shell particles having copper in the core part and copper oxide in the shell part, as long as the metal particles contain conductive metal atom M. The form of the metal particles can be appropriately determined from the viewpoint of dispersibility and sinterability.

Examples of the surfactant include, but are not particularly limited to, silicone surfactants and fluorine surfactants. Use of such a surfactant improves the coatability of a transfer medium (blanket) with the ink and the smoothness of the ink used in coating and tends to produce a more uniform coating film. The surfactant is preferably configured so as to permit dispersion of the metal component and to be less likely to remain in sintering.

Examples of the dispersant include, but are not particularly limited to, a dispersant that noncovalently binds to or interacts with the metal component, and a dispersant that covalently binds to the metal component. Examples of the functional group for noncovalent binding or interaction include dispersants having a phosphoric acid group. Use of such a dispersant tends to further improve the dispersibility of the metal component.

Examples of the solvent include: alcohol solvents such as monoalcohols and polyalcohols; alkyl ether solvents; hydrocarbon solvents; ketone solvents; and ester solvents. These solvents may be used singly, or one or more thereof may be used in combination. For example, a monoalcohol having 10 or less carbon atoms and a polyalcohol having 10 or less carbon atoms are used in combination. Use of such a solvent tends to further improve the coatability of a transfer medium (blanket) with the ink, the transferability of the ink from a transfer medium to a relief printing plate, the transferability of the ink from the transfer medium to the transparent substrate, and the dispersibility of the metal component. The solvent is preferably configured so as to permit dispersion of the metal component and to be less likely to remain in sintering.

The content of the component contained in the ink can be adjusted from the viewpoint of adjusting the amounts of carbon atom C and oxygen atom O in the fine metal wire. For example, the amounts of carbon atom C and oxygen atom O can be increased by increasing the content of the component or by using organic matter rich in carbon atom C and oxygen atom O as the component.

[Sintering Step]

The sintering step is the step of sintering a pattern to form a fine metal wire. This can produce a conductive part having the same fine metal wire pattern as the pattern obtained by the application of the ink. The sintering is not particularly limited as long as the method therefor can form a metal component sintered film by the fusion of the metal component. The sintering may be performed in, for example, a sintering furnace, or may be performed using plasma, a heating catalyst, ultraviolet ray, vacuum ultraviolet ray, electron beam, infrared lamp annealing, flash lamp annealing, laser, or the like. If the resulting sintered film is easily oxidized, the sintering is preferably performed in a non-oxidative atmosphere. If the metal oxide or the like is difficult to reduce with only the reducing agent that may be contained in the ink, the sintering is preferably performed in a reductive atmosphere.

The non-oxidative atmosphere is an atmosphere free from an oxidative gas such as oxygen and includes an inert atmosphere and a reductive atmosphere. The inert atmosphere is an atmosphere filled with an inert gas, for example, argon, helium, neon, or nitrogen. The reductive atmosphere refers to an atmosphere where a reductive gas such as hydrogen or carbon monoxide exists. A sintering furnace may be filled with such a gas, and the ink-coated film (dispersion-coated film) can be sintered in a closed system. Alternatively, the coated film may be sintered in the circulated system of a sintering furnace where such a gas is allowed to flow. In the case of sintering the coated film in a non-oxidative atmosphere, it is preferred that the sintering furnace should be temporarily vacuumized so that oxygen in the sintering furnace is removed and replaced with a non-oxidative gas. The sintering may be performed in a pressurized atmosphere or may be performed in a reduced pressure atmosphere.

It is possible that the sintering is performed in a reductive atmosphere from the viewpoint of reducing the content of the oxygen atom O in the fine metal wire and consequently adjusting the content ratio of the oxygen atom O in the fine metal wire interface, whereas the sintering is performed in a weakly reductive atmosphere or in an inert atmosphere from the viewpoint of increasing the content of the oxygen atom O in the fine metal wire and thereby adjusting the content ratio of the oxygen atom O in the fine metal wire interface.

The sintering temperature is not particularly limited and is preferably 20° C. or higher and 400° C. or lower, more preferably 50° C. or higher and 300° C. or lower, further preferably 80° C. or higher and 200° C. or lower, particularly preferably 90° C. or higher and 130° C. or lower. The sintering temperature of 400° C. or lower is preferred because a low heat-resistant substrate can be used. The sintering temperature of 20° C. or higher is preferred because the formation of a sintered film tends to proceed sufficiently, resulting in favorable conductivity. The resulting sintered film contains a conductive component derived from the metal component and may additionally contain the component used in the ink, or a non-conductive component according to the sintering temperature.

The sintering time is not particularly limited and is preferably 15 minutes or longer and 90 minutes or shorter, more preferably 20 minutes or longer and 80 minutes or shorter, further preferably 30 minutes or longer and 70 minutes or shorter. The sintering time of 90 minutes or shorter is preferred because a low heat-resistant substrate can be used. The sintering temperature of 15 minutes or longer is preferred because the formation of a sintered film tends to proceed sufficiently, resulting in favorable conductivity.

It is possible that the sintering is performed at a relatively high temperature for a long time from the viewpoint of reducing the content of the carbon atom C in the fine metal wire and consequently adjusting the content ratio of the carbon atom C in the fine metal wire interface, whereas the sintering is performed at a relatively low temperature for a short time from the viewpoint of increasing the content of the carbon atom C in the fine metal wire and thereby adjusting the content ratio of the carbon atom C in the fine metal wire interface.

Among others, for example, heat, plasma, electron beam, or a light source is preferably used as energy at the time of sintering from the viewpoint of adjusting the amount of the carbon atom C in the fine metal wire. The sintering may be performed a plurality of times, if necessary, by combining these sintering methods.

The third embodiment of the present invention can provide a conductive film having both of high conductivity and high adhesion between a transparent substrate and a fine metal wire, and an electronic paper, a touch panel, and a flat-panel display comprising the same.

[Conductive Film Roll]

The conductive film rolls of the first to third embodiments comprise the conductive films of the first to third embodiments wound into a roll. The conductive film roll may have a winding core around which the conductive film is wound, at the central part. The conductive film rolls of the first to third embodiments are cut, for use, into an appropriate size according to the desired application (e.g., electronic papers, touch panels, and flat-panel displays).

[Electronic Paper]

Figure 8:
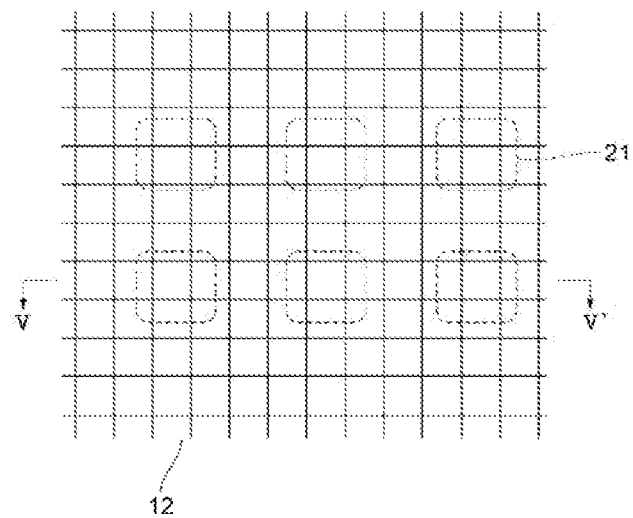
FIG. 8 shows a top view showing one form of an electronic paper comprising any of the conductive films of the first to third embodiments.
Figure 9:
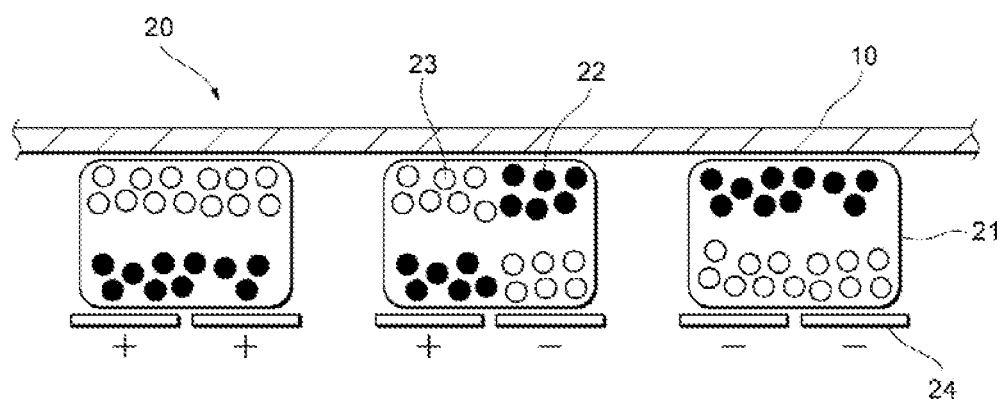
FIG. 9 shows a partial cross-sectional view taken along the V-V' line in the electronic papers of the first to third embodiments.
Figure 10:
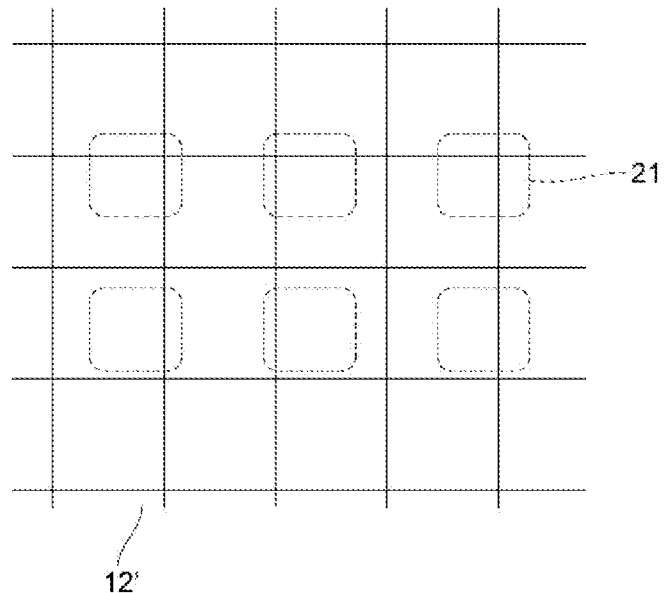
FIG. 10 shows a top view showing one form of an electronic paper comprising a conventional conductive film.

The electronic papers of the first to third embodiments are not particularly limited as long as the electronic papers comprise the conductive films of the first to third embodiments. FIG. 8 shows a top view showing one form of the electronic paper comprising any of the conductive films of the first to third embodiments (mesh pattern). FIG. 9 shows a partial cross-sectional view taken along the V-V' line in the electronic papers of the first to third embodiments. FIG. 10 shows a top view showing one form of an electronic paper comprising a conventional conductive film having the same aperture ratio as in FIG. 8 and a thicker line width of a fine metal wire.

As shown in FIG. 8, electronic paper 20 is configured such that fine metal wire pattern 12 is disposed on cups 21 and an electrical field can be applied to the cups 21. Specifically, as shown in FIG. 9, charged black pigment 22 and charged white pigment 23 are housed in the cups 21 of the electronic paper 20. The behaviors of the charged black pigment 22 and the charged white pigment 23 are controlled by the electrical field between bottom electrode 24 and conductive film 10.

As shown by the comparison between FIG. 8 and FIG. 10, a finer pattern of the fine metal wire having the same aperture ratio increases the number of transverse lines of fine metal wire 14 directly above the cups 21 and enables an electrical field to be more uniformly applied to the cups 21. Thus, the electronic paper 20 comprising any of the conductive films 10 of the first to third embodiments is capable of offering a higher-resolution image. The electronic paper 20 of the present embodiment is not limited to those described above.

[Touch Panel]

Figure 11:
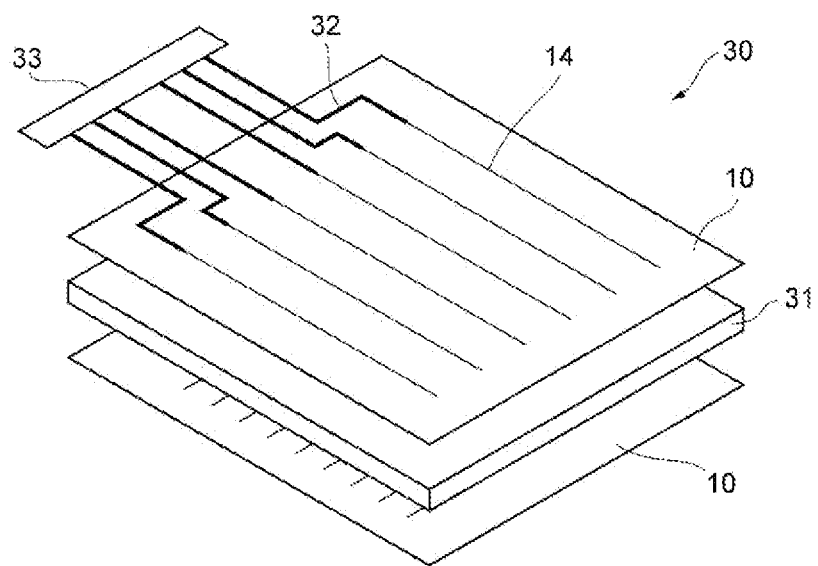
FIG. 11 shows a perspective view showing one form of a touch panel comprising any of the conductive films of the first to third embodiments.

The touch panels of the first to third embodiments are not particularly limited as long as the touch panels comprise the conductive films of the first to third embodiments. FIG. 11 shows a perspective view showing one form of the touch panel comprising any of the conductive films of the first to third embodiments (line pattern). In capacitive-type touch panel 30, two conductive films 10 are located on the front and back sides of insulator 31. These two conductive films 10 are opposed to each other such that their line patterns intersect each other. The conductive film 10 may have extraction electrode 32. The extraction electrode 32 is connected to the fine metal wire 14 and controller 33 (CPU, etc.) for switching the energization of the fine metal wire 14.

Figure 12:
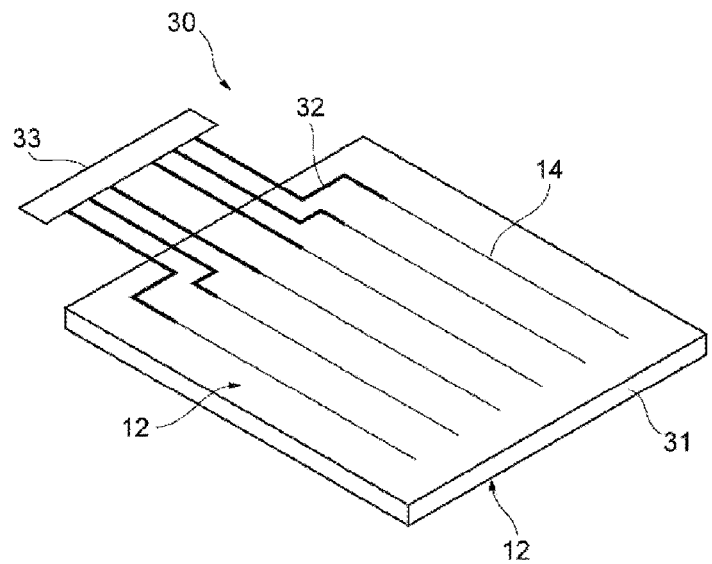
FIG. 12 shows a perspective view showing another form of a touch panel comprising any of the conductive films of the first to third embodiments.

FIG. 12 shows a perspective view showing another form of the touch panel comprising any of the conductive films of the first to third embodiments (line pattern). This touch panel 30 comprises fine metal wire patterns 12 on both sides of any of the conductive films 10 of the first to third embodiments, instead of comprising two conductive films 10 on the front and back sides of insulator 31. Thus, this touch panel 30 comprises the two fine metal wire patterns 12 on the front and back sides of the insulator 31 (transparent substrate 11).

The touch panels of the first to third embodiments are not limited by the capacitive type and may be of resistive type, projected capacitive type, surface capacitive type, or the like.

[Flat-Panel Display]

The flat-panel displays of the first to third embodiments are not particularly limited as long as the flat-panel displays comprise the conductive films of the first to third embodiments.

EXAMPLES

Hereinafter, the embodiments of the present invention will be specifically described with reference to Examples and Comparative Examples. However, the present invention is not limited by these Examples and Comparative Examples by any means.

Example A

Hereinafter, Example A and Comparative Example A regarding the first embodiment will be specifically described.

<<Transparent Substrate A>>

[Preparation of Transparent Substrate A1]

Polyethylene terephthalate (PET) was used as a transparent substrate. An intermediate layer-forming composition containing silicon oxide nanoparticles and a conductive organosilane compound was applied thereto and dried so that an intermediate layer having an antistatic function, having a thickness of 150 nm and a volume resistivity of 5000 Ωcm, and containing silicon oxide was formed to obtain transparent substrate A1. The transparent substrate A1 was in a form where the intermediate layer was laminated on the transparent substrate PET.

[Preparation of Transparent Substrate A2]

PET used for the preparation of the transparent substrate A1 was used as transparent substrate A2.

<<Ink A>>

[Ink A1]

20 parts by mass of copper oxide nanoparticles (fine cupric oxide particles manufactured by CIK NanoTek Corp.), 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of an organic solvent (n-butanol and 2-propylene glycol) were mixed to prepare ink A1 containing the copper oxide nanoparticles dispersed therein.

[Ink A2]

20 parts by mass of cuprous oxide nanoparticles having a particle size of 21 nm, 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of ethanol were mixed to prepare ink A2 having a cuprous oxide nanoparticle content ratio of 20% by mass.

[Ink A3]

5.0 parts by mass of organopolysiloxane were added to 100 parts by mass of the ink A1 to prepare ink A3.

Example A1

<<Production of Conductive Film>>

First, ink A1 was applied to transfer medium surface. Subsequently, the transfer medium surface coated with ink A1 was allowed to face a printing plate having grooves of a fine metal wire pattern, pressed and contacted to transfer a portion of the ink A1 on the transfer medium surface to the protruding portion surface of the printing plate. Then, the transfer medium surface coated with the remaining ink A1 was allowed to face transparent substrate A1, pressed and contacted to transfer the ink A1 having the desired fine metal wire pattern onto the transparent substrate A1. Subsequently, the ink A1 having the fine metal wire pattern (dispersion-coated film) was sintered by flash lamp annealing in a room temperature environment using Pulseforge 1300 manufactured by NovaCentrix to obtain a conductive film comprising a fine metal wire in a mesh pattern having the line width and the thickness shown in Table 1.

<<Evaluation of Conductive Film>>

Example A: Sheet Resistance

Sheet resistance $R_{s0}$ (Ω/sq) of the obtained conductive film was measured by the following method: a measurement sample of 100 mm square was cut out of a portion throughout which the fine metal wire pattern was disposed in the conductive film. Subsequently, silver paste was applied to both ends in the width direction of the surface of the obtained measurement sample using a screen printing apparatus, and dried to form current collector parts which is 10 mm width×100 mm depth as shown in FIG. 13. Subsequently, electrical resistance R (Ω) between both ends of the sample was measured by the two-terminal method involving the contact of ohmmeter measuring terminals. The sheet resistance $R_{s0}$ (Ω/sq) was calculated according to an expression given below from the obtained electrical resistance. The results are shown in Table 1 below. The sheet resistance of a conductive film having a protective layer on the surface was measured by preparing a conductive film in which the current collector parts were exposed from the fine metal wire pattern and the other part of the fine metal wire pattern was covered with the protective layer. Specifically, the current collector parts formed by the method mentioned above were masked. A protective layer was formed. Finally, the masking was removed to prepare a conductive film in which only the current collector parts were exposed.

$R_{s0}=R/L \times D$

L: 80 (mm): distance between the current collector parts
D: 100 (mm): distance in the depth direction Example A: Visible Light Transmittance and Haze The visible light transmittance of the conductive film was measured by calculating a transmittance to visible light having a wavelength of 360 to 830 nm in accordance with JIS K 7361-1: 1997 for total light transmittance. The haze of the conductive film was also measured in accordance with JIS K 7136: 2000. The results are shown in Table 1 below.

Example A: STEM-EDX Analysis on Cross-Section of Fine Metal Wire

The obtained conductive film was embedded in an epoxy resin as support and cut on the fine metal wire side perpendicular to the direction of drawing of the fine metal wire using an ultramicrotome to form a thin section having a thickness of 80 nm. The obtained thin section was used as a measurement sample and subjected to STEM-EDX analysis by irradiation with electron beam under the following conditions.

STEM: manufactured by Hitachi High-Technologies Corp., scanning transmission electron microscope HD-2300A EDX: manufactured by EDAX/AMETEK Inc., energy dispersive X-ray spectroscopy apparatus GENESIS Acceleration voltage: 200 kV
Measurement magnification: ×25,000
Incident angle of electron beam: 90°
X-ray extraction angle: 18°
Mapping element: Cu, Ag, and Si
The number of integrations: 200
Dwell time: 200 μsec.
Resolution: 256×200 pixels First, the maximum thickness T from the fine metal wire interface on the transparent substrate side to the fine metal wire surface was calculated from a STEM image of the fine metal wire cross-section obtained by STEM. Subsequently, the atom % of Si atoms was calculated from an integrated EDX intensity value of the K shells of silicon atoms Si in a thickness region from 0.10 T to 0.90 T from the fine metal wire interface on the transparent substrate side. The atom % of M atoms was calculated from an integrated EDX intensity value of the K shells of conductive metal atoms M except for silicon in the thickness region from 0.10 T to 0.90 T from the fine metal wire interface on the transparent substrate side. $Si/M_{0.10-0.90}$ was thereby calculated. Subsequently, the atom % of Si atoms was calculated from an integrated EDX intensity value of the K shells of silicon atoms Si in a thickness region from 0.10 T to 0.25 T from the fine metal wire interface on the transparent substrate side. The atom % of M atoms was calculated from an integrated EDX intensity value of the K shells of conductive metal atoms M except for silicon in the thickness region from 0.10 T to 0.25 T from the fine metal wire interface on the transparent substrate side. $Si/M_{0.10-0.25}$ was thereby calculated. Subsequently, the atom % of Si atoms was calculated from an integrated EDX intensity value of the K shells of silicon atoms Si in a thickness region from 0.75 T to 0.90 T from the fine metal wire interface on the transparent substrate side. The atom % of M atoms was calculated from an integrated EDX intensity value of the K shells of conductive metal atoms M except for silicon in the thickness region from 0.75 T to 0.90 T from the fine metal wire interface on the transparent substrate side. $Si/M_{0.75-0.90}$ was thereby calculated.

Example A: Flexibility

In order to evaluate the flexibility of the conductive film, the rate of change in sheet resistance (%) between before and after a repeated bending test was measured. In the repeated bending test, the conductive film used in the sheet resistance measurement was used and measured under conditions given below in accordance with JIS C 5016: 1994 using a film bending tester (IMC-1304) manufactured by Imoto Machinery Co., Ltd. as a bending tester. In the case of poor flexibility, the rate of change in sheet resistance was large due to the breaking of the fine metal wire, etc. In the case of excellent flexibility, the rate of change in sheet resistance was small.
  Bend radius: 5 mm
  Test stroke: 20 mm
  Bending rate: 90 rpm
  The number of times of bending: 10,000

Subsequently, sheet resistance $R_{s1}$ (Ω/sq) of the conductive film was measured after the repeated bending test. The rate of change in sheet resistance was calculated according to the following expression.

(Rate of change in sheet resistance)=$R_{s1}/R_{s0} \times 100$

Example A2

A dispersion-coated film having a mesh pattern was formed on a transparent substrate of the type shown in Table 1 using a printing plate having grooves of a fine metal wire pattern, ink of the type shown in Table 1, and a transfer medium impregnated with liquid organopolysiloxane. Subsequently, the dispersion-coated film was sintered by flash lamp annealing in a room temperature environment using Pulseforge 1300 manufactured by NovaCentrix to obtain a conductive film comprising a fine metal wire in a mesh pattern having the line width and the thickness shown in Table 1. Various characteristics of the obtained conductive film are shown in Table 1.

Example A3

A conductive film comprising a fine metal wire in a mesh pattern having the line width and the thickness shown in Table 1 was obtained in the same way as in Example A1 except that: ink A2 was used; and sintering and reduction using plasma were performed instead of flash lamp annealing. Various characteristics of the obtained conductive film are shown in Table 1.

Examples A4 to A6 and Comparative Examples A1 and A2

A dispersion-coated film having a mesh pattern was formed on a transparent substrate of the type shown in Table 1 using a printing plate having grooves of a fine metal wire pattern and ink of the type shown in Table 1. Subsequently, the dispersion-coated film was sintered by flash lamp annealing in a room temperature environment using Pulseforge 1300 manufactured by NovaCentrix to obtain a conductive film comprising a fine metal wire in a mesh pattern having the line width and the thickness shown in Table 1. Various characteristics of the obtained conductive film are shown in Table 1.

TABLE 1

| | Type of transparent substrate | Type of ink | Line width (µm) | Thickness (µm) | Atom % ratio Si/M | | | Conductivity Sheet resistance (Ω/sq) | Transparency Visible light transmittance (%) | Haze (%) | Flexibility Rate of change in sheet resistance (%) |
|---|---|---|---|---|---|---|---|---|---|---|---|
| | | | | | Si/$M_{0.10-0.90}$ | Si/$M_{0.10-0.25}$ | Si/$M_{0.75-0.90}$ | | | | |
| Example A1 | A1 | A1 | 1.0 | 0.125 | 0.006 | 0.007 | 0.005 | 115 | 90 | 1.89 | 117 |
| Example A2 | A1 | A1 | 1.0 | 0.122 | 0.015 | 0.017 | 0.012 | 117 | 90 | 1.91 | 118 |
| Example A3 | A1 | A1 | 1.0 | 0.120 | 0.065 | 0.067 | 0.063 | 127 | 90 | 2.09 | 125 |
| Example A4 | A1 | A2 | 1.0 | 0.139 | 0.061 | 0.062 | 0.059 | 110 | 90 | 2.68 | 117 |
| Example A5 | A1 | A1 | 0.5 | 0.084 | 0.013 | 0.014 | 0.012 | 132 | 91 | 1.95 | 121 |
| Example A6 | A1 | A1 | 2.0 | 0.153 | 0.005 | 0.006 | 0.004 | 113 | 90 | 1.83 | 118 |
| Example A7 | A1 | A1 | 5.0 | 0.197 | 0.003 | 0.003 | 0.003 | 108 | 89 | 1.86 | 121 |
| Comparative Example A1 | A2 | A1 | 1.0 | 0.118 | 0.000 | 0.000 | 0.000 | 138 | 90 | 1.94 | 174 |
| Comparative Example A2 | A1 | A3 | 1.0 | 0.101 | 0.085 | 0.089 | 0.080 | 255 | 89 | 2.21 | 138 |

Examples A1 to A6 and Comparative Examples A1 and A2 demonstrated that a conductive film that is excellent in both conductivity (i.e., low sheet resistance) and flexibility while maintaining its sufficient transparency (i.e., low visibility because of a small line width) can be obtained by setting atom % ratio Si/M of the silicon atom Si to the conductive metal atom M in STEM-EDX analysis on the cross-section of the fine metal wire perpendicular to the direction of drawing of the fine metal wire to 0.001 or more and 0.070 or less.

Example A'

Hereinafter, Example A' and Comparative Example A' regarding the first embodiment will be specifically described.
  <<Transparent Substrate A'>>
  [Preparation of Transparent Substrate A'1]
  Polyethylene terephthalate (PET) was used as a transparent substrate. An intermediate layer having a thickness of 50 nm and containing silicon oxide was formed thereon by film formation according to the sputtering method to obtain transparent substrate A'1. The transparent substrate A'1 was in a form where the intermediate layer was laminated on the transparent substrate PET.

[Preparation of Transparent Substrate A'2]

PET was used as a transparent substrate. An intermediate layer-forming composition containing silicon oxide nanoparticles dispersed therein was applied thereonto and dried so that an intermediate layer having an antistatic function, having a thickness of 150 nm and a volume resistivity of 5000 Ωcm, and containing silicon oxide was formed to obtain transparent substrate A'2. The transparent substrate A'2 was in a form where the intermediate layer was laminated on the transparent substrate PET.

[Preparation of Transparent Substrate A'3]

Transparent substrate A'3 having an intermediate layer was prepared in the same way as the method for preparing the transparent substrate A'2 except that polyethylene naphthalate (PEN) was used instead of PET as an organic substrate. The transparent substrate A'3 was in a form where the intermediate layer was laminated on the transparent substrate PEN.

[Preparation of Transparent Substrate A'4]

PET used for the preparation of the transparent substrate A'1 was used as transparent substrate A'4.

<<Ink A'>>

[Ink A'1]

20 parts by mass of copper oxide nanoparticles (fine cupric oxide particles manufactured by CIK NanoTek Corp.), 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of an organic solvent (n-butanol and 2-propylene glycol) were mixed to prepare ink A'1 containing the copper oxide nanoparticles dispersed therein.

[Ink A'2]

50 parts by mass of ethanol were added to 100 parts by mass of silver nanoink (RAGT-29) manufactured by DIC Corp. to prepare ink A'2.

Example A'1

<<Production of Conductive Film>>

First, ink A'1 was applied to transfer medium surface. Subsequently, the transfer medium surface coated with ink A'1 was allowed to face a printing plate having grooves of a fine metal wire pattern, pressed and contacted to transfer a portion of the ink A'1 on the transfer medium surface to the protruding portion surface of the printing plate. Then, the transfer medium surface coated with the remaining ink A'1 was allowed to face transparent substrate A'1, pressed and contacted to transfer the ink A'1 having the desired fine metal wire pattern onto the transparent substrate A'1. Subsequently, the ink A'1 having the fine metal wire pattern (dispersion-coated film) was sintered by flash lamp annealing in a room temperature environment using Pulseforge 1300 manufactured by NovaCentrix to obtain a conductive film comprising a fine metal wire in a mesh pattern having the line width shown in Table 2.

<<Evaluation of Conductive Film>>

In Example A', a sheet resistance, a visible light transmittance and a haze, STEM-EDX analysis on the cross-section of the fine metal wire, and flexibility were measured or conducted in the same way as the methods described in Example A.

Examples A'2 and A'4 to A'7 and Comparative Examples A'1 and A'2

A dispersion-coated film having a mesh pattern was formed on a transparent substrate of the type shown in Table 2 using a printing plate having grooves of a fine metal wire pattern and ink of the type shown in Table 2. Subsequently, the dispersion-coated film was sintered by flash lamp annealing in a room temperature environment using Pulseforge 1300 manufactured by NovaCentrix to obtain a conductive film comprising a fine metal wire in a mesh pattern having the line width shown in Table 2. Various characteristics of the obtained conductive film are shown in Table 2.

Example A'3

A dispersion-coated film having a mesh pattern was formed on a transparent substrate of the type shown in Table 2 using a printing plate having grooves of a fine metal wire pattern, ink of the type shown in Table 2, and a transfer medium impregnated with liquid organopolysiloxane. Subsequently, the dispersion-coated film was sintered by flash lamp annealing in a room temperature environment using Pulseforge 1300 manufactured by NovaCentrix to obtain a conductive film comprising a fine metal wire in a mesh pattern having the line width shown in Table 2. Various characteristics of the obtained conductive film are shown in Table 2.

TABLE 2

| | Type of transparent substrate | Type of ink | Line width (μm) | Thickness (μm) | Atom % ratio Si/M | | | Conductivity Sheet resistance (Ω/sq) | Transparency | | Flexibility Rate of change in sheet resistance (%) |
| | | | | | Si/$M_{0.10-0.90}$ | Si/$M_{0.10-0.25}$ | Si/$M_{0.75-0.90}$ | | Visible light transmittance (%) | Haze (%) | |
|---|---|---|---|---|---|---|---|---|---|---|---|
| Example A'1 | A'1 | A'1 | 1.0 | 0.089 | 0.007 | 0.009 | 0.006 | 110 | 90 | 1.72 | 114 |
| Example A'2 | A'2 | A'1 | 1.0 | 0.090 | 0.009 | 0.010 | 0.009 | 109 | 92 | 1.83 | 113 |
| Example A'3 | A'2 | A'1 | 1.0 | 0.086 | 0.023 | 0.026 | 0.020 | 112 | 91 | 1.70 | 117 |
| Example A'4 | A'2 | A'1 | 0.5 | 0.072 | 0.011 | 0.012 | 0.009 | 111 | 93 | 2.01 | 113 |
| Example A'5 | A'2 | A'1 | 2.0 | 0.203 | 0.009 | 0.010 | 0.008 | 106 | 91 | 1.63 | 109 |
| Example A'6 | A'2 | A'1 | 5.0 | 0.488 | 0.008 | 0.010 | 0.006 | 101 | 90 | 1.59 | 105 |
| Example A'7 | A'3 | A'1 | 1.0 | 0.091 | 0.010 | 0.013 | 0.008 | 111 | 92 | 1.84 | 114 |
| Comparative Example A'1 | A'4 | A'1 | 1.0 | 0.088 | 0.000 | 0.000 | 0.000 | 132 | 92 | 1.80 | 163 |
| Comparative Example A'2 | A'4 | A'2 | 1.0 | 0.152 | 0.000 | 0.000 | 0.000 | 136 | 91 | 2.22 | 172 |

Examples A'1 to A'7 and Comparative Examples A'1 and A'2 demonstrated that a conductive film that is excellent in both conductivity (i.e., low sheet resistance) and flexibility while maintaining its sufficient transparency (i.e., low visibility because of a small line width) can be obtained by setting atom % ratio Si/M of the silicon atom Si to the conductive metal atom M in STEM-EDX analysis on the cross-section of the fine metal wire perpendicular to the direction of drawing of the fine metal wire to 0.001 or more and 0.070 or less.

Example B

Hereinafter, Example B and Comparative Example B regarding the second embodiment will be specifically described.

<<Transparent Substrate B>>

[Preparation of Transparent Substrate B1]

Polyethylene terephthalate (PET) was used as a transparent substrate. An intermediate layer-forming composition containing silicon oxide nanoparticles and a conductive organosilane compound was applied thereonto and dried so that an intermediate layer having an antistatic function, having a thickness of 150 nm and a volume resistivity of 5000 Ωcm, and containing silicon oxide was formed to obtain transparent substrate B1.

<<Ink B>>

[Ink B1]

20 parts by mass of copper oxide nanoparticles (fine cupric oxide particles manufactured by CIK NanoTek Corp.), 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of an organic solvent (n-butanol and 2-propylene glycol) were mixed to prepare ink B1 containing the copper oxide nanoparticles dispersed therein.

[Ink B2]

20 parts by mass of commercially available silver oxide nanoparticles, 5 parts by mass of a dispersant (hydroxypropylcellulose), and 75 parts by mass of an organic solvent (secondary butyl alcohol) were mixed to prepare ink B2 containing the silver oxide nanoparticles dispersed therein.

Example B1

<<Production of Conductive Film>>

First, ink B1 was applied to transfer medium surface. Subsequently, the transfer medium surface coated with ink B1 was allowed to face a printing plate having grooves of a fine metal wire pattern, pressed and contacted to transfer a portion of the ink B1 on the transfer medium surface to the protruding portion surface of the printing plate. Then, the transfer medium surface coated with the remaining ink B1 was allowed to face transparent substrate B1, pressed and contacted to transfer the ink B1 having the desired fine metal wire pattern onto the transparent substrate B1. Subsequently, the pattern of the ink B1 was sintered under conditions given below using a commercially available infrared oven so that the reduction of copper oxide on the fine metal wire surface side was promoted to obtain a conductive film having a fine metal wire in a mesh pattern having a line width of 1 μm in which oxygen atom O was unevenly distributed in the interface on the transparent substrate B1 side.

Heat source: infrared lamp
Irradiation temperature: 180° C.
Irradiation time: 220 min
Environment: hydrogen-containing nitrogen atmosphere <<Evaluation of Conductive Film>>

Example B: Sheet Resistance

Sheet resistance $R_{s0}$ (Ω/sq) of the obtained conductive film was measured by the following method: a measurement sample of 100 mm square was cut out of a portion throughout which the fine metal wire pattern was disposed in the conductive film. Subsequently, silver paste was applied to both ends in the width direction of the surface of the obtained measurement sample using a screen printing apparatus, and dried to form current collector parts which is 10 mm width×100 mm depth as shown in FIG. 13. Subsequently, electrical resistance R (Ω) between the current collector parts at both ends of the sample was measured by the two-terminal method involving the contact of ohmmeter measuring terminals. The sheet resistance $R_{s0}$ (Ω/sq) was calculated according to an expression given below from the obtained electrical resistance. The sheet resistance of a conductive film having a protective layer on the surface was measured by preparing a conductive film in which the current collector parts were exposed from the fine metal wire pattern and the other part of the fine metal wire pattern was covered with the protective layer. Specifically, the current collector parts formed by the method mentioned above were masked. A protective layer was formed. Finally, the masking was removed to prepare a conductive film in which only the current collector parts were exposed. The results are shown in Table 3 below.

$R_{s0}=R/L \times D$

L: 80 (mm): distance between the current collector parts
D: 100 (mm): distance in the depth direction Example B: Visible Light Transmittance and Haze The visible light transmittance of the conductive film was measured by calculating a transmittance to visible light having a wavelength of 360 to 830 nm in accordance with JIS K 7361-1: 1997 for total light transmittance. The haze of the conductive film was also measured in accordance with JIS K 7136: 2000. The results are shown in Table 3 below.

Example B: STEM-EDX Analysis on Cross-Section of Fine Metal Wire

The obtained conductive film was embedded in an epoxy resin as support and cut on the fine metal wire side perpendicular to the direction of drawing of the fine metal wire using an ultramicrotome to form a thin section having a thickness of 80 nm. The obtained thin section was used as a measurement sample and subjected to STEM-EDX analysis by irradiation with electron beam under the following conditions.

STEM: manufactured by Hitachi High-Technologies Corp., scanning transmission electron microscope HD-2300A EDX: manufactured by EDAX/AMETEK Inc., energy dispersive X-ray spectroscopy apparatus GENESIS Acceleration voltage: 200 kV Measurement magnification: ×25,000
Incident angle of electron beam: 90°
X-ray extraction angle: 18°
Mapping element: Cu, Ag, and O
The number of integrations: 200
Dwell time: 200 μsec.
Resolution: 256×200 pixels The measurement sample thus obtained was observed under STEM to obtain a STEM image of the cross-section of the fine metal wire. At the same time, elemental mapping on the cross-section of the fine metal wire was performed by energy dispersive X-ray spectroscopy (EDX).

Specifically, the EDX intensity of the K shell of oxygen atom O and the EDX intensity of the K shell of conductive metal atom M were measured as to each site on the cross-section. This operation was performed throughout the cross-section of the fine metal wire.

On the other hand, maximum thickness T from the fine metal wire interface on the transparent substrate side to the fine metal wire surface was calculated from the STEM image. An integrated EDX intensity value of the K shells of oxygen atoms O and an integrated EDX intensity value of the K shells of conductive metal atoms M in a thickness region from 0.10 T to 0.90 T from the fine metal wire interface on the transparent substrate side were calculated. The ratio between these integrated values was obtained as atom % ratio $O/M_{0.10-0.90}$. Atom % ratio $O/M_{0.75-0.90}$ and atom % ratio $O/M_{0.10-0.25}$ were calculated by a similar approach for the target thickness regions.

Examples B2 to B10 and Comparative Examples B1 to B3

A conductive film was prepared and evaluated by the same operation as in Example B1 except that the transparent substrate, the ink, the line width, and the sintering conditions, etc. were each changed as shown in Table 3. The results are shown in Table 3 below.

TABLE 3

| | Transparent substrate | | | Sintering conditions | | Conductive film | | |
|---|---|---|---|---|---|---|---|---|
| | Type | Refractive index of substrate (PET) | Refractive index of intermediate layer | Ink Type | Irradiation temperature [° C.] | Irradiation time [min] | Line width [μm] | Thickness [μm] | $O/M_{0.10-0.90}$ |
| Example B1 | B1 | 1.58 | 1.50 | B1 | 180 | 220 | 1.0 | 0.135 | 0.012 |
| Example B2 | B1 | 1.58 | 1.50 | B1 | 180 | 210 | 1.0 | 0.141 | 0.026 |
| Example B3 | B1 | 1.58 | 1.50 | B1 | 180 | 180 | 1.0 | 0.138 | 0.109 |
| Example B4 | B1 | 1.58 | 1.50 | B1 | 180 | 180 | 2.0 | 0.297 | 0.178 |
| Example B5 | B1 | 1.58 | 1.50 | B1 | 180 | 180 | 0.5 | 0.068 | 0.617 |
| Example B6 | B1 | 1.58 | 1.50 | B1 | 180 | 150 | 1.0 | 0.149 | 0.352 |
| Example B7 | B1 | 1.58 | 1.50 | B1 | 180 | 120 | 1.0 | 0.153 | 0.632 |
| Example B8 | B1 | 1.58 | 1.50 | B1 | 180 | 110 | 1.0 | 0.152 | 0.815 |
| Example B9 | B1 | 1.58 | 1.50 | B1 | 180 | 100 | 1.0 | 0.159 | 0.932 |
| Example B10 | B1 | 1.58 | 1.50 | B2 | 180 | 200 | 1.0 | 0.132 | 0.037 |
| Comparative Example B1 | B1 | 1.58 | 1.50 | B1 | 180 | 240 | 1.0 | 0.126 | 0.009 |
| Comparative Example B2 | B1 | 1.58 | 1.50 | B2 | 180 | 60 | 1.0 | 0.161 | 1.070 |
| Comparative Example B3 | B1 | 1.58 | 1.50 | B1 | 180 | 60 | 1.0 | 0.158 | 1.140 |

| | Conductive film | | | | | | |
|---|---|---|---|---|---|---|---|
| | $O/M_{0.10-0.90}$ Theoretical refractive index | $O/M_{0.10-0.25}$ | $O/M_{0.10-0.25}$ Theoretical refractive index | $O/M_{0.75-0.90}$ | Sheet resistance [Ω/sq] | Visible light transmittance (%) | Haze (%) |
| Example B1 | 0.15 | 0.051 | 0.20 | 0.003 | 96 | 89 | 1.73 |
| Example B2 | 0.17 | 0.073 | 0.19 | 0.008 | 102 | 90 | 1.66 |
| Example B3 | 0.27 | 0.196 | 0.33 | 0.017 | 116 | 90 | 1.39 |
| Example B4 | 0.36 | 0.261 | 0.39 | 0.056 | 69 | 89 | 1.58 |
| Example B5 | 0.87 | 0.813 | 1.10 | 0.155 | 143 | 91 | 1.33 |
| Example B6 | 0.51 | 0.476 | 0.66 | 0.133 | 125 | 91 | 1.29 |
| Example B7 | 0.86 | 0.870 | 1.18 | 0.204 | 134 | 90 | 1.21 |
| Example B8 | 1.11 | 0.984 | 1.33 | 0.211 | 148 | 91 | 1.14 |
| Example B9 | 1.26 | 1.057 | 1.43 | 0.236 | 153 | 91 | 1.09 |
| Example B10 | 0.05 | 0.086 | 0.10 | 0.010 | 93 | 88 | 1.62 |
| Comparative Example B1 | 0.14 | 0.025 | 0.15 | 0.002 | 87 | 87 | 2.57 |
| Comparative Example B2 | 1.35 | 1.182 | 1.35 | 0.426 | 238 | 89 | 1.21 |
| Comparative Example B3 | 1.18 | 1.319 | 1.30 | 0.537 | 247 | 92 | 1.04 |

Examples B1 to B10 and Comparative Examples B1 to B3 demonstrated that a conductive film having both of high transparency (i.e., small line width, high transmittance, and low haze) and high conductivity can be obtained by adjusting atom % ratio O/M of the oxygen atom O to the conductive metal atom M in STEM-EDX analysis on the cross-section of the fine metal wire perpendicular to the direction of drawing of the fine metal wire to a range of 0.01 to 1.00.

Example B'

Hereinafter, Example B' and Comparative Example B' regarding the second embodiment will be specifically described.

<<Transparent Substrate B'>>

[Preparation of Transparent Substrate B'1]

Polyethylene terephthalate (PET) was used as a transparent substrate. An intermediate layer-forming composition containing silicon oxide nanoparticles dispersed therein was applied thereonto and dried so that an intermediate layer having a thickness of 150 nm and a volume resistivity of 5000 Ωcm and containing silicon oxide was formed to obtain transparent substrate B'1.

<<Ink B'>>

[Ink B'1]

20 parts by mass of copper oxide nanoparticles (fine cupric oxide particles manufactured by CIK NanoTek Corp.), 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of an organic solvent (n-butanol and 2-propylene glycol) were mixed to prepare ink B'1 containing the copper oxide nanoparticles dispersed therein.

[Ink B'2]

20 parts by mass of commercially available silver oxide nanoparticles, 5 parts by mass of a dispersant (hydroxypropylcellulose), and 75 parts by mass of an organic solvent (secondary butyl alcohol) were mixed to prepare ink B'2 containing the silver oxide nanoparticles dispersed therein.

Example B'1

<<Production of Conductive Film>>

First, ink B'1 was applied to transfer medium surface. Subsequently, the transfer medium surface coated with ink B'1 was allowed to face a printing plate having grooves of a fine metal wire pattern, pressed and contacted to transfer a portion of the ink B'1 on the transfer medium surface to the protruding portion surface of the printing plate. Then, the transfer medium surface coated with the remaining ink B'1 was allowed to face transparent substrate B'1, pressed and contacted to transfer the ink B'1 having the desired fine metal wire pattern onto the transparent substrate B'1.

Subsequently, the pattern of the ink B'1 was sintered under conditions given below using a commercially available infrared oven so that the reduction of copper oxide on the fine metal wire surface side was promoted to obtain a conductive film having a fine metal wire in a mesh pattern having a line width of 1 μm in which oxygen atom O was unevenly distributed in the interface on the transparent substrate B'1 side.

Heat source: infrared lamp
Irradiation temperature: 180° C.
Irradiation time: 220 min
Environment: hydrogen-containing nitrogen atmosphere <<Evaluation of Conductive Film>>

In Example B', a sheet resistance, a visible light transmittance and a haze, and STEM-EDX analysis on the cross-section of the fine metal wire were measured or conducted in the same way as the methods described in Example B.

Examples B'2 to B'10 and Comparative Examples B'1 and B'2

A conductive film was prepared and evaluated by the same operation as in Example B'1 except that the transparent substrate, the ink, the line width, and the sintering conditions, etc. were each changed as shown in Table 4. The results are shown in Table 4 below.

TABLE 4

| | Transparent substrate | | | Sintering conditions | | Conductive film | | |
|---|---|---|---|---|---|---|---|---|
| | Type | Refractive index of substrate (PET) | Refractive index of intermediate layer | Ink Type | Irradiation temperature [° C.] | Irradiation time [min] | Line width [μm] | Thickness [μm] | O/$M_{0.10-0.90}$ |
| Example B'1 | B'1 | 1.58 | 1.50 | B'1 | 180 | 220 | 1.0 | 0.158 | 0.20 |
| Example B'2 | B'1 | 1.58 | 1.50 | B'1 | 180 | 210 | 1.0 | 0.152 | 0.27 |
| Example B'3 | B'1 | 1.58 | 1.50 | B'1 | 180 | 180 | 1.0 | 0.141 | 0.43 |
| Example B'4 | B'1 | 1.58 | 1.50 | B'1 | 180 | 180 | 2.0 | 0.315 | 0.54 |
| Example B'5 | B'1 | 1.58 | 1.50 | B'1 | 180 | 120 | 0.5 | 0.078 | 0.71 |
| Example B'6 | B'1 | 1.58 | 1.50 | B'1 | 180 | 150 | 1.0 | 0.155 | 0.51 |
| Example B'7 | B'1 | 1.58 | 1.50 | B'1 | 180 | 120 | 1.0 | 0.147 | 0.79 |
| Example B'8 | B'1 | 1.58 | 1.50 | B'1 | 180 | 110 | 1.0 | 0.138 | 0.85 |
| Example B'9 | B'1 | 1.58 | 1.50 | B'1 | 180 | 100 | 1.0 | 0.153 | 0.92 |
| Example B'10 | B'1 | 1.58 | 1.50 | B'2 | 180 | 200 | 1.0 | 0.139 | 0.58 |
| Comparative Example B'1 | B'1 | 1.58 | 1.50 | B'2 | 180 | 60 | 1.0 | 0.155 | 1.09 |
| Comparative Example B'2 | B'1 | 1.58 | 1.50 | B'1 | 180 | 60 | 1.0 | 0.150 | 1.12 |

TABLE 4-continued

| | Conductive film | | | | | | |
|---|---|---|---|---|---|---|---|
| | O/$M_{0.10-0.90}$ Theoretical refractive index | O/$M_{0.10-0.25}$ | O/$M_{0.10-0.25}$ Theoretical refractive index | O/$M_{0.75-0.90}$ | Sheet resistance [Ω/sq] | Visible light transmittance (%) | Haze (%) |
| Example B'1 | 0.38 | 0.26 | 0.46 | 0.17 | 98 | 90 | 1.59 |
| Example B'2 | 0.47 | 0.33 | 0.52 | 0.18 | 101 | 91 | 1.54 |
| Example B'3 | 0.65 | 0.47 | 0.68 | 0.22 | 106 | 90 | 1.20 |
| Example B'4 | 0.77 | 0.62 | 0.86 | 0.17 | 73 | 92 | 1.33 |
| Example B'5 | 0.96 | 0.82 | 1.11 | 0.12 | 105 | 91 | 1.16 |
| Example B'6 | 0.71 | 0.59 | 0.81 | 0.18 | 103 | 92 | 1.12 |
| Example B'7 | 1.07 | 0.88 | 1.19 | 0.22 | 130 | 91 | 1.36 |
| Example B'8 | 1.15 | 0.89 | 1.20 | 0.20 | 145 | 92 | 1.43 |
| Example B'9 | 1.24 | 0.98 | 1.33 | 0.23 | 179 | 92 | 1.08 |
| Example B'10 | 0.81 | 0.66 | 0.92 | 0.14 | 93 | 91 | 1.45 |
| Comparative Example B'1 | 1.33 | 1.14 | 1.36 | 0.50 | 213 | 88 | 1.80 |
| Comparative Example B'2 | 1.21 | 1.24 | 1.31 | 0.57 | 209 | 90 | 1.11 |

Examples B'1 to B'10 and Comparative Examples B'1 to B'2 demonstrated that a conductive film having both of high transparency (i.e., small line width, high transmittance, and low haze) and high conductivity can be obtained by adjusting atom % ratio O/M of the oxygen atom O to the conductive metal atom M in STEM-EDX analysis on the cross-section of the fine metal wire perpendicular to the direction of drawing of the fine metal wire to a range of 0.01 to 1.00.

Example C

Hereinafter, Example C and Comparative Example C regarding the third embodiment will be specifically described.

<<Transparent Substrate C>>

[Preparation of Transparent Substrate C1]

Polyethylene terephthalate (PET) was used as a transparent substrate. An intermediate layer-forming composition containing silicon oxide nanoparticles and a conductive organosilane compound was applied thereonto and dried so that an intermediate layer having an antistatic function, having a thickness of 150 nm and a volume resistivity of 5000 Ωcm, and containing silicon oxide was formed to obtain transparent substrate C1.

[Preparation of Transparent Substrate C2]

Transparent substrate C2 was obtained in the same way as the method for preparing the transparent substrate C1 except that polyethylene naphthalate (PEN) was used instead of PET as a transparent substrate.

<<Ink C>>

[Ink C1]

20 parts by mass of copper oxide nanoparticles (fine cupric oxide particles manufactured by CIK NanoTek Corp.), 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of an organic solvent (n-butanol and 2-propylene glycol) were mixed to prepare ink C1 containing the copper oxide nanoparticles dispersed therein.

[Ink C2]

50 parts by mass of ethanol were added to 100 parts by mass of silver nanoink (RAGT-29) manufactured by DIC Corp. to prepare ink C2.

Example C1

<<Production of Conductive Film>>

First, ink C1 was applied to transfer medium surface. Subsequently, the transfer medium surface coated with ink C1 was allowed to face a printing plate having grooves of a fine metal wire pattern, pressed and contacted to transfer a portion of the ink on the transfer medium surface to the protruding portion surface of the printing plate. Then, the transfer medium surface coated with the remaining ink C1 was allowed to face transparent substrate C1, pressed and contacted to transfer the ink C1 having the desired fine metal wire pattern onto the transparent substrate C1. Subsequently, the pattern of the ink C1 was sintered by heating in a reductive gas atmosphere under conditions given below to obtain a conductive film having a fine metal wire in a mesh pattern having a line width of 1 μm.

Environment: helium-hydrogen gas atmosphere
Heating temperature: 100° C.
Heating time: 60 minutes <<Evaluation of Conductive Film>>

Example C: Sheet Resistance

Sheet resistance $R_{s0}$ (Ω/sq) of the obtained conductive film was measured by the following method: a measurement sample of 100 mm square was cut out of a portion throughout which the fine metal wire pattern was disposed in the conductive film. Subsequently, silver paste was applied to both ends in the width direction of the surface of the obtained measurement sample using a screen printing apparatus, and dried to form current collector parts which is 10 mm width×100 mm depth as shown in FIG. 13. Subsequently, electrical resistance R (Ω) between the current collector parts at both ends of the sample was measured by the two-terminal method involving the contact of ohmmeter measuring terminals. The sheet resistance $R_{s0}$ (Ω/sq) was calculated according to an expression given below from the obtained electrical resistance. The sheet resistance of a conductive film having a protective layer on the surface was measured by preparing a conductive film in which the current collector parts were exposed from the fine metal wire pattern and the other part of the fine metal wire pattern was covered with the protective layer. Specifically, the current collector parts formed by the method mentioned above were masked. A protective layer was formed. Finally, the masking was removed to prepare a conductive film in which only the current collector parts were exposed. The results are shown in Table 5 below.

$$R_{s0} = R/L \times D$$

L: 80 (mm): distance between the current collector parts
D: 100 (mm): depth of the measurement sample Example C: Visible Light Transmittance and Haze The visible light transmittance of the conductive film was measured by calculating a transmittance to visible light having a wavelength of 360 to 830 nm in accordance with JIS K 7361-1: 1997 for total light transmittance. The haze of the conductive film was also measured in accordance with JIS K 7136: 2000. The results are shown in Table 5 below.

Example C: STEM-EDX Analysis on Cross-Section of Fine Metal Wire

A thin section including the cross-section of the fine metal wire perpendicular to the direction of drawing of the fine metal wire and having a thickness of 200 nm or smaller was prepared from the obtained conductive film using focused ion beam (FIB). The obtained thin section was attached to the tip of a silicon sample table and used as a measurement sample in STEM-EDX measurement under the following conditions.

STEM: manufactured by Hitachi High-Technologies Corp., scanning transmission electron microscope HD-2300A
EDX: manufactured by EDAX/AMETEK Inc., energy dispersive X-ray spectroscopy apparatus GENESIS
Acceleration voltage: 200 kV
Measurement magnification: ×25,000
Incident angle of electron beam: 90°
X-ray extraction angle: 18°
Mapping element: Cu, Ag, C, and O
The number of integrations: 200
Dwell time: 200 μsec.
Resolution: 256×200 pixels Subsequently, the measurement sample thus obtained was observed under STEM to obtain a STEM image of the cross-section of the fine metal wire. At the same time, elemental mapping on the cross-section of the fine metal wire was performed by energy dispersive X-ray spectroscopy (EDX). Specifically, the EDX intensity of the K shell of carbon atom C and the EDX intensity of the K shell of conductive metal atom M were measured as to each site on the cross-section. This operation was performed throughout the cross-section of the fine metal wire.

On the other hand, maximum thickness T from the fine metal wire interface on the transparent substrate side to the fine metal wire was calculated from the STEM image. An integrated EDX intensity value of the K shells of carbon atoms C and an integrated EDX intensity value of the K shells of conductive metal atoms M in a thickness region from 0.10 T to 0.25 T from the fine metal wire interface on the transparent substrate side were calculated. The ratio between these integrated values was obtained as atom % ratio $C/M_{0.10-0.25}$. Atom % ratio $O/M_{0.10-0.25}$ of the oxygen atom O to the conductive metal atom M was also calculated by a similar approach. The results are shown in Table 5 below.

Example C: Adhesion

The obtained conductive film was evaluated for the adhesion of the fine metal wire to the transparent substrate by the 180° peel test method. Specifically, Kapton Adhesive Tape No. 650S manufactured by Teraoka Seiko Co., Ltd was applied to the fine metal wire part (conductive part) of the obtained conductive film. One end of the tape was detached from the conductive film, and the tape was peeled in a state bent back to 180°. The transparent substrate surface after the tape peeling was observed. The fine metal wire was confirmed to have favorable adhesion when remaining on the transparent substrate. A sample having favorable adhesion was indicated by A, and a sample found to have partial peeling of the fine metal wire was indicated by B. The results are shown in Table 5 below.

Examples C2 to C6 and Comparative Examples C1 to C8

A conductive film was prepared by the same operation as in Example C1 except that the transparent substrate, the ink, and the sintering conditions, etc. were each changed as shown in Table 5. The conditions are shown in Table 5 below. Results of evaluating the prepared conductive film are also shown in Table 5 below.

TABLE 5

| | Ink | Transparent substrate | Heating temperature [° C.] | Heating time [min] | $C/M_{0.10-0.25}$ | $O/M_{0.10-0.25}$ | Visible light transmittance [%] | Sheet resistance [Ω/sq] | Haze [%] | Adhesion |
|---|---|---|---|---|---|---|---|---|---|---|
| Example C1 | C1 | C1 | 100 | 60 | 2.07 | 0.23 | 90.6 | 153 | 2.23 | A |
| Example C2 | C1 | C2 | 120 | 30 | 1.96 | 0.19 | 87.7 | 139 | 2.37 | A |
| Example C3 | C1 | C1 | 100 | 75 | 0.32 | 0.07 | 90.1 | 103 | 2.54 | A |
| Example C4 | C1 | C1 | 100 | 45 | 5.53 | 0.59 | 91.3 | 437 | 1.98 | A |
| Example C5 | C2 | C1 | 100 | 30 | 5.71 | 0.63 | 90.5 | 450 | 2.01 | A |
| Example C6 | C2 | C2 | 120 | 30 | 3.46 | 0.38 | 86.6 | 201 | 2.14 | A |
| Comparative Example C1 | C1 | C1 | 100 | 30 | 6.72 | 0.72 | 91.7 | 583 | 1.87 | A |
| Comparative Example C2 | C1 | C1 | 100 | 90 | 0.24 | 0.04 | 88.8 | 96 | 2.82 | B |
| Comparative Example C3 | C1 | C2 | 120 | 15 | 6.88 | 0.79 | 88.4 | 611 | 1.83 | A |
| Comparative Example C4 | C1 | C2 | 120 | 60 | 0.18 | 0.03 | 85.9 | 79 | 2.94 | B |
| Comparative Example C5 | C2 | C1 | 100 | 15 | 7.2 | 0.92 | 90 | 705 | 1.99 | A |
| Comparative Example C6 | C2 | C1 | 100 | 90 | 0.21 | 0.03 | 89.2 | 88 | 2.28 | B |

TABLE 5-continued

| | Ink | Transparent substrate | Heating temperature [° C.] | Heating time [min] | C/$M_{0.10-0.25}$ | O/$M_{0.10-0.25}$ | Visible light transmittance [%] | Sheet resistance [Ω/sq] | Haze [%] | Adhesion |
|---|---|---|---|---|---|---|---|---|---|---|
| Comparative Example C7 | C2 | C2 | 120 | 15 | 7.43 | 0.98 | 86.8 | 684 | 1.95 | A |
| Comparative Example C8 | C2 | C2 | 120 | 60 | 0.14 | 0.02 | 85.9 | 82 | 2.35 | B |

Examples C1 to C6 and Comparative Examples C1 to C8 demonstrated that a conductive film having both of high conductivity and high adhesion between a transparent substrate and a fine metal wire while maintaining its high transparency (i.e., small line width) can be obtained by adjusting the atom % ratio between the conductive metal atom M and the carbon atom C on the cross-section of the fine metal wire to a specific range.

Example C'

Hereinafter, Example C' and Comparative Example C' regarding the third embodiment will be specifically described.

<<Transparent Substrate C'>>

[Preparation of Transparent Substrate C'1]

Polyethylene terephthalate (PET) was used as a transparent substrate. A silicon oxide layer having a thickness of 50 nm was formed as an intermediate layer on PET by film formation according to the sputtering method to obtain transparent substrate C'1.

[Preparation of Transparent Substrate C'2]

Transparent substrate C'2 was obtained in the same way as the method for preparing the transparent substrate C'1 except that polyethylene naphthalate (PEN) was used instead of PET as a transparent substrate.

<<Ink C'>>

[Ink C'1]

20 parts by mass of copper oxide nanoparticles (fine cupric oxide particles manufactured by CIK NanoTek Corp.), 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of an organic solvent (n-butanol and 2-propylene glycol) were mixed to prepare ink C'1 containing the copper oxide nanoparticles dispersed therein.

[Ink C'2]

50 parts by mass of ethanol were added to 100 parts by mass of silver nanoink (RAGT-29) manufactured by DIC Corp. to prepare ink C'2.

Example C'1

<<Production of Conductive Film>>

First, ink C'1 was applied to transfer medium surface. Subsequently, the transfer medium surface coated with ink C'1 was allowed to face a printing plate having grooves of a fine metal wire pattern, pressed and contacted to transfer a portion of the ink on the transfer medium surface to the protruding portion surface of the printing plate. Then, the transfer medium surface coated with the remaining ink C'1 was allowed to face transparent substrate C'1, pressed and contacted to transfer the ink C'1 having the desired fine metal wire pattern onto the transparent substrate C'1. Subsequently, the pattern of the ink C'1 was sintered by heating in a reductive gas atmosphere under conditions given below to obtain a conductive film having a fine metal wire in a mesh pattern having a line width of 1 μm.

Environment: helium-hydrogen gas atmosphere
Heating temperature: 100° C.
Heating time: 60 minutes <<Evaluation of Conductive Film>>

In Example C', a sheet resistance, a visible light transmittance and a haze, STEM-EDX analysis on the cross-section of the fine metal wire, and adhesion were measured or conducted in the same way as the methods described in Example C.

Example C'2 and Comparative Examples C'1 to C'4

A conductive film was prepared by the same operation as in Example C1 except that the transparent substrate, the ink, and the sintering conditions, etc. were each changed as shown in Table 6. The conditions are shown in Table 6 below. Results of evaluating the prepared conductive film are also shown in Table 6 below.

TABLE 6

| | Ink | Transparent substrate | Heating temperature [° C.] | Heating time [min] | C/$M_{0.10-0.25}$ | O/$M_{0.10-0.25}$ | Visible light transmittance [%] | Sheet resistance [Ω/sq] | Haze [%] | Adhesion |
|---|---|---|---|---|---|---|---|---|---|---|
| Example C'1 | C'1 | C'1 | 100 | 60 | 4.53 | 0.46 | 89.8 | 162 | 2.07 | A |
| Example C'2 | C'1 | C'1 | 100 | 45 | 5.92 | 0.48 | 90 | 478 | 1.96 | A |
| Comparative Example C'1 | C'1 | C'1 | 100 | 30 | 7.53 | 0.68 | 90.6 | 657 | 1.8 | A |
| Comparative Example C'2 | C'1 | C'2 | 120 | 15 | 6.21 | 0.59 | 86.8 | 529 | 1.78 | A |
| Comparative Example C'3 | C'2 | C'1 | 100 | 15 | 7.42 | 0.71 | 89.9 | 901 | 2.9 | A |
| Comparative Example C'4 | C'2 | C'2 | 120 | 15 | 6.48 | 0.53 | 86.1 | 550 | 2.56 | A |

Examples C'1 to C'2 and Comparative Examples C'1 to C'4 demonstrated that a conductive film having both of high conductivity and high adhesion between a transparent substrate and a fine metal wire while maintaining its high transparency (i.e., small line width) can be obtained by adjusting the atom % ratio between the conductive metal atom M and the carbon atom C on the cross-section of the fine metal wire to a specific range.

Example D

Hereinafter, Example D and Comparative Example D regarding the second and third embodiments will be specifically described.

<<Transparent Substrate D>>

[Preparation of Transparent Substrate D1]

PET was used as a transparent substrate. An intermediate layer-forming composition containing silicon oxide nanoparticles and a conductive organosilane compound was applied thereonto and dried so that an intermediate layer having an antistatic function, having a thickness of 150 nm and a volume resistivity of 5000 Ωcm, and containing silicon oxide was formed to obtain transparent substrate D1. The transparent substrate D1 was in a form where the intermediate layer was laminated on the transparent substrate PET.

<<Ink D>>

[Ink D1]

20 parts by mass of cuprous oxide nanoparticles having a particle size of 21 nm, 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of ethanol were mixed to prepare ink D1 having a cuprous oxide nanoparticle content ratio of 20% by mass.

Example D1

<<Preparation of Conductive Film>>

First, ink D1 was applied to transfer medium surface. Subsequently, the transfer medium surface coated with ink was allowed to face a printing plate having grooves of a fine metal wire pattern, pressed and contacted to transfer a portion of the ink on the transfer medium surface to the protruding portion surface of the printing plate. Then, the transfer medium surface coated with the remaining ink was allowed to face a transparent substrate, pressed and contacted to transfer the ink D1 having the desired fine metal wire pattern onto the transparent substrate. Subsequently, the pattern of the ink D1 was reduced under the conditions described in Table 7 using a plasma sintering apparatus to obtain a conductive film having a fine metal wire in a mesh pattern having a line width of 1 μm.

<<Evaluation of Conductive Film>>

Example D: Sheet Resistance

Sheet resistance $R_{s0}$ (Ω/sq) of the obtained conductive film was measured by the following method: a measurement sample of 100 mm square was cut out of a portion throughout which the fine metal wire pattern was disposed in the conductive film. Subsequently, silver paste was applied to both ends in the width direction of the surface of the obtained measurement sample using a screen printing apparatus, and dried to form current collector parts which is 10 mm width×100 mm depth as shown in FIG. 13. Subsequently, electrical resistance R (Ω) between the current collector parts at both ends of the sample was measured by the two-terminal method involving the contact of ohmmeter measuring terminals. The sheet resistance $R_{s0}$ (Ω/sq) was calculated according to an expression given below from the obtained electrical resistance. The sheet resistance of a conductive film having a protective layer on the surface was measured by preparing a conductive film in which the current collector parts were exposed from the fine metal wire pattern and the other part of the fine metal wire pattern was covered with the protective layer. Specifically, the current collector parts formed by the method mentioned above were masked. A protective layer was formed. Finally, the masking was removed to prepare a conductive film in which only the current collector parts were exposed. The results are shown in Table 7 below.

$R_{s0} = R/L \times D$

L: 80 (mm): distance between the current collector parts
D: 100 (mm): depth of the measurement sample Example D: Visible Light Transmittance and Haze The visible light transmittance of the conductive film was measured by calculating a transmittance to visible light having a wavelength of 360 to 830 nm in accordance with JIS K 7361-1: 1997 for total light transmittance. The haze of the conductive film was also measured in accordance with JIS K 7136: 2000. The results are shown in Table 7 below.

Example D: STEM-EDX Analysis on Cross-Section of Fine Metal Wire

A thin section including the cross-section of the fine metal wire perpendicular to the direction of drawing of the fine metal wire and having a thickness of 200 nm or smaller was prepared from the obtained conductive film using focused ion beam (FIB). The obtained thin section was attached to the tip of a silicon sample table and used as a measurement sample in STEM-EDX measurement under the following conditions.

STEM: manufactured by Hitachi High-Technologies Corp., scanning transmission electron microscope HD-2300A EDX: manufactured by EDAX/AMETEK Inc., energy dispersive X-ray spectroscopy apparatus GENESIS Acceleration voltage: 200 kV
Measurement magnification: ×25,000
Incident angle of electron beam: 90°
X-ray extraction angle: 18°
Mapping element: Cu, C, and O
The number of integrations: 200
Dwell time: 200 μsec.
Resolution: 256×200 pixels Subsequently, the measurement sample thus obtained was observed under STEM to obtain a STEM image of the cross-section of the fine metal wire. At the same time, elemental mapping on the cross-section of the fine metal wire was performed by energy dispersive X-ray spectroscopy (EDX). Specifically, the EDX intensity of the K shell of carbon atom C, the EDX intensity of the K shell of oxygen atom O, and the EDX intensity of the K shell of conductive metal atom M were measured as to each site on the cross-section. This operation was performed throughout the cross-section of the fine metal wire.

On the other hand, maximum thickness T from the fine metal wire interface on the transparent substrate side to the fine metal wire was calculated from the STEM image. An integrated EDX intensity value of the K shells of carbon atoms C and an integrated EDX intensity value of the K shells of conductive metal atoms M in a thickness region from 0.10 T to 0.25 T from the fine metal wire interface on the transparent substrate side were calculated. The ratio between these integrated values was obtained as atom % ratio $C/M_{0.10-0.25}$. Likewise, an integrated EDX intensity value of the K shells of oxygen atoms O and an integrated EDX intensity value of the K shells of conductive metal atoms M in a thickness region from 0.10 T to 0.90 T from the fine metal wire interface on the transparent substrate side were calculated. The ratio between these integrated values was obtained as atom % ratio $O/M_{0.10-0.90}$. Atom % ratio $O/M_{0.75-0.90}$ and atom % ratio $O/M_{0.10-0.25}$ were calculated by a similar approach for the target thickness regions. The results are shown in Table 7 below.

Example D: Adhesion

The obtained conductive film was evaluated for the adhesion of the fine metal wire to the transparent substrate by the 180° peel test method. Specifically, Kapton Adhesive Tape No. 650S manufactured by Teraoka Seiko Co., Ltd was applied to the fine metal wire part (conductive part) of the obtained conductive film. One end of the tape was detached from the conductive film, and the tape was peeled in a state bent back to 180°. The transparent substrate surface after the tape peeling was observed. A sample having no peeling was indicated by A; a sample found to have partial peeling of the fine metal wire was indicated by B; and a sample in which the whole fine metal wire was peeled was indicated by C. The results are shown in Table 7 below.

Examples D2 to D13 and Comparative Examples D1 to D8

A conductive film was prepared and evaluated by the same operation as in Example D1 except that the transparent substrate, the ink, the line width, and the sintering conditions were each changed as shown in Table 7. The results are shown in Table 7 below.

TABLE 7

| | | | Plasma sintering | | Conductive film | |
| --- | --- | --- | --- | --- | --- | --- |
| | Transparent substrate | Ink | Power (kW) | Treatment time (sec) | Line width (μm) | $C/M_{0.10-0.25}$ | $O/M_{0.10-0.90}$ |
| Example D1 | D1 | D1 | 1.2 | 300 | 1.0 | 0.34 | 0.013 |
| Example D3 | D1 | D1 | 1.2 | 280 | 1.0 | 0.42 | 0.023 |
| Example D2 | D1 | D1 | 1.2 | 240 | 1.0 | 0.89 | 0.045 |
| Example D4 | D1 | D1 | 1.1 | 200 | 1.0 | 2.10 | 0.110 |
| Example D5 | D1 | D1 | 0.9 | 200 | 1.0 | 3.17 | 0.146 |
| Example D6 | D1 | D1 | 0.9 | 180 | 1.0 | 4.44 | 0.309 |
| Example D7 | D1 | D1 | 0.9 | 150 | 1.0 | 4.79 | 0.727 |
| Example D8 | D1 | D1 | 0.9 | 110 | 1.0 | 5.02 | 0.784 |
| Example D9 | D1 | D1 | 0.9 | 90 | 1.0 | 5.84 | 0.956 |
| Example D10 | D1 | D1 | 0.9 | 180 | 0.5 | 4.02 | 0.202 |
| Example D11 | D1 | D1 | 0.9 | 180 | 2.0 | 4.67 | 0.703 |
| Example D12 | D1 | D1 | 0.9 | 200 | 3.0 | 4.81 | 0.348 |
| Example D13 | D1 | D1 | 0.9 | 200 | 5.0 | 4.91 | 0.371 |
| Comparative Example D1 | D1 | D1 | 1.5 | 360 | 1.0 | 0.26 | 0.006 |
| Comparative Example D2 | D1 | D1 | 0.7 | 60 | 1.0 | 6.89 | 1.111 |
| Comparative Example D3 | D1 | D1 | 1.5 | 360 | 0.5 | 0.22 | 0.005 |
| Comparative Example D4 | D1 | D1 | 0.7 | 60 | 0.5 | 6.27 | 1.102 |
| Comparative Example D5 | D1 | D1 | 1.5 | 360 | 3.0 | 0.28 | 0.008 |
| Comparative Example D6 | D1 | D1 | 0.7 | 60 | 3.0 | 7.35 | 1.331 |
| Comparative Example D7 | D1 | D1 | 1.5 | 360 | 5.0 | 0.29 | 0.008 |
| Comparative Example D8 | D1 | D1 | 0.7 | 60 | 5.0 | 8.07 | 1.437 |

| | Conductive film | | Evaluation | | | |
| --- | --- | --- | --- | --- | --- | --- |
| | $O/M_{0.10-0.25}$ | $O/M_{0.75-0.90}$ | Sheet resistance (Ω/sq) | Visible light transmittance (%) | Haze (%) | Adhesion |
| Example D1 | 0.051 | 0.009 | 106 | 90 | 2.89 | B |
| Example D3 | 0.064 | 0.012 | 107 | 90 | 2.81 | B |
| Example D2 | 0.078 | 0.032 | 109 | 90 | 2.76 | A |
| Example D4 | 0.129 | 0.092 | 115 | 90 | 2.67 | A |
| Example D5 | 0.298 | 0.165 | 120 | 90 | 2.33 | A |
| Example D6 | 0.476 | 0.182 | 131 | 90 | 1.99 | A |
| Example D7 | 0.859 | 0.209 | 152 | 90 | 1.92 | A |
| Example D8 | 0.929 | 0.209 | 205 | 90 | 1.88 | A |
| Example D9 | 0.987 | 0.225 | 274 | 90 | 1.81 | A |

TABLE 7-continued

| | | | | | | |
|---|---|---|---|---|---|---|
| Example D10 | 0.317 | 0.173 | 269 | 90 | 2.11 | A |
| Example D11 | 0.432 | 0.180 | 63 | 90 | 1.98 | A |
| Example D12 | 0.447 | 0.191 | 45 | 90 | 1.93 | A |
| Example D13 | 0.456 | 0.202 | 23 | 90 | 1.95 | A |
| Comparative Example D1 | 0.019 | 0.001 | 105 | 90 | 3.35 | C |
| Comparative Example D2 | 1.434 | 0.789 | 536 | 89 | 1.73 | A |
| Comparative Example D3 | 0.012 | 0.001 | 203 | 90 | 3.48 | C |
| Comparative Example D4 | 1.255 | 0.754 | 817 | 90 | 1.69 | A |
| Comparative Example D5 | 0.023 | 0.001 | 39 | 90 | 3.29 | C |
| Comparative Example D6 | 1.756 | 0.801 | 549 | 90 | 1.78 | A |
| Comparative Example D7 | 0.025 | 0.001 | 19 | 90 | 3.30 | C |
| Comparative Example D8 | 1.765 | 0.883 | 635 | 90 | 1.83 | A |

Examples D1 to D13 and Comparative Examples D1 to D8 demonstrated that a conductive film that can achieve a low sheet resistance, a high transmittance, a low haze, and favorable adhesion at the same time while achieving a low visibility by thinning of a fine metal wire can be obtained by adjusting atom % ratio $C/M_{0.10-0.25}$ of the oxygen atom C to the conductive metal atom M to a range of 0.3 to 6.0 and atom % ratio $O/M_{0.10-0.90}$ of the oxygen atom O to the conductive metal atom M to a range of 0.01 to 1.00 in STEM-EDX analysis on the cross-section of the fine metal wire perpendicular to the direction of drawing of the fine metal wire.

The present application is based on Japanese Patent Applications (Japanese Patent Application Nos. 2018-142225, 2018-142051, and 2018-142045) filed in the Japan Patent Office on Jul. 30, 2018, the contents of which are incorporated herein by reference.

INDUSTRIAL APPLICABILITY

The conductive film of the present invention can be suitably used as a transparent electrode for an electronic paper, a touch panel, and a flat-panel display, etc., and thus has industrial applicability.

REFERENCE SIGNS LIST

10 . . . Conductive film
11 . . . Transparent substrate
12 . . . Fine metal wire pattern
13 . . . Conductive part
14 . . . Fine metal wire
15 . . . Opening part
16 . . . Pattern unit
20 . . . Electronic paper
21 . . . Cup
22 . . . Black pigment
23 . . . White pigment
24 . . . Bottom electrode
30 . . . Touch panel
31 . . . Insulator
32 . . . Extraction electrode
33 . . . Controller

The invention claimed is:

1. A conductive film comprising a transparent substrate and a conductive part comprising a fine metal wire pattern disposed on one side or both sides of the transparent substrate, wherein:
the fine metal wire pattern is constituted by a fine metal wire and opening parts;
the fine metal wire comprises conductive metal atom M and carbon atom C;
when the thickness of the fine metal wire is defined as T in STEM-EDX analysis on across-section of the fine metal wire perpendicular to a direction of drawing of the fine metal wire, atom % ratio $C/M_{0.10-0.25}$ in a thickness region from 0.10 T to 0.25 T from a fine metal wire interface on the transparent substrate side is 0.3 or more and 6.0 or less;
a sheet resistance of the conductive film is 0.1 Ω/sq or more and 500 Ω/sq or less; and
a line width of the fine metal wire is 0.1 μm or larger and 5.0 μm or smaller.

2. The conductive film according to claim 1, wherein the fine metal wire further comprises oxygen atom O, and atom % ratio $O/M_{0.10-0.25}$ in a thickness region from 0.10 T to 0.25 T from the fine metal wire interface on the transparent substrate side is 0.05 or more.

3. The conductive film according to claim 1, wherein the conductive metal atom M comprises at least one or more metal elements selected from the group consisting of gold, silver, copper and aluminum.

4. The conductive film according to claim 1, comprising an intermediate layer between the transparent substrate and the conductive part.

5. The conductive film according to claim 4, wherein the intermediate layer comprises at least one member selected from the group consisting of silicon oxide, silicon nitride, aluminum oxide, and magnesium fluoride.

6. The conductive film according to claim 1, wherein an aspect ratio of the fine metal wire is 0.05 or more and 1.00 or less.

7. The conductive film according to claim 1, wherein a sheet resistance of the conductive film is 0.1 Ω/sq or more and 1,000 Ω/sq or less.

8. The conductive film according to claim 1, wherein a visible light transmittance of the conductive film is 80% or more and 100% or less.

9. The conductive film according to claim 1, wherein a haze of the conductive film is 0.01% or more and 5.00% or less.

10. The conductive film according to claim 1, wherein an aperture ratio of the fine metal wire pattern is 80% or more and less than 100%.

11. The conductive film according to claim 1, wherein the fine metal wire pattern is a mesh pattern.

12. The conductive film according to claim 1, wherein the fine metal wire pattern is a line pattern.

13. A conductive film roll comprising a conductive film according to claim 1 wound into a roll.

14. An electronic paper comprising a conductive film according to claim 1.

15. A touch panel comprising a conductive film according to claim 1.

16. A flat-panel display comprising a conductive film according to claim 1.

17. The conductive film according to claim 1, wherein the fine metal wire pattern has an aperture ratio of from 60% to 90%.

\* \* \* \* \*